(12) United States Patent
Haas et al.

(10) Patent No.: US 11,958,512 B2
(45) Date of Patent: Apr. 16, 2024

(54) MONITORING AND COMMUNICATION DEVICE OF A VEHICLE

(71) Applicant: Westinghouse Air Brake Technologies Corporation, Pittsburgh, PA (US)

(72) Inventors: Carl L. Haas, Walkersville, MD (US); Padam D. Swar, Clarksburg, MD (US); Danial Rice, Frederick, MD (US); Christopher Claussen, Cedar Rapids, IA (US); Joseph W. Gorman, Cedar Rapids, IA (US); James A. Oswald, Coggon, IA (US); Ann K. Grimm, Cedar Rapids, IA (US); Kevin Angel, Marion, IA (US); James Trainor, Cedar Rapids, IA (US); Phillip A. Burgart, Cedar Rapids, IA (US); Kendrick W. Gawne, Cedar Rapids, IA (US); Robert Hoffman, Germantown, MD (US); Tim Gibson, Germantown, MD (US); Brian Kurz, Thurmont, MD (US)

(73) Assignee: WESTINGHOUSE AIR BRAKE TECHNOLOGIES CORPORATION, Pittsburgh, PA (US)

(*) Notice: Subject to any disclaimer, the term of this patent is extended or adjusted under 35 U.S.C. 154(b) by 407 days.

(21) Appl. No.: 17/464,471

(22) Filed: Sep. 1, 2021

(65) Prior Publication Data
US 2022/0032978 A1 Feb. 3, 2022

Related U.S. Application Data

(63) Continuation-in-part of application No. 17/313,888, filed on May 6, 2021, now Pat. No. 11,716,111, and
(Continued)

(51) Int. Cl.
*G06V 20/56* (2022.01)
*B61L 15/00* (2006.01)
(Continued)

(52) U.S. Cl.
CPC ....... *B61L 15/0054* (2013.01); *B61L 15/0018* (2013.01); *B61L 23/041* (2013.01);
(Continued)

(58) Field of Classification Search
CPC .... B61L 15/00; B61L 15/009; B61L 15/0027; B61L 15/0054; B61L 25/00;
(Continued)

(56) References Cited

U.S. PATENT DOCUMENTS 5,267,473 A 12/1993 Bezos et al.
5,376,925 A * 12/1994 Crisafulli ............... G01D 3/024
310/318
(Continued)

FOREIGN PATENT DOCUMENTS

CA 2972412 A1 8/2016
CN 101170279 A 4/2008
(Continued)

OTHER PUBLICATIONS

Office Action for corresponding CA Application No. 3,113,624 dated Mar. 2, 2022 (4 pages).
(Continued)

*Primary Examiner* — Blane J Jackson
(74) *Attorney, Agent, or Firm* — The Small Patent Law Group LLC; Christopher R. Carroll

(57) ABSTRACT

A vehicle monitoring device includes a camera or other optical sensor configured to be disposed at a trailing end of a first vehicle system. The camera or other optical sensor is configured to output one or more images or video of a field of view behind the first vehicle system. The monitoring
(Continued)

device also includes a controller configured to receive output from one or more sensors and to activate the camera or other optical sensor to output the one or more images or video based on the output from the one or more sensors. The output from the one or more sensors indicates one or more of a change in movement of the first vehicle system, a temperature, an acoustic sound, or movement of a second vehicle system.

20 Claims, 25 Drawing Sheets

Related U.S. Application Data a continuation-in-part of application No. 17/313,502, filed on May 6, 2021, and a continuation-in-part of application No. 17/217,746, filed on Mar. 30, 2021, and a continuation-in-part of application No. 17/203,466, filed on Mar. 16, 2021, and a continuation-in-part of application No. 16/730,681, filed on Dec. 30, 2019, now Pat. No. 11,476,564, and a continuation-in-part of application No. 16/723,071, filed on Dec. 20, 2019, now Pat. No. 11,390,295.

(60) Provisional application No. 63/187,773, filed on May 12, 2021, provisional application No. 63/187,767, filed on May 12, 2021, provisional application No. 63/018,911, filed on May 1, 2020, provisional application No. 62/993,274, filed on Mar. 23, 2020.

(51) Int. Cl.
*B61L 23/04* (2006.01)
*B61L 25/02* (2006.01)

(52) U.S. Cl.
CPC .......... *B61L 25/021* (2013.01); *B61L 25/023* (2013.01); *G06V 20/56* (2022.01)

(58) Field of Classification Search
CPC ...... B61L 25/021; B61L 25/023; B61L 27/00; B61L 27/0094; G06V 20/50; G06V 20/56
See application file for complete search history.

(56) References Cited

U.S. PATENT DOCUMENTS

| | | | |
|---|---|---|---|
| 5,650,713 A | 7/1997 | Takeuchi et al. | |
| 6,227,625 B1 | 5/2001 | Gaughan | |
| 6,803,748 B2 | 10/2004 | Peter | |
| 7,109,928 B1 | 9/2006 | Thiele et al. | |
| 7,468,564 B2 | 12/2008 | Crisafulli | |
| 7,769,509 B2 | 8/2010 | Gaughan et al. | |
| 7,965,312 B2* | 6/2011 | Chung | B61L 27/53 348/148 |
| 7,979,173 B2 | 7/2011 | Breed | |
| 8,102,077 B2 | 1/2012 | Neher | |
| 8,299,645 B2 | 10/2012 | Muchow et al. | |
| 9,065,370 B2 | 6/2015 | Ito et al. | |
| 9,083,861 B2 | 7/2015 | Haas et al. | |
| 9,393,977 B2* | 7/2016 | Kramer | B61L 27/57 |
| 10,457,281 B2 | 10/2019 | Brooks et al. | |
| 11,277,727 B1 | 3/2022 | Samson | |
| 2003/0071467 A1 | 4/2003 | Calley et al. | |
| 2007/0216771 A1* | 9/2007 | Kumar | B61L 27/53 348/148 |
| 2010/0123314 A1 | 5/2010 | Menke | |
| 2010/0213321 A1* | 8/2010 | Kane | B61L 25/025 246/167 R |
| 2012/0191265 A1 | 7/2012 | Keir | |
| 2014/0361540 A1 | 12/2014 | Knight | |
| 2015/0105967 A1 | 4/2015 | Skipp et al. | |
| 2016/0118786 A1 | 4/2016 | Zhu et al. | |
| 2016/0208781 A1 | 7/2016 | Nær et al. | |
| 2016/0290318 A1 | 10/2016 | Muik | |
| 2016/0355198 A1 | 12/2016 | Dulmage et al. | |
| 2017/0101054 A1 | 4/2017 | Dusane | |
| 2018/0041151 A1 | 2/2018 | Turpin | |
| 2018/0166776 A1 | 6/2018 | Ziegler et al. | |
| 2018/0210439 A1 | 7/2018 | Brooks et al. | |
| 2019/0271991 A1 | 9/2019 | Dulmage et al. | |
| 2019/0303864 A1 | 10/2019 | Edwards et al. | |
| 2020/0001857 A1 | 1/2020 | Naylor et al. | |
| 2020/0001906 A1 | 1/2020 | Bramucci et al. | |
| 2020/0189631 A1 | 6/2020 | Gorman et al. | |
| 2021/0037341 A1 | 2/2021 | Joao | |
| 2022/0059935 A1 | 2/2022 | Zhang et al. | |

FOREIGN PATENT DOCUMENTS

| | | |
|---|---|---|
| CN | 103078615 A | 5/2013 |
| WO | 2019133824 A1 | 7/2019 |

OTHER PUBLICATIONS

Examination Report No. 1 for corresponding AU Application No. 2022202434 dated Jul. 18, 2023 (5 pages).
Examination Report No. 3 for corresponding AU Application No. 2022201616 dated Jul. 18, 2023 (3 pages).
Analog Devices LTC3350, High Current Supercapacitor Backup Controller and System Monitor (10 pages).
Burr-Brown, 1.2A PWM High-Side Driver for Solenoids, Coils, Valves, Heaters, and Lamps (26 pages).
Examination Report No. 1 for corresponding AU Application No. 2022201616 dated Mar. 9, 2022 (4 pages).
Search Report dated Jun. 22, 2022 for corresponding Indian Application No. 202114014004 (6 pages).

* cited by examiner

MONITORING AND COMMUNICATION DEVICE OF A VEHICLE

CROSS-REFERENCE TO RELATED APPLICATIONS

This application is a continuation-in-part of U.S. patent application Ser. No. 16/723,071, filed 20 Dec. 2019; is a continuation-in-part of U.S. patent application Ser. No. 16/730,681, filed 30 Dec. 2019; is a continuation-in-part of U.S. patent application Ser. No. 17/203,466, filed 16 Mar. 2021 (which claims priority to U.S. Provisional Application No. 62/993,274, filed 23 Mar. 2020); is a continuation-in-part of U.S. patent application Ser. No. 17/217,746, filed 30 Mar. 2021 (which claims priority to U.S. Provisional Application No. 63/018,911, filed 1 May 2020); is a continuation-in-part of U.S. patent application Ser. No. 17/313,888, filed 6 May 2021; is a continuation-in-part of U.S. patent application Ser. No. 17/313,502, filed 6 May 2021; claims priority to U.S. Provisional Patent Application No. 63/187,773, filed 12 May 2021; and claims priority to U.S. Provisional Patent Application No. 63/187,767, filed 12 May 2021. The entire disclosures of each of these applications are incorporated herein by reference.

BACKGROUND

Technical Field

The subject matter described herein relates to devices onboard vehicles that monitor operations of the vehicles and communicate with other devices onboard and/or off-board the vehicles.

Discussion of Art

Some vehicle systems have limited operational capability that can pose safety risks. For example, some rail vehicles do not have the ability to provide images or video of locations rear of the rail vehicles to an operator. This can prevent the operating engineer alone from being able to see if the rail vehicle can safely be backed up along a track. Instead, a spotter must exit the rail vehicle, walk to the back end of the rail vehicle, and communicate with the operating engineer onboard the rail vehicle about what the spotter sees behind the rail vehicle during backing up of the rail vehicle. This poses a safety risk to the spotter, especially in adverse weather conditions. Additionally, the time needed for the spotter to walk to the rear of the rail vehicle can be significant, and this technique can require additional personnel to operate the rail vehicle.

Certain vehicle systems include an end of vehicle device for communicating information related to the vehicle system to other portions of the vehicle system, and/or off board devices. For example, rail vehicle systems typically include a combination of propulsion vehicles, such as locomotives, and non-propulsion vehicles, such as cars. As a result, the rail vehicle systems can include numerous vehicles, where communication from the end of the vehicle device up to the head of the vehicle improves operation of the vehicle system.

The end of vehicle devices may include a transceiver that has an antenna for receiving and sending communication signals to and from the end of vehicle device. Often the antenna is within the end of vehicle device such that the housing may protect the antenna from the rough environment encountered by many vehicle systems.

High gain antennas may be used exterior to the end of the vehicle device. However, because of the rugged nature of most end of vehicle devices, the signal quality suffers in favor of antenna robustness. Additionally, the needed coupling strength for the end of vehicle device results in permanent fixtures that are difficult to replace. This results in significant maintenance time, and high maintenance costs.

Some known vehicle signaling and monitoring devices may be coupled with vehicle systems as the vehicle systems move along routes. The monitoring devices may monitor the vehicle systems and/or the routes along which the vehicle systems move. Optionally, the monitoring devices may be transferrable devices that may be moved from one vehicle to another vehicle, from one vehicle system to a storage facility, from a storage facility to a maintenance facility, or the like.

One technical problem of existing systems and methods is an inability to quickly and easily track large volumes (e.g., hundreds) of these monitoring devices. The devices may only report locations when the devices are activated. The devices may be deactivated when not in use and cannot report locations while deactivated. Additionally, tracking relies on human operators to record and report current locations, but given the large numbers of devices and frequent swapping out of devices, locations and statuses are rarely tracked or recorded accurately or in a timely manner.

For example, when monitoring devices are not in use by vehicle systems, the extra devices may be stored at a storage facility, railyard, or warehouse. However, unless a monitoring device is activated, an operator may not know how many devices are available for use, how many devices are in need of maintenance or repair, or how many devices may be unavailable because the devices are assigned to other vehicle systems. For example, an operator may believe that five hundred (500) monitoring devices are available for use, however, only four hundred (400) may actually be available for use because fifty may require repair or and fifty may be deactivated but assigned to or are coupled with other vehicle systems.

Many types of vehicles include metal body panels that can obstruct or interfere with the communication of wireless signals that impinge upon the metal panels. The interference can cause delayed message receipt, missed data packets, and/or degraded signal quality at the receiver device relative to unobstructed wireless communication pathways. Furthermore, cargo carried by some types of vehicles, such as transport vehicles, may also obstruct or interfere with wireless communications, even if the body of the vehicle does not. For example, rail-based flat cars may carry metal intermodal containers that can obstruct wireless communications. The obstructions can affect status messages, control messages, alert messages, and the like that are communicated between devices on different vehicles, such as different vehicles on a common vehicle system. Substantial obstruction can prevent the intended recipient device from receiving the message or prevent the recipient device from being able to interpret the contents of the message, which can have significant, undesired ramifications, such as reducing a level of control of the vehicle, triggering an automatic stop or slow order as a failsafe measure, or the like.

Vehicle signaling and/or monitoring devices may be transferably coupled with vehicle systems, and may move with the vehicle system as the vehicle system moves along the route. The monitoring devices may monitor the vehicle systems and/or the routes along which the vehicle systems move. The devices may be transferrable and moved from one vehicle to another vehicle, from one vehicle system to a storage facility, from a storage facility to a maintenance facility, or the like.

One technical problem with existing monitoring devices is the limitation of the antenna performance of the vehicle signaling and monitoring device. When used with vehicle systems that include plural vehicles, the monitoring device may be coupled with the last vehicle of the vehicle system, and may not have a direct line of sight to a lead vehicle of the vehicle system. Optionally, naturally and/or man-made obstacles may stand between the monitoring device and the lead vehicle. Additionally, the size of the monitoring device limits the size of an antenna that may be used within the device. The monitoring device may need to communicate data signals with the lead vehicle, however data signals communicated by the antenna that fits within the monitoring device may be unable to reach the lead vehicle, or the quality of the data signals may be compromised.

The monitoring devices may include light sources, referred to herein as marker lights, that emit light to indicate the location of the monitoring device to observers within a line of sight. For example, if a vehicle monitoring device is coupled to an end of a vehicle system, the marker lights can indicate the location of the end of the vehicle system, particularly in dark ambient environments. One technical problem with existing vehicle monitoring devices is that the vehicle monitoring devices may not be able to detect if a marker light is malfunctioning or non-functional. Delayed detection of a malfunctioning or inoperable marker light can result in the vehicle system traveling without proper light signaling to indicate the end of the vehicle system, which is a safety concern.

Another technical problem with existing vehicle monitoring devices coupled to vehicle systems is ensuring that safety critical components are properly functional, even if the safety critical components are only used in emergency situations. One such component is an emergency valve that is configured to initiate an emergency application of the brakes of the vehicle system to quickly stop the vehicle system in response to an emergency. The emergency may be, for example, the presence of an object, such as a vehicle or person, on the route ahead of the vehicle system. Emergency brake applications, though rarely utilized, are expected to perform as designed when needed.

Another technical problem with existing vehicle monitoring devices is limited power availability to power the various components of the vehicle monitoring device. When used with vehicle systems that include plural vehicles, the monitoring device may be coupled with the last vehicle of the vehicle system, and may not be electrically connected to an onboard electrical system of the vehicle system. The monitoring device may include an onboard battery that stores electrical energy used to power the operations of the monitoring device. The battery has limited charge capacity. Furthermore, the emergency valve may require supply of a certain threshold voltage in order to activate and provide the emergency brake application. If the battery or other onboard energy storage device does not have sufficient voltage to activate the emergency valve, the monitoring device may not be able to provide the safety critical emergency brake application.

Some end-of-train (EOT) devices with cameras that capture images behind the trains. There are growing privacy, social, and regulatory concerns about widespread use of cameras or other optical sensors, especially when the cameras or optical sensors are active or capturing image data when removed from the vehicles and/or while the vehicles are not operating.

Additionally, some known vehicle-mounted cameras or optical sensors may not be automatically activated to capture images or videos when certain events occur. These cameras or optical sensors mounted on a train or other vehicle may not be activated when certain movements associated with potential accidents or accidents occur. Consequently, accident reconstruction evidence may not include images or videos that otherwise would have been captured by the cameras or optical sensors.

Needs exist for improved control of cameras or other optical sensors mounted to vehicles to prevent generating image data when removed from the vehicles or the vehicles are not operating, as well as to control the cameras or sensors to generate image data of events occurring contemporaneous with certain events that may be connected to or associated with vehicle accidents.

BRIEF DESCRIPTION

In one example, a monitoring device includes a camera or other optical sensor configured to be disposed at a trailing end of a first vehicle system. The camera or other optical sensor is configured to output one or more images or video of a field of view behind the first vehicle system. The monitoring device also includes a controller configured to receive output from one or more sensors and to activate the camera or other optical sensor to output the one or more images or video based on the output from the one or more sensors. The output from the one or more sensors indicates one or more of a change in movement of the first vehicle system, a temperature, an acoustic sound, or movement of a second vehicle system.

In another example, a method for monitoring a vehicle system includes sensing one or more of a change in movement of a first vehicle system, a temperature, an acoustic sound, or movement of a second vehicle system; activating a camera or other optical sensor disposed at a trailing end of the first vehicle system responsive to sensing the one or more of the change in movement of the first vehicle system, the temperature, the acoustic sound, or the movement of the second vehicle system; and generating one or more images or video of a field of view behind the first vehicle system responsive to activating the camera or other optical sensor.

In another example, another method includes sensing one or more of a tilting orientation of a monitoring device having a camera or other optical sensor and configured to be coupled to an end of a multi-vehicle system, a pressure of a fluid in a brake system of the multi-vehicle system using a pressure sensor of the monitoring device, or movement of the monitoring device using a motion sensor of the monitoring device; and activating one or more of the camera or other optical sensor or a communication device of the monitoring device responsive to sensing the one or more of the tilting orientation of the monitoring device, the pressure of the fluid in the brake system, or movement of the monitoring device, wherein the camera or other optical sensor is capable of capturing data within a field of view of the camera or other optical sensor and the communication device is capable of communicating one or more images or video from the camera or other optical sensor only once the camera or other optical sensor and the communication device are activated.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to monitoring and communication devices of a vehicle in a single- or multi-vehicle system. The monitoring and communication devices can be referred to as end-of-vehicle devices, vehicle control systems, signaling and monitoring devices, or the like. In one embodiment, the monitoring and communication devices can be an EOT device. In another embodiment, the monitoring and communication devices can be a head-of-train (HOT) device. In another embodiment, the monitoring and communication devices can be another device disposed onboard a rail vehicle or a non-rail vehicle.

In one example, the monitoring and communication devices can monitor characteristics of a vehicle system to determine whether movement of the vehicle system has changed. Responsive to determining that the movement has changed, the monitoring and communication devices can change a state of or otherwise allow for an indicator device to provide an advisory signal to notify others of the change in movement of the vehicle system. In one example that relates to rail vehicle systems, the monitoring and communication devices can allow for a horn or other indicator device on a rear most or trailing rail vehicle in the rail vehicle system to be activated from an operator on another rail vehicle in the rail vehicle system. For example, responsive to determining that the rail vehicle system is beginning rearward movement, the monitoring and communication devices can allow an operator on a leading rail vehicle to activate the horn to warn others of the rearward movement of the rail vehicle system. Optionally, the monitoring and communication devices can activate an optical sensor (such as a camera) on the back end of the vehicle system and/or otherwise initiate display of images or video from the optical sensor onboard the leading vehicle in the vehicle system (to allow the operator to see behind the vehicle system).

While one or more embodiments are described in connection with a rail vehicle system, not all embodiments are limited to rail vehicle systems. Unless expressly disclaimed or stated otherwise, the inventive subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

Figure 1:
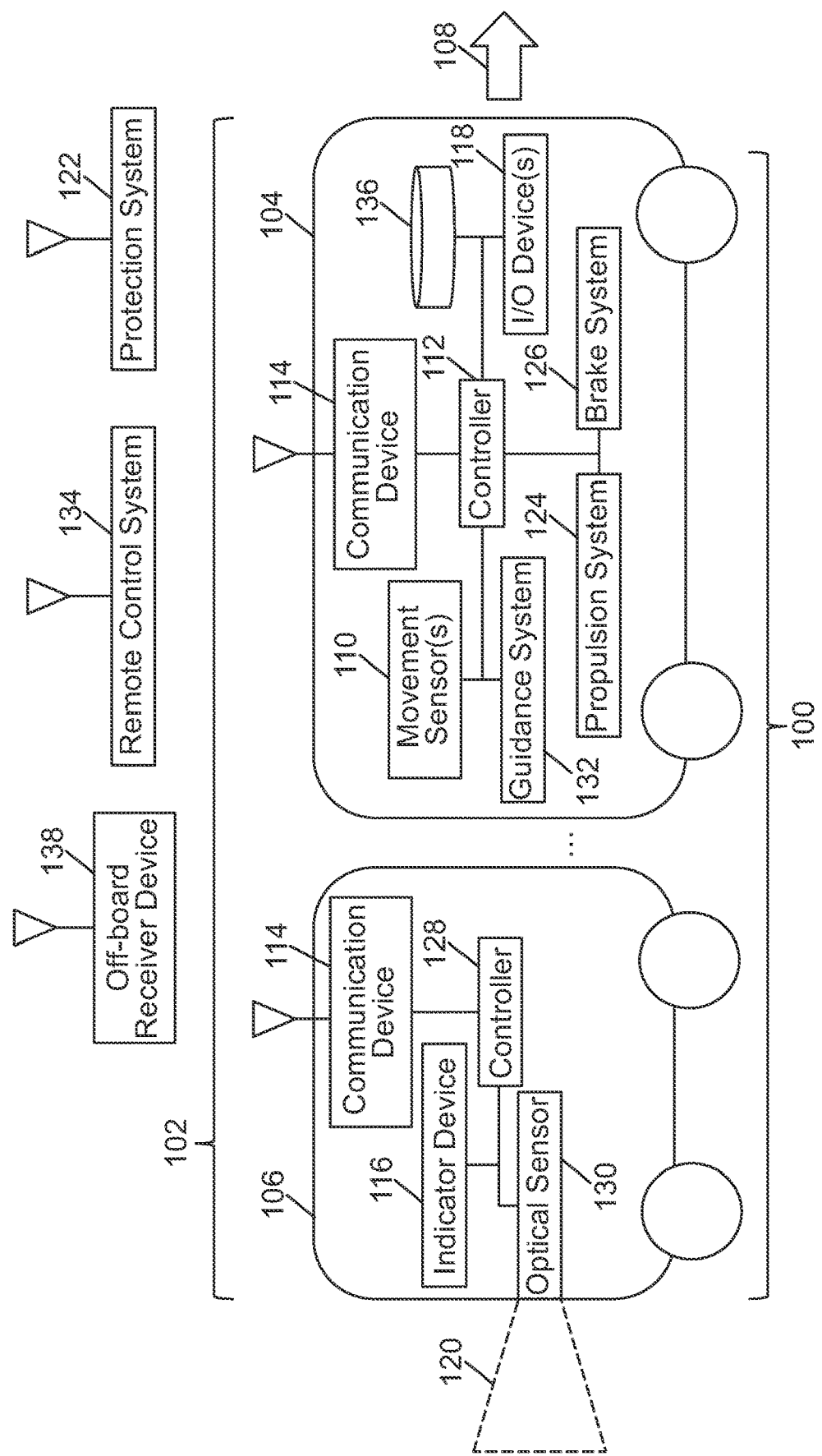
FIG. 1 illustrates one example of a vehicle control system.

FIG. 1 illustrates one example of a vehicle control system 100. The control system can be partially or entirely disposed onboard a vehicle system 102. The vehicle system can be formed from plural vehicles 104, 106 (as shown in FIG. 1). Alternatively, the vehicle system can be formed from a single vehicle (e.g., the vehicle 104). Although not shown in FIG. 1, one or more additional intermediate vehicles may be disposed between the vehicles shown in FIG. 1. The vehicle 104 may be referred to as a lead or leading vehicle and the vehicle 106 may be referred to as a trail or trailing vehicle. In one embodiment, the leading vehicle may be disposed at a front, leading, or head end of the vehicle system along a direction of movement 108 of the vehicle system. The trailing vehicle may be at the back, trailing, or opposite end of the vehicle system. Alternatively, the leading vehicle may not be at the front, leading, or head end of the vehicle system and/or the trailing vehicle may not be at the opposite end of the vehicle system.

The control system optionally includes a movement sensor 110 configured to monitor one or more characteristics of the vehicle system that indicate movement of the vehicle system. Alternatively, the movement sensor may not be included in the control system and/or may be disposed off-board the vehicle system. The movement sensor can be an input device (e.g., touchscreen, button, lever, switch, etc.) that is actuated by an operator (onboard or off-board the vehicle system) to indicate or control the direction in which the vehicle system moves. With respect to rail vehicles, the movement sensor can be a reverser handle that is actuated to begin reverse movement of the vehicle system (e.g., in a direction that is opposite to the movement direction shown in FIG. 1).

As another example, the movement sensor can measure acceleration, speed, changes in location, changes in a magnetic field, or the like, that indicates which direction the vehicle system is moving. The movement sensor can include or represent a global positioning system receiver, an accelerometer, a tachometer measuring a direction of rotation (e.g., of wheels, a propeller, or the like), a wireless triangulation system, a Hall effect sensor, etc. Optionally, the movement sensor can be a camera system (that captures and/or examines changes in images or video that indicate movement of the vehicle system), radar system, LiDAR system, or the like. For example, the movement sensor can be off-board the vehicle system and capture images of the vehicle system to determine which direction the vehicle system is moving.

A controller 112 of the control system may be disposed onboard the lead vehicle. This controller can be referred to as a lead controller as operation of the controller can be associated with the lead vehicle. Alternatively, the controller 112 may be located elsewhere in the vehicle system (other than the lead vehicle). As described below, however, the designation of a controller as the lead controller can be based on which controller of the vehicle system is communicating with an off-board protection system 122 (described below). As a result, the designation of a controller as a lead controller can change such that different controllers onboard the vehicle system may be identified as a lead controller at different times, regardless of which vehicle that the lead controller is located on. The lead controller includes or represents hardware circuitry that includes and/or is coupled with one or more processors (e.g., microprocessors, integrated circuits, field programmable gate arrays, or the like) that perform or direct the operations described herein in connection with the lead controller.

The lead controller can receive output from the movement sensor that indicate the characteristics of the vehicle system that are monitored. For example, the lead controller can receive signals via wired and/or wireless connections that indicate changes in location, changes in speed, changes in heading, or the like, of the vehicle system. In the event that the movement sensor is off-board the vehicle system, the lead controller can receive the output from the movement sensor via a communication device 114. The communication device can represent transceiving circuitry and associated hardware, such as modems, antennas, or the like.

The lead controller can examine the output from the movement sensor and determine whether the vehicle system is beginning different movement based on the characteristic(s) monitored by the movement sensor. In one embodiment, the different movement is rearward movement. For example, the lead controller can determine whether the vehicle system is transitioning from a stationary state (e.g., not moving in any direction relative to a surface on which the vehicle system is disposed) to rearward movement (e.g., movement in a direction that is opposite of the direction of movement shown in FIG. 1). Alternatively, the lead controller can determine whether the vehicle system is changing from a stationary state to movement in any direction, changing from forward or rearward movement to movement along a transverse (e.g., angled) direction, or the like.

The trailing vehicle can include an indicator device 116 that generates an advisory or warning signal. The indicator device optionally can be referred to as a warning device. The indicator device can include or represent a horn that is activated to generate a loud, audible sound as the warning signal to warn others in the vicinity of the trail vehicle that the vehicle system is changing movement (e.g., backing up).

Figure 2:
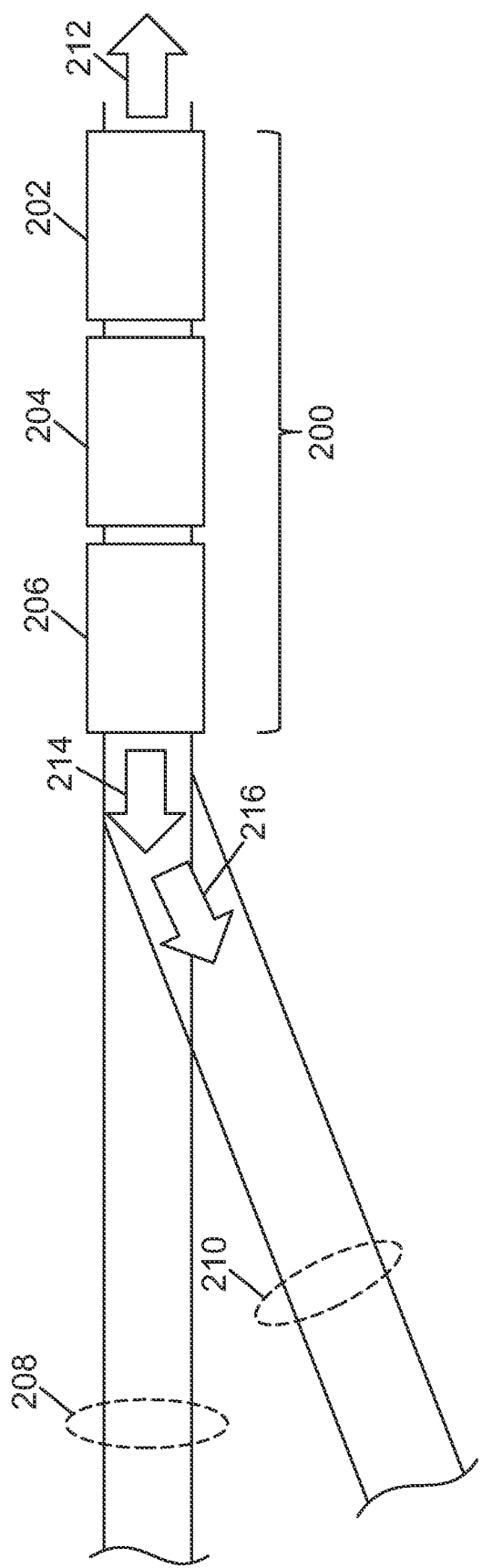
FIG. 2 illustrates some examples of movement of a vehicle system.

In one embodiment, the lead controller can receive input from an operator via one or more input and/or output devices 118 ("I/O Device(s)" in FIG. 2). The input and/or output devices can include touchscreens, buttons, levers, switches, keyboards, pedals, display devices, or the like. This input can direct the activation of the indicator device. For example, responsive to the input and/or output device being actuated by an operator onboard the lead vehicle, the lead controller or the input and/or output device can send a control signal to the indicator device. This control signal may activate the indicator device (e.g., to generate a sound or output another signal).

In one embodiment, the lead controller can prevent the indicator device from generating an output unless and/or until the lead controller determines that the vehicle system is changing movement. For example, while moving in a forward direction or stationary, the lead controller can prevent the horn from generating sound. Actuation of the input and/or output device onboard the lead vehicle by an operator may be prevented by the lead controller from reaching the horn or the lead controller can otherwise prevent the horn from generating a sound. Responsive to the lead controller determining that the movement of the vehicle system has changed (e.g., the vehicle system is beginning rearward movement), the lead controller can allow the horn to be actuated. This can allow the operator onboard the lead vehicle to activate the horn on the trail vehicle to generate a sound responsive to the vehicle system beginning rearward movement. This also can prevent the operator onboard the lead vehicle from activating the horn until the rearward or other different movement begins.

The lead controller can prevent the indicator device from being activated from the lead vehicle by switching the indicator device from a first state to a second state, or by keeping the indicator device in the second state unless and/or until the different movement is detected. In one example, the first state is an active state during which the indicator device can be controlled to generate the warning or advisory signal (e.g., generate the sound) and the second state is an inactive state during which the indicator device cannot generate the warning or advisory signal. In another example, the first state is a remote state and the second state is a local state. The indicator device may be able to be activated from signals sent or originating from the lead vehicle while in the remote state, but may only be able to be activated from signals sent or originating from the trailing vehicle while in the local state (and is not able to be activated from signals sent or originating from the lead vehicle). In another example, the indicator device may remain able to be activated regardless of the movement direction or change in movement direction, but the operator onboard the lead vehicle may only be able to provide input to activate the indicator device in response to the change in movement (e.g., starting rearward movement). For example, the input and/or output device may be a touchscreen that displays a graphical object that can be touched by the operator to activate the indicator device. This graphical object may only be displayed in response to detecting the change in movement and may not be displayed unless and/or until the change in movement is detected.

The trailing vehicle optionally can include an optical sensor 130 that can sense information within a field of view 120 of the optical sensor. The optical sensor can be a camera that outputs images and/or videos representing the area or volume within the field of view. In the illustrated embodiment, the optical sensor may be oriented such that the field of view captures an area or volume rear of the trailing vehicle along the direction of movement shown in FIG. 1. For example, while the vehicle system moves in an opposite (e.g., rearward) direction, the field of view may be an area or volume ahead of the direction in which the vehicle system is moving. The optical sensor alternatively may be another sensor that optically senses information within the field of view in another way. For example, the optical sensor may be a LiDAR system, a radio frequency identification (RFID) reader, etc.

In one embodiment, the optical sensor, controller 128, indicator device, and/or communication device 114 can be included in or can collectively represent a monitoring and communication device as described herein.

The data that is output by the optical sensor can be communicated from the optical sensor to the input and/or output device(s) of the lead vehicle. For example, the images and/or videos can be communicated from the optical sensor to the input and/or output device(s) for display to the operator.

The lead controller can prevent the data that is output from the optical sensor from being displayed on the input and/or output device(s) unless and/or until the movement of the vehicle system changes direction. For example, while the vehicle system is moving forward or is stationary, the data that is output from the optical sensor may not be displayed on the input and/or output device. But, responsive to determining that the vehicle system is moving in a backward (e.g., rearward) direction, the data output by the optical sensor may be displayed to the operator on the input and/or output device(s) onboard the lead vehicle. The lead controller can prevent the display of the optical sensor data by controlling a state of the optical sensor (e.g., turning the optical sensor off or to an inactive state to prevent display and turning the optical sensor on or to an active state to display the data), by controlling a state of the input and/or output device (e.g., turning a display device off or to an inactive state to prevent display and turning the display device on or to an active state to display the data), or the like.

Alternatively, the indicator device may not be deactivated with respect to all operators onboard the vehicle system at all times. For example, during non-reversing movement of the vehicle system, the indicator device may not be able to be activated by the operator onboard the lead vehicle of the vehicle system, but may be able to be activated by another operator onboard another vehicle (e.g., the trailing vehicles) of the vehicle system. That is, the indicator device may not be completely turned off from use by all operators. The indicator device may then be able to be activated by the operator onboard the lead vehicle responsive to (and only if) the vehicle system is moving in a reversing direction. In one embodiment, the indicator device may still be able to be activated by other operators during reversing movement (e.g., operators onboard the trailing vehicle). Alternatively, the indicator device may only be able to be activated by the operator(s) in the lead vehicle during reversing movement (e.g., operators onboard the trailing vehicle are not able to activate the indicator device).

The allowing or preventing of activation of the indicator device and/or display of optical sensor data can be controlled without deactivating or turning off the indicator device, display device, and/or optical sensor. That is, the indicator device, display device, and/or optical sensor may remain active and on, but not able to generate a warning signal or display video in the lead locomotive unless the vehicle system is moving in the designated direction (e.g., backward). For example, the indicator device, display device, and/or optical sensor may not change states based on a change in movement direction of the vehicle system. Instead, the lead controller can establish a communication channel (e.g., via the communication devices and/or wired connections) responsive to determining that the vehicle system is moving in a designated direction (e.g., backward). For example, the lead controller can establish wired and/or wireless communication channel(s) (or otherwise permit communication of data) between the lead controller and the indicator device responsive to determining that the vehicle system is backing up. The lead controller can then direct the indicator device to generate a sound or otherwise communicate a warning signal, as described above. But the lead controller can eliminate or prevent data communication between the lead controller and the indicator device responsive to determining that the vehicle system is not backing up. This can prevent the lead controller from directing the indicator device to generate a sound or otherwise communicate a warning signal, as described above.

As another example, the lead controller can establish wired and/or wireless communication channel(s) (or otherwise permit communication of data) between the optical sensor and the input and/or output device responsive to determining that the vehicle system is backing up. The optical sensor can then communicate images and/or videos to the input and/or output devices for display onboard the lead vehicle, as described above. But, the lead controller can eliminate or prevent data communication between the optical sensor and the input and/or output device responsive to determining that the vehicle system is not backing up. This can prevent the images and/or videos from being displayed onboard the lead vehicle, as described above.

FIG. 2 illustrates some examples of movement of a vehicle system 200. The vehicle system shown in FIG. 2 can represent the vehicle system 102 shown in FIG. 1. For example, a vehicle 202 of the vehicle system 200 can represent the lead vehicle 104, a vehicle 206 of the vehicle system 200 can represent the trailing vehicle 106, and an intermediate vehicle 204 of the vehicle system can represent another vehicle 104, 106 or another type of vehicle. The vehicle system is shown on a first route 208 that intersects or meets with a second route 210. These routes can be tracks, roads, paths, or the like.

The vehicle system 200 can be headed along the route 208 along a movement direction 212. The vehicle system may then stop and begin moving in an opposite movement direction 214. The lead controller can prevent the indicator device from being activated and/or prevent optical sensor output from being displayed on the lead vehicle 202 responsive to determining the movement of the vehicle system in the direction 214, as described herein. As another example, the vehicle system 200 can be headed along the route 202 in the direction 214, with the vehicle 206 representing the lead vehicle 104 and the vehicle 202 representing the trailing vehicle 106. The lead controller can prevent the indicator device from being activated and/or prevent optical sensor output from being displayed on the lead vehicle 206 responsive to determining the movement of the vehicle system has changed from the direction 214 to a transverse direction 216 (e.g., left of the direction 208).

Returning to the description of the control system shown in FIG. 1, in one embodiment, the vehicle system may communicate with one or more off-board systems and/or devices. As one example, the vehicle system may communicate with an off-board protection system 122 that communicates with the vehicle system and other vehicle systems traveling within an area associated with the protection system. The protection system can monitor the status of routes and/or vehicle systems in the associated area and communicate signals to the vehicle systems that prevent the vehicle systems from entering into identified segments of routes and/or allow the vehicle systems to enter into the identified segments of the routes. The protection system can represent hardware circuitry that includes and/or is connected with one or more processors and transceiving hardware (e.g., a communication device as described herein).

The protection system may be a positive protection system that communicates positive signals to vehicle systems. These signals indicate that a vehicle system can enter into an upcoming segment of a route. If a controller onboard the vehicle system does not receive a positive signal from the protection system for an upcoming segment of the route, then the controller may prevent the vehicle system from entering into the upcoming segment. For example, the controller can automatically control a propulsion system 124 (e.g., one or more engines, motors, propellers, etc.) from propelling the vehicle system into the upcoming segment, automatically control a brake system 126 (e.g., one or more friction brakes, air brakes, regenerative brakes, etc.) to stop the vehicle system from entering into the upcoming segment, automatically steer the vehicle system in a direction that prevents the vehicle system from entering into the upcoming segment, etc. Although not shown in FIG. 1, the trailing vehicle also can include a propulsion system 124 and/or brake system 126.

Alternatively, the controller of the vehicle system can prevent the vehicle system from entering into an upcoming segment unless a positive signal is received by preventing commands input by the operator of the vehicle system from controlling the propulsion system and/or brake system from moving the vehicle system into the upcoming segment (unless and/or until the positive signal is received). One example of such a positive control system is a positive train control system.

The protection system may be a negative protection system that communicates negative signals to vehicle systems. These signals are communicated to indicate that a vehicle system cannot enter into an upcoming segment of a route. If a controller onboard the vehicle system does not receive a negative signal from the protection system for an upcoming segment of the route, then the controller allows the vehicle system to enter into the upcoming segment. The controller may only prevent the vehicle system from entering into the upcoming segment if the negative protection system sends a negative signal (indicating that the vehicle system cannot enter into the upcoming route segment).

The vehicle system may include several controllers onboard different vehicles. For example, each of two or more propulsion-generating vehicles 104, 106 in the vehicle system may each include a controller. As described above, the lead vehicle may include the lead controller. The trailing vehicle may include a trail controller 128. The trail controller can be a controller like the lead controller but disposed onboard the trailing vehicle. In one embodiment, the protection system may communicate with one controller of the vehicle system to ensure that multiple controllers are not receiving signals from the protection system and separately acting upon the signals. The control system may designate or identify one of the controllers 112, 128 as the lead controller in one embodiment. The controller designated or identified as the lead controller can be the controller that communicates with the protection system and that controls movement of the vehicle system based on signals received from the protection system. The designation or identification of which controller 112, 128 is the lead controller can change, regardless of where the controller designated or identified as the lead controller is located in the vehicle system.

For example, during a first period of time, the controller 112 onboard the lead vehicle can be the lead controller as this controller 112 is receiving signals from the protection system and using these signals to control (e.g., restrict) the movement of the vehicle system. The controller 112 can send control signals to the controller 128 during this first period of time to remotely control or direct how the controller 128 controls operation of the propulsion system and/or brake system of the trailing vehicle. The controller 128 can be coupled with a communication device 114 onboard the trailing vehicle to communicate with the controller 112 and/or other off-board devices and/or systems.

During a subsequent second period of time, the control system may switch to the controller 128 onboard the trailing vehicle as the lead vehicle. The controller 128 then becomes the controller of the vehicle system that receives the signals from the protection system and uses these signals to control the movement of the vehicle system. The controller 128 can send control signals to the controller 112 during this second period of time to remotely control or direct how the controller 112 controls operation of the propulsion system and/or brake system of the trailing vehicle.

In one embodiment, the control system can change which of the controllers is the lead controller that communicates with the protection system to control movement of the vehicle system based on the change in movement that is detected. For example, during movement of the vehicle system along a first direction, the controller 112 may be designated as the lead controller that communicates with the protection system to control movement of the vehicle system. But, responsive to determining that movement of the vehicle system has changed to a different direction (or that reverse movement has begun from a stationary state), the controller 128 may be designated as the lead controller that communicates with the protection system to control movement of the vehicle system. The controllers 112, 128 can determine which controller 112, 128 is to be designated as the lead controller based on the change in movement that is detected, as described above.

As described above, the indicator device may be activated (or capable of being activated) from the lead vehicle and/or the output from the optical sensor may be displayed onboard the lead vehicle responsive to determining a change in movement direction of the vehicle system. Optionally, the indicator device may be activated or capable of being activated and/or the optical sensor output may be displayed responsive to both the change in movement direction being detected and the vehicle system being at a designated location. The characteristics of the vehicle system that are monitored by the movement sensor can be a location of the vehicle system. A tangible and non-transitory computer-readable storage medium (e.g., a memory 136) may be disposed onboard the vehicle system and accessible to one or more of the controllers. This memory can be a computer hard drive, a removable computer disk, an optical disc, or the like. The memory can store locations associated with features of interest along the routes on which the vehicle system travels or may travel. The features of interest can be crossings of one type of route over another type of route (e.g., a crossing of a road over a track), intersections between the same type of routes, sidings, depots, warehouses, urban areas, or other operator-defined features.

When a change in direction occurs (e.g., from forward to reverse, from stationary to reverse, or another change in direction), the lead controller can determine whether the vehicle system is at or within a designated proximity (e.g., fifty meters) of a feature of interest stored in the memory. If the change in direction is detected and the vehicle system is at or within the designated proximity of the feature of interest, then the lead controller can activate or allow activation of the indicator device and/or permit the optical sensor output to be displayed onboard the lead vehicle. But, if the change in direction is detected and the vehicle system is not at or within the designated proximity of the feature of interest, then the lead controller can prevent or otherwise not activate or allow activation of the indicator device and/or not permit the optical sensor output to be displayed onboard the lead vehicle.

Optionally, the control system can dictate whether the indicator device can be activated and/or the optical sensor output is displayed when controlled by a system other than a human operator onboard the vehicle system. For example, the vehicle system may include a guidance system 132 that is at least partially onboard the vehicle system. The guidance system can represent one or more processors and associated circuitry that determine operational settings for the vehicle system to use while traveling along one or more routes. These operational settings may be throttle settings, brake settings, speeds, accelerations, etc. that are associated by the guidance system with different locations along the route, different times, and/or different distances along the route.

The guidance system can determine the operational settings to drive the vehicle system toward one or more objectives, such as reducing emission generation, reducing fuel consumption, reducing wear, reducing audible noise, or the like, relative to the vehicle system not traveling according to the operational settings. The operational settings determined by the guidance system also can dictate whether the indicator device is activated and/or the optical sensor output is shown onboard the lead vehicle. The lead controller of the control system can restrict when these operational settings can activate the indicator device and/or display the optical sensor output on the lead locomotive based on the detected change in direction and/or location of the vehicle system, as described herein. For example, the lead controller can prevent the indicator device from being activated and/or the optical sensor output from being displayed even though the guidance system directs either of these actions to occur if the lead controller does not determine that the vehicle system has changed direction and/or is not at a designated location.

A remote control system 134 disposed off-board the vehicle system can remotely control movement of the vehicle system. The remote control system can represent one or more processors and associated circuitry that send control signals to the lead controller from off-board the vehicle system. These signals can direct the lead controller how to move the vehicle system. One or more operators at the remote control system can provide input that is used to generate and send these control signals. The control signals from the remote control system may direct the indicator device to activate and/or the optical sensor output to be displayed onboard the lead vehicle. But, the lead controller can prevent either or both of these actions from occurring unless the change in movement is detected (e.g., the vehicle system begins reversing) and/or the vehicle system is at the designated location, as described above.

The indicator device is described as being a horn or other device that generates sounds to warn others of the movement of the vehicle system. Optionally, the indicator device can include or instead be one or more lights that are illuminated to provide the warning signal. For example, instead of or in addition to generating sound, the indicator device may activate a light as the warning signal.

In another example, the indicator device may be coupled with the communication device (e.g., onboard the trailing vehicle and/or the lead vehicle) and can issue one or more warning signals to off-board devices responsive to being activated. These off-board devices can include receiver devices 138 that include transceiving circuitry and associated hardware (e.g., modems, antennas, etc.) for wirelessly communicating with the communication device(s) of the vehicle system. Instead of or in addition to the indicator device generating a sound and/or activating a light, the indicator device can communicate a wireless signal via the communication device. This wireless signal can be broadcast and/or transmitted to one or more of the receiver devices. As one example, the receiver device can be a device that is held or worn by personnel that are off-board the vehicle system, such as maintenance personnel, an operator of the vehicle system that has temporarily de-boarded the vehicle system, or another person off-board the vehicle system. As another example, the receiver device can be a wayside assembly, such as a signal light, a horn, or the like, alongside the route. As another example, the receiver device can be onboard another vehicle or vehicle system. Responsive to receiving the signal from the indicator device, the receiver device(s) can notify others of the change in direction of the vehicle system. For example, the receiver device(s) can activate a light, generate a sound, display a message, vibrate, etc., to warn a holder, user, or person nearby the receiver device(s) of the vehicle system changing direction.

Figure 3:
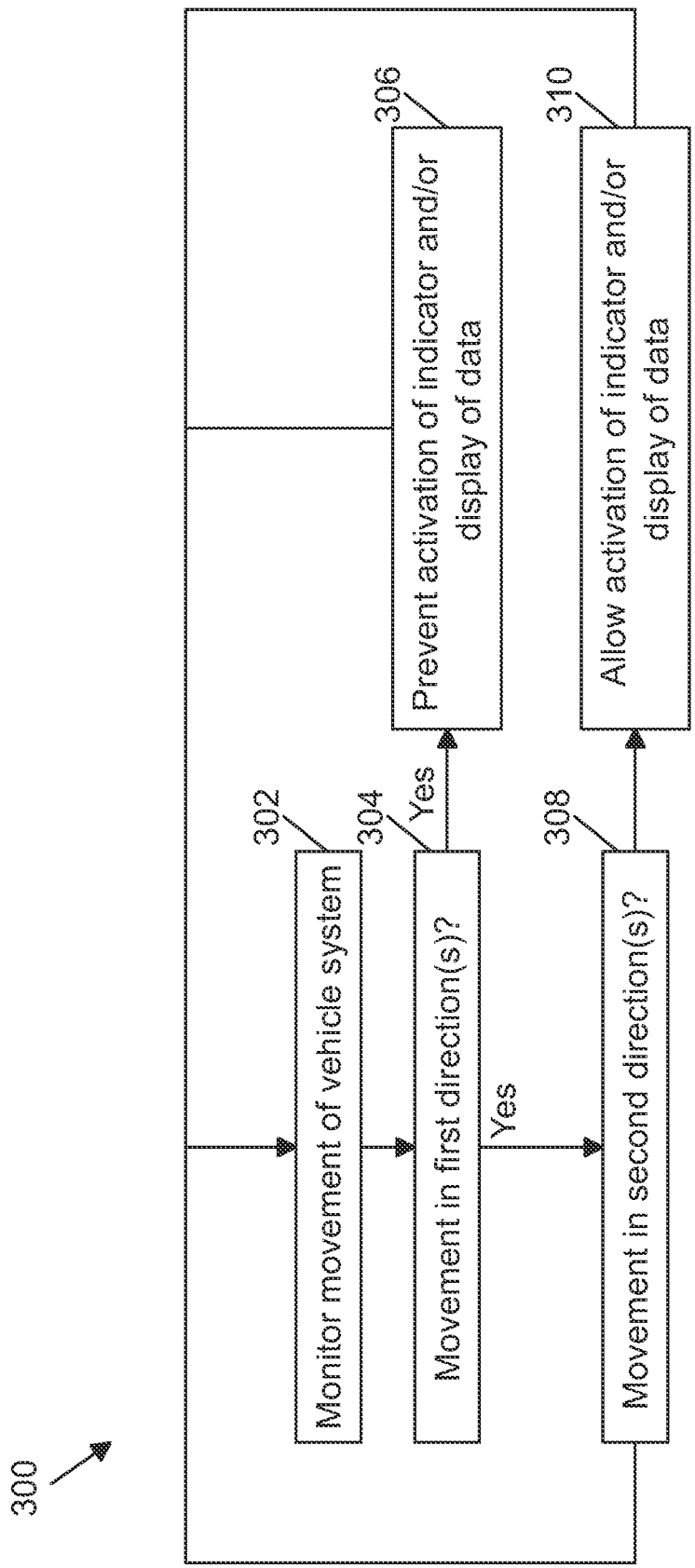
FIG. 3 illustrates a flowchart of one example of a method for controlling operation of a vehicle system.

FIG. 3 illustrates a flowchart of one example of a method 300 for controlling operation of a vehicle system. The method represents operations that may be performed by the control system (e.g., by the controllers of the control system) and/or the monitoring and communication device to determine whether to activate or allow activation of an indicator device and/or to allow display of optical sensor output onboard a lead vehicle in response to detecting a change in movement, such as reverse movement. At step 302, movement of the vehicle system is monitored. For example, the direction in which the vehicle system is moving may be determined. As another example, the direction in which the vehicle system begins to move from a stationary state can be determined. Alternatively, a change in movement of the vehicle system can be identified (e.g., turning right, turning left, etc.). At step 304, a determination is made as to whether the movement of the vehicle system is in one or more first directions. The first direction(s) may be a forward direction relative to the direction in which the vehicle is oriented to move on the route. For example, the forward direction may be the same direction in which the operator's seat faces in the vehicle. Alternatively, the first directions may be a set of different directions, such as all non-reversing directions (e.g., directions that are not rearward movement of the vehicle system).

If the movement of the vehicle is in the first direction(s), then the method may prevent an indicator device from sounding or sending an alarm or warning and/or may prevent images and/or video from being displayed in the vehicle from which the operator is controlling the vehicle system. For example, the method can prevent a horn from generating a sound and/or from a display device to show images and/or videos to prevent distracting the operator. As a result, flow of the method 300 can proceed toward step 306.

At step 306, an indicator is prevented from being generated and/or presentation of optical sensor data is prevented from being displayed. For example, the indicator device can be prevented from being activated to issue an advisory or warning signal. The data output from the optical sensor can be prevented from being displayed onboard the lead vehicle from which an operator is controlling the vehicle system. Flow of the method 300 can then return toward step 302 to continue monitoring movement of the vehicle system or may terminate.

But, if the movement of the vehicle system is determined to not be in the first direction(s) at step 304, then flow of the method 300 can proceed toward step 308. At step 308, a determination is made as to whether the movement of the vehicle system is in one or more second direction(s). In one embodiment, the second direction(s) is a single direction-a reversing or backward direction. For example, the reversing or backward direction may be the opposite direction in which the operator's seat faces in the vehicle. Alternatively, the second directions may be a set of different directions, such as the directions that are not the first directions.

If the movement of the vehicle is in the second direction(s), then the method may allow an indicator device to sound or send an alarm or warning and/or may allow images and/or video from being displayed in the vehicle from which the operator is controlling the vehicle system. As a result, flow of the method 300 can proceed toward step 310.

At step 310, an indicator is allowed to be generated and/or optical sensor data is allowed to be displayed. For example, the indicator device can be allowed to be activated to issue an advisory or warning signal. The data output from the optical sensor can be allowed to be displayed onboard the lead vehicle from which an operator is controlling the vehicle system. Flow of the method 300 can then return toward step 302 to continue monitoring movement of the vehicle system or may terminate.

In one embodiment, a system includes a controller configured to determine that a vehicle system is beginning rearward movement based on one or more characteristics of the vehicle system that are monitored by a movement sensor. The controller is configured to control a warning device that sounds a notification to one or more locations off-board the vehicle system. The controller is configured to prevent the warning device from controlling the warning device to generate the notification while the vehicle system is moving in a direction other than the rearward movement. The controller also is configured to allow the warning device to generate the notification responsive to determining that the vehicle system is beginning the rearward movement. The warning device can include a horn and the controller can be configured to allow the horn to generate one or more sounds that are audible off-board the vehicle system as the notification.

The controller also can be configured to prevent data output from an optical sensor from being displayed onboard the vehicle system while the vehicle system is moving in the direction other than the rearward movement. The controller can be configured to permit display of the data output by the optical sensor onboard the vehicle system. The controller can be configured to allow the data output by the optical sensor to be displayed such that one or more of image data or video data indicative of an area ahead of the rearward movement of the vehicle system is displayed to an onboard operator.

The vehicle system can be formed from plural vehicles traveling together along one or more routes with an onboard operator disposed on a first vehicle of the plural vehicles and the warning device disposed on a second vehicle of the plural vehicles. The first vehicle can be a leading end vehicle of the plural vehicles and the second vehicle can be a trailing end vehicle of the plural vehicles.

The controller can be a first controller configured to be disposed onboard the first vehicle and to remotely control operation of a second controller disposed on the second vehicle. The second controller can take control of the first controller to remotely control operation of the first controller responsive to determining that the vehicle system is beginning the rearward movement.

The movement sensor can monitor a location of the vehicle system as at least one of the one or more characteristics of the vehicle system. The controller can be configured to determine whether the location that is monitored by the movement sensor and where the rearward movement of the vehicle system is beginning is a designated location. The controller also can be configured to prevent the warning device from generating the notification while either the location is not the designated location or the vehicle system is not moving in the rearward direction. The controller can be configured to allow the warning device to generate the notification while both the location is the designated location and the vehicle system is moving in the rearward direction.

In one embodiment, a method includes determining that a vehicle system is moving in a first direction and deactivating a warning device onboard the vehicle system responsive to determining that the vehicle system is moving in the first direction. The warning device can be configured to sound a notification to one or more locations off-board the vehicle system but preventing an onboard operator from controlling the warning device to sound the notification while the warning device is deactivated. The method also includes determining that the vehicle system is moving in a different, second direction, and activating the warning device responsive to determining that the vehicle system is moving in the second direction, the warning device configured to be controlled by the onboard operator to sound the notification responsive to the warning device being activated.

The first direction and the second direction can be opposite directions. The first direction can be a forward movement direction of the vehicle system and the second direction can be a rearward movement direction of the vehicle system.

The method also can include preventing display of one or more of image data or video data to the onboard operator while the vehicle system is moving in the first direction, and displaying the one or more of the image data or the video data to the onboard operator while the vehicle system is moving in the second direction. The one or more of the image data and/or the video data can show an area ahead of rearward movement of the vehicle system.

The vehicle system can be formed from plural vehicles traveling together along one or more routes with the onboard operator disposed on a first vehicle of the plural vehicles and the warning device is disposed on a second vehicle of the plural vehicles. The first vehicle can be a leading end vehicle of the plural vehicles and the second vehicle is a trailing end vehicle of the plural vehicles.

In one embodiment, a system includes a movement sensor configured to monitor one or more characteristics of a multi-vehicle system that indicate movement of the multi-vehicle system and an optical sensor configured to be disposed on a trailing propulsion-generating vehicle of the multi-vehicle system. The optical sensor is configured to output one or more of image data or video data showing an area behind the trailing propulsion-generating vehicle of the multi-vehicle system. The system also includes a controller configured to determine that the multi-vehicle system is beginning movement in a designated direction based on the one or more characteristics that are monitored by the movement sensor. The controller is configured to initiate display of the one or more of the image data or the video data onboard a leading propulsion-generating vehicle of the multi-vehicle system while the movement of the multi-vehicle system is in the designated direction. The controller configured to prevent display of the one or more of the image data or the video data onboard the leading propulsion-generating vehicle of the multi-vehicle system while the movement of the multi-vehicle system is not in the designated direction. The movement in the designated direction can be rearward movement of the multi-vehicle system.

The controller can be configured to activate a warning device onboard the trailing propulsion-generating vehicle from a deactivated state to an activated state responsive to the movement of the multi-vehicle system in the designated direction beginning. The warning device can be prevented from being controllable from off-board the trailing propulsion-generating vehicle to sound a warning while in the deactivated state. The warning device can be controllable from off-board the trailing propulsion-generating vehicle to sound the warning while in the activated state. The movement sensor can monitor a location of the multi-vehicle system as at least one of the one or more characteristics of the multi-vehicle system. The controller can be configured to switch from preventing display of the one or more of the image data or the video data to displaying the one or more of the image data or the video data responsive to (a) the location monitored by the movement sensor being a designated location and (b) the movement of the multi-vehicle system being in the designated direction. The movement sensor can be configured to output a position of a manually actuated device onboard the multi-vehicle system as the one or more characteristics.

One or more embodiments of the subject matter described herein also relate to a high gain antenna that can be removeably coupled to the exterior of a monitoring and communication device of a vehicle. When used herein, gain, or antenna gain, refers to how well an antenna is converting input power into radio waves that are headed in a specific direction. The gain may also be considered the ratio of the power produced by the antenna from a far-field source on the antenna's beam axis to the power produced by a hypothetical lossless isotropic antenna that is equally sensitive to signals from all directions. In addition, the gain is considered the average gain of the antenna. The units of gain as referred herein are decibels-isotropic (dBi).

To address the rugged environment of the monitoring and communication device, while also achieving a gain in a range between 0-20 dBi, a hollow conductive member is provided that has a flexible support member disposed therein. When used herein, flexible refers to any material having a modulus of elasticity for Young's modulus of less than ten Giga Pascals 10 GPa. In particular, the modulus of elasticity of the flexible support member is less than the modulus of elasticity of the conductive member. The flexible support member extends the length of the hollow conductive member and absorbs forces placed on the hollow conductive member. Upon receiving a force from the hollow conductive member, the flexible support member flexes accordingly to displace the force along the flexible support member. In this manner, the force does not damage the hollow conductive member through shearing or bending of the hollow conductive member material. Specifically, the resistance of the hollow conductive member to deformations, or kinking, of the cross section due to the flexible support member results in the antenna surviving in the conditions present in transportation systems, leading to increased life and decreased costs due to replacement.

Additionally, if replacement or repair is desired, the hollow conductive member additionally may be secured to a coupling element with a replaceable coupling such as a threaded exterior that may be matingly received by the threads of a corresponding threaded opening in the monitoring and communication device. Therefore, when repair or replacement of the antenna is desired, the antenna may be quickly removed for maintenance, or replaced by another antenna.

Figure 4:
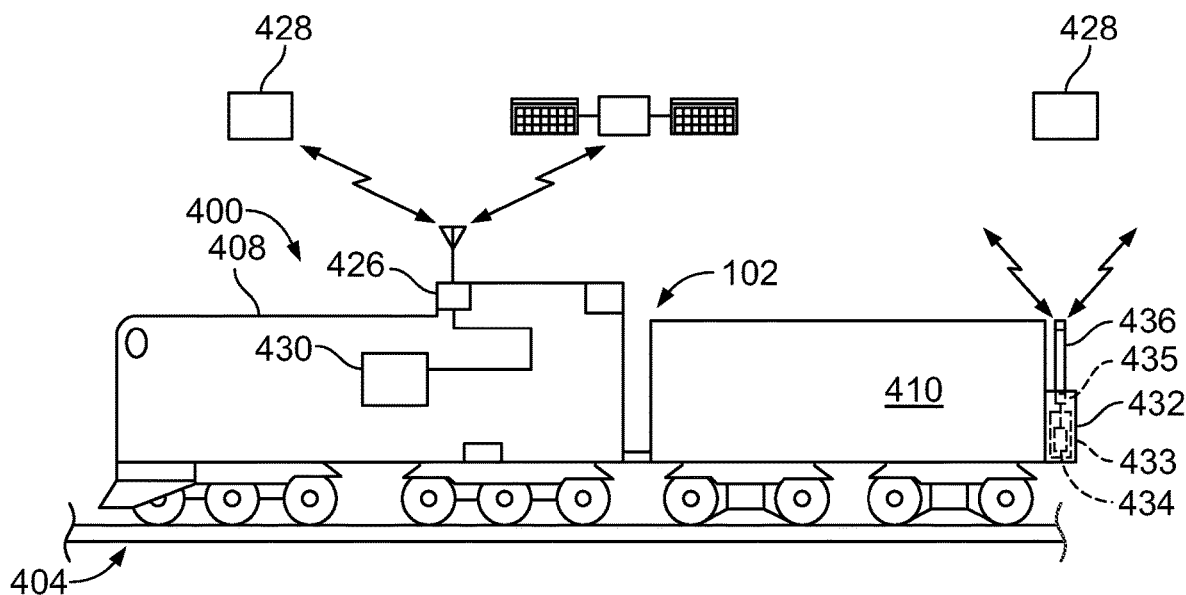
FIG. 4 illustrates another example of a vehicle system.

FIG. 4 illustrates another example of a control system 400 according to an embodiment. The control system is disposed on the vehicle system 102. The vehicle system is configured to travel along a route 404 on a trip from a starting or departure location to a destination or arrival location. The vehicle system includes one or more vehicles. For example, the vehicle system may include one or more propulsion-generating vehicles 408. Optionally, the vehicle system may include one or more non-propulsion-generating vehicles 410. In embodiments where the vehicle system includes two or more vehicles, the vehicles may be mechanically interconnected with each one. Alternatively, the vehicles of such a multi-vehicle vehicle system may not be mechanically coupled with each other. For example, the vehicles may be separate but logically coupled with each other by communicating with each other to move along one or more routes as a group (e.g., a convoy).

In one embodiment, the vehicle system may be a rail vehicle system, and the route may be a track formed by one or more rails. The propulsion vehicle may be a locomotive, and the car may be a rail car that carries passengers and/or cargo. Alternatively, the propulsion vehicle may be another type of rail vehicle other than a locomotive. In an alternative embodiment, the vehicle system may be one or more automobiles, marine vessels, aircraft, mining vehicles, agricultural vehicles, or other off-highway vehicles (OHV) system (e.g., a vehicle system that is not legally permitted and/or designed for travel on public roadways), or the like. While some examples provided herein describe the route as being a track, not all embodiments are limited to a rail vehicle traveling on a railroad track. One or more embodiments may be used in connection with non-rail vehicles and routes other than tracks, such as roads, paths, waterways, or the like.

The propulsion-generating vehicle includes a propulsion subsystem that generates tractive effort to propel the vehicle system. This propulsion subsystem can include components such as traction motors that propel the vehicle system. The propulsion-generating vehicle also can include a braking system that generates braking effort for the vehicle system to slow down or stop the vehicle system from moving. Optionally, the non-propulsion-generating vehicle includes a braking system but not a propulsion subsystem. The propulsion-generating vehicle is referred to herein as a propulsion vehicle, and the non-propulsion-generating vehicle is referred to herein as a car. Although one propulsion vehicle and one car are shown in FIG. 4, the vehicle system may include multiple propulsion vehicles and/or multiple cars. In an alternative embodiment, the vehicle system only includes the propulsion vehicle such that the propulsion vehicle is not coupled to the car or another kind of vehicle.

The control system controls the movements of the vehicle system. In one example, the control system is disposed entirely on the propulsion vehicle. In other embodiments, however, one or more components of the control system may be distributed among several vehicles, such as the vehicles that make up the vehicle system. For example, some components may be distributed among two or more propulsion vehicles that are coupled together in a group or consist. In an alternative embodiment, at least some of the components of the control system may be located remotely from the vehicle system, such as at a dispatch location. The remote components of the control system may communicate with the vehicle system (and with components of the control system disposed thereon).

The control system may include a communication system 426 that communicates with vehicles in the vehicle system and/or with remote locations, such as a remote (dispatch) location 428, other vehicle systems, etc. The communication system may include a receiver and a transmitter, or a transceiver that performs both receiving and transmitting functions. The communication system may also include an antenna and associated circuitry.

The control system has a controller 430 or control unit that is a hardware and/or software system which operates to perform one or more functions for the vehicle system. The controller receives information from components of the control system, analyzes the received information, and generates operational settings for the vehicle system to control the movements of the vehicle system.

The vehicle system may also include a monitoring and communication device 432 that also may be referred to as an end-of-vehicle device. The monitoring and communication device may be coupled to a back end of the last vehicle of the vehicle system, or may be positioned in another location on the same vehicle or another vehicle in the vehicle system. The monitoring and communication device may include portions of a communication system 433, including a transceiver 434 disposed therein that is operated by the controller. The monitoring and communication device in one example may include an antenna 436 for receiving communication signals and sending communication signals as described herein. In particular, a matching circuit 435 may be provided to convert communication signals of the transceiver to be communicated by the antenna. In one example, the antenna may be a high gain antenna that has an antenna gain of at least 1.5 dBi. In one example, the antenna gain is in a range between 2 dBi and 5 dBi. The antenna may also have a length in a range between slightly less than half a wave of a communication signal and ⅝s of a wave of a communication signal.

Figure 5:
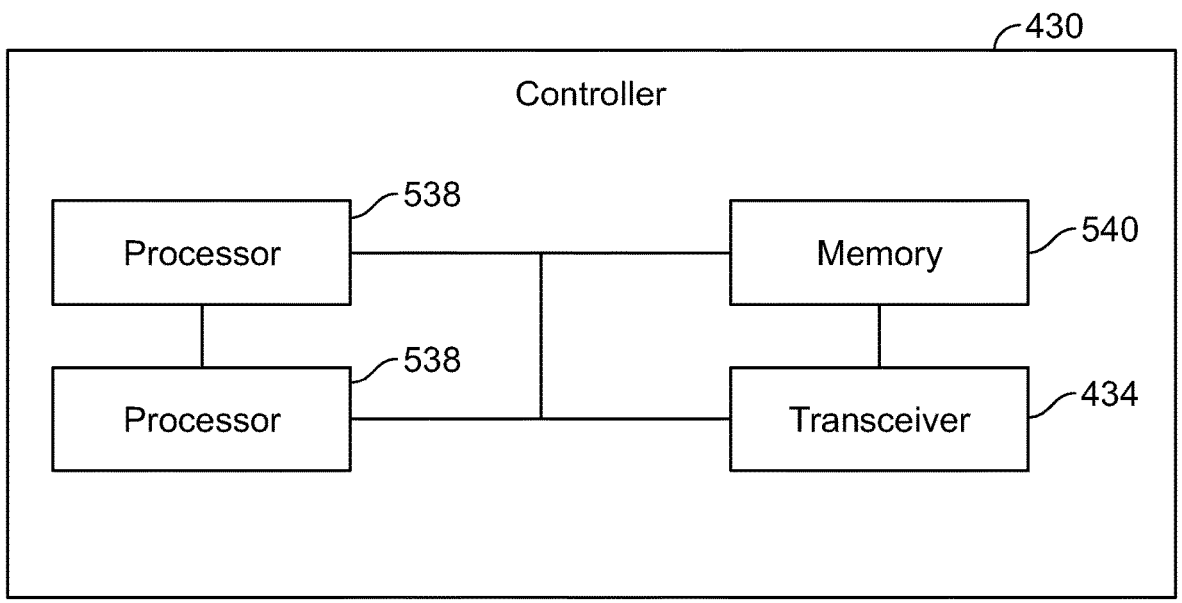
FIG. 5 illustrates another example of a vehicle control system.

FIG. 5 provides a schematic illustration of the controller of the control system that may be operable to control communication to and from the transceiver of the monitoring and communication device. While in the example embodiment of FIG. 5 the controller is illustrated as associated with a lead vehicle, in other examples, the controller of FIG. 5 may be in the monitoring and communication device. To that end, the controller of FIG. 5 may be in the monitoring and communication device and communicate with a second controller at the lead vehicle or another vehicle. The controller may include one or more processors 538. Each processor may include a microprocessor or equivalent control circuitry. At least one algorithm may operate within the one or more processors.

The controller optionally may also include a controller memory 540, which is an electronic, computer-readable storage device or medium. The controller memory may be within the housing of the controller, or alternatively may be on a separate device that may be communicatively coupled to the controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The controller memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like.

Optionally, the controller may be configured to communicate at least some operational settings designated by the controller in a communication signal. The communication signal may be related to a sensor reading, including a GPS reading, vehicle parameters such as speed, heading, fuel efficiency, etc., vehicle identification information, or the like. In another example, the control signal may be directed to a user interface device that displays and/or otherwise presents information to a human operator of the vehicle system. In this manner, the controller is operable to cause the communication of the communication signals from a monitoring and communication device to the head of the vehicle to an operator. Alternatively, the control may cause communication of the communication signals from a monitoring and communication device to a remote location, such as to a dispatch.

Figure 6:
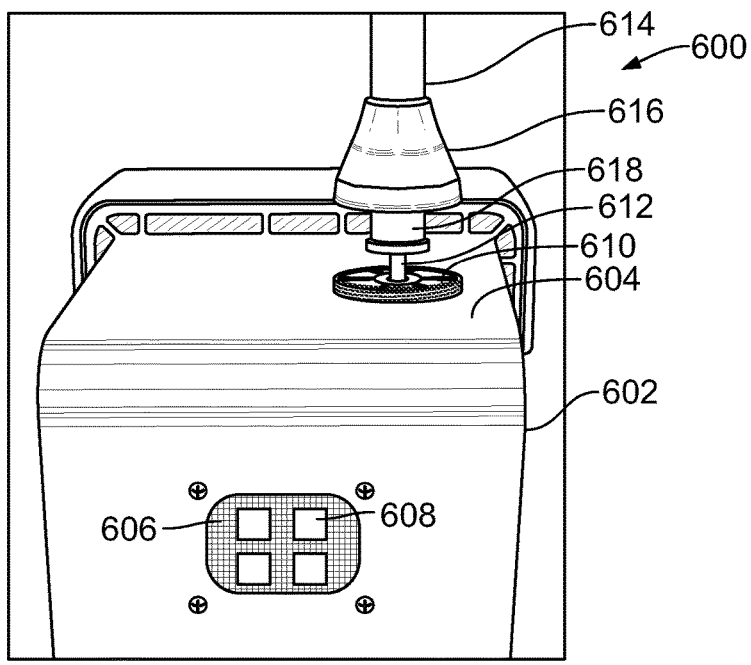
FIG. 6 illustrates a side perspective view of one example of a monitoring and communication device of a vehicle.
Figure 7:
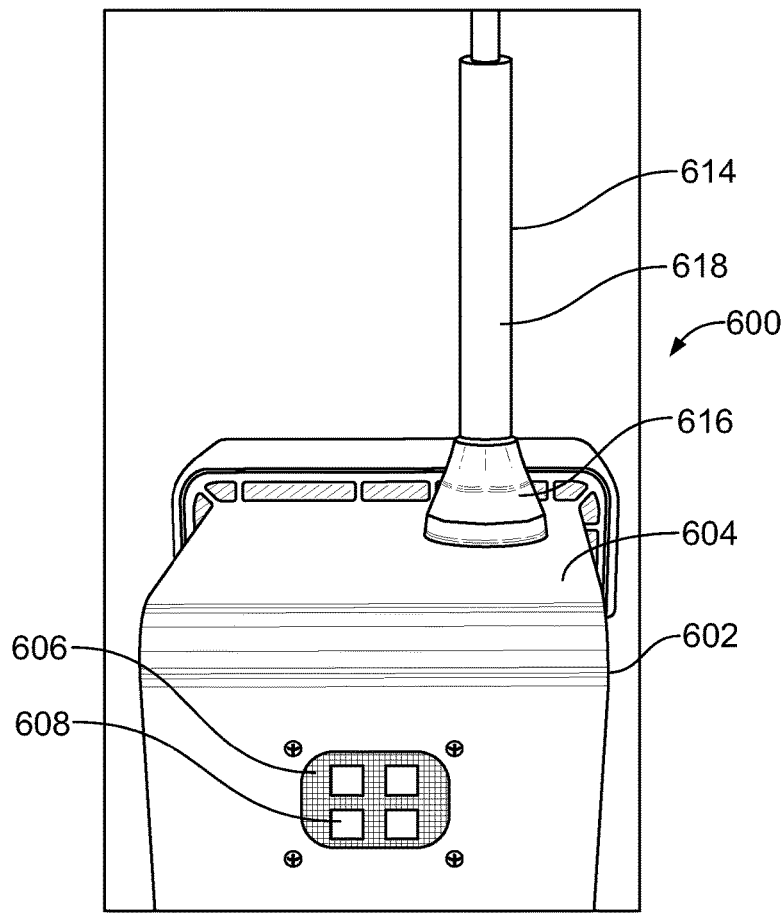
FIG. 7 illustrates a side perspective view of the monitoring and communication device shown in FIG. 6.
Figure 8:
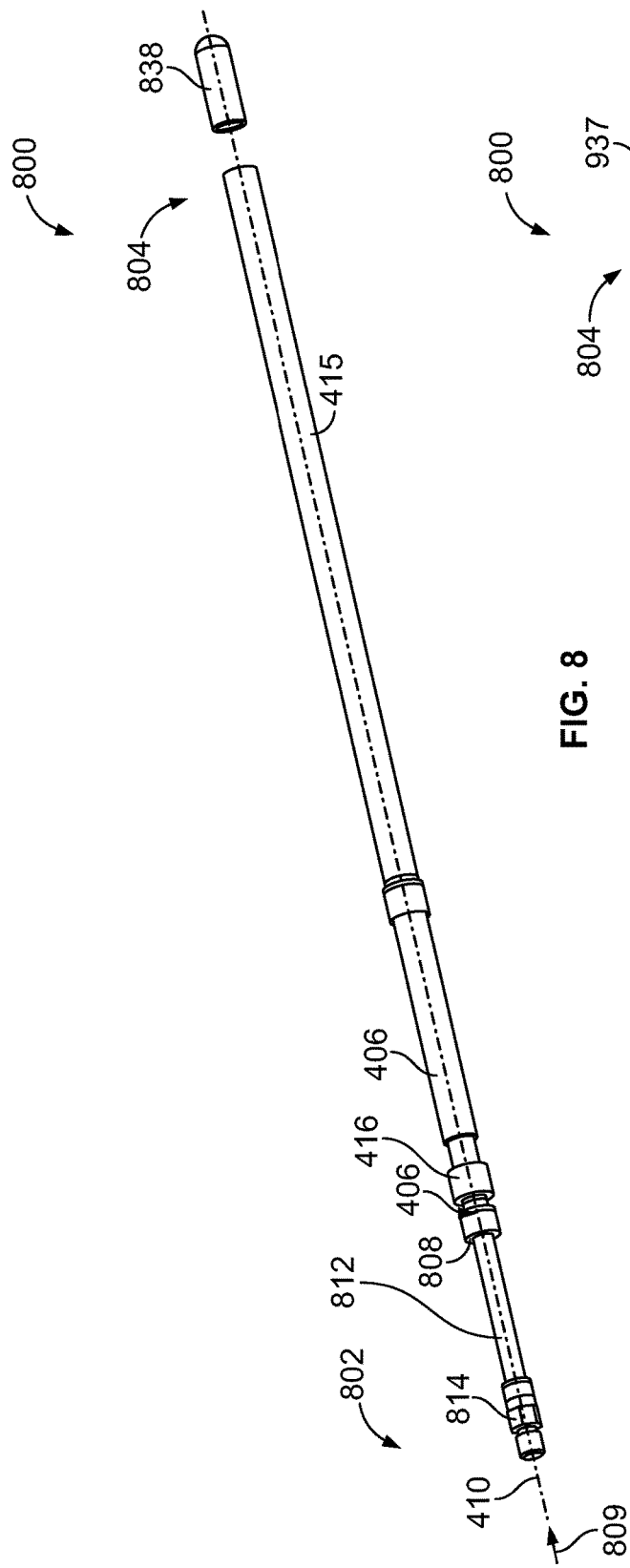
FIG. 8 illustrates an exploded view of one example of an antenna.
Figure 9:
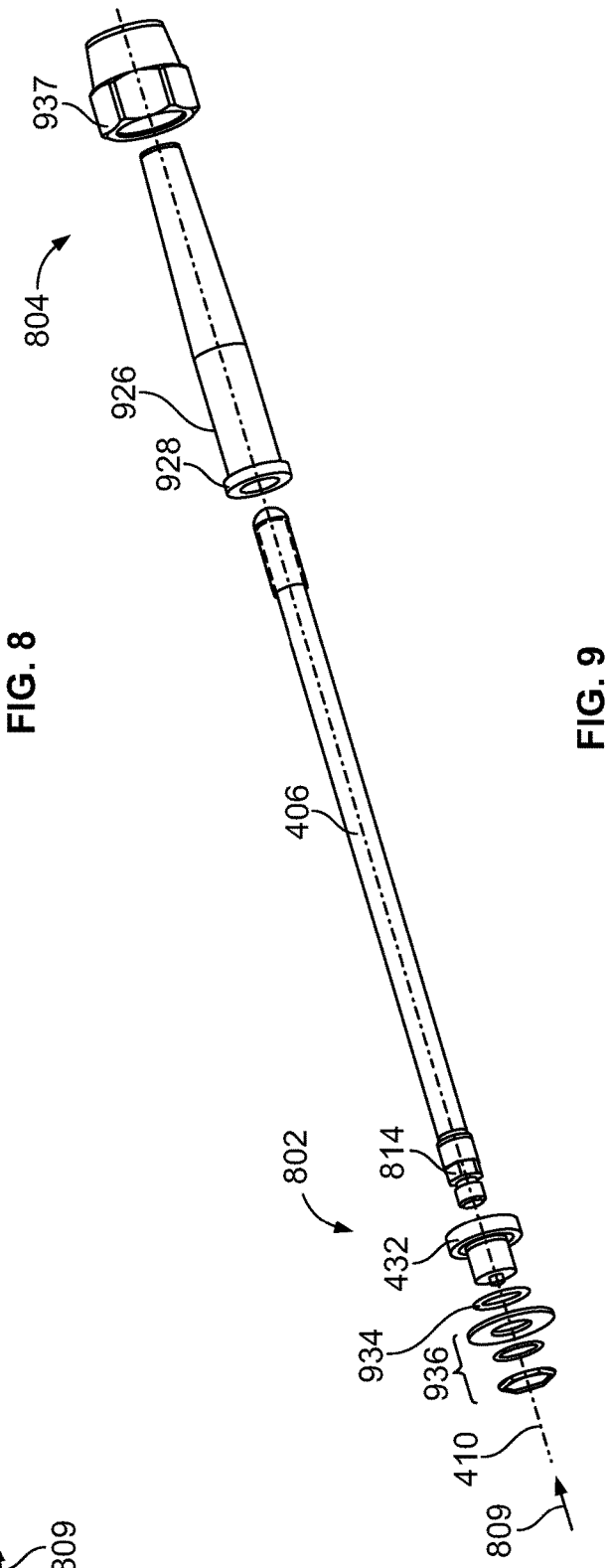
FIG. 9 illustrates another exploded view of the antenna shown in FIG. 8.
Figure 10:
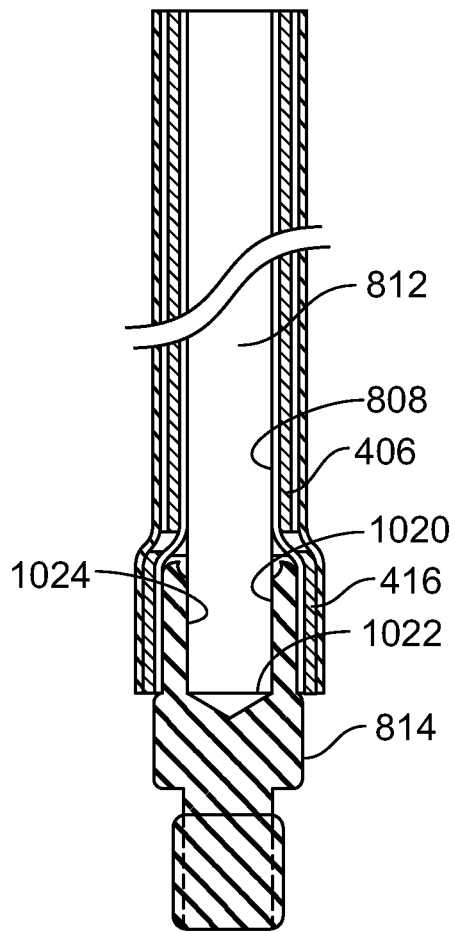
FIG. 10 illustrates a sectional view of the antenna shown in FIG. 8.
Figure 11:
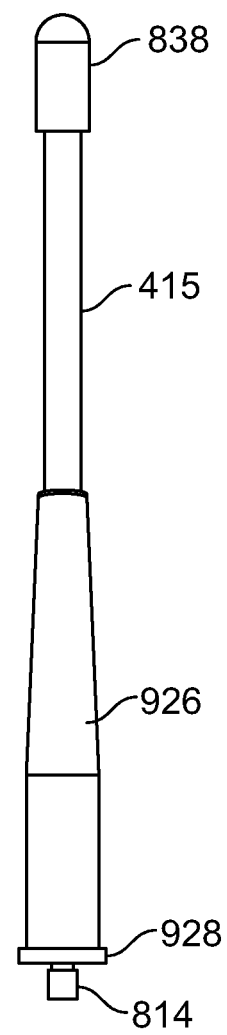
FIG. 11 illustrates an elevational view of the antenna shown in FIG. 8.

FIGS. 6 and 7 illustrate side views of one example of a monitoring and communication device 600. The device shown in FIGS. 6 and 7 can represent one example of the monitoring and communication device 432 and/or a monitoring and communication device that includes the components 114, 116, 128, 130 in FIG. 1. The monitoring and communication device includes a housing 602 having an exterior 604. The housing may be made of any material, including metal to prevent wear. In one example, the housing has a generally rectangular cross section. In some examples, the monitoring and communication device may include a warning light 606, a warning sound device (e.g., a speaker), sensor(s) 608, etc. Similarly, the monitoring and communication device may be configured to house a control system, including a controller and transceiver. In one example, the control system and controller are remote from the monitoring and communication device, whereas in other examples, the control system and controller are within the monitoring and communication device.

The monitoring and communication device as illustrated in FIG. 6 includes an opening that receives a threaded coupling disc 610 that includes a coupling element 612. While illustrated as circular, the threaded coupling disc may be other cross section shapes. Similarly, instead of threads, tabs, snap fits, or other mechanical coupling mechanisms may be provided. The coupling element provides a communication path between the transceiver within the monitoring and communication device and an antenna 614 that removably couples to the exterior of the monitoring and communication device. In particular, a sealing coupling element 616 that includes mating threads that are received by the threads of the threaded coupling disc. In one example, the sealing coupling element may be a retaining nut that when threaded to the coupling disc engages the exterior of the housing to seal the coupling point between the antenna and monitoring and communication device. In one example, the sealing coupling element may be made of metal, though alternatively, the coupling element may be plastic, a flexible material such as rubber, or the like. In alternative embodiments, the coupling element may include tab openings, corresponding snap fits, or other corresponding mechanical coupling structure, etc. to provide a removable coupling. By having a removable coupling, the antenna may be quickly coupled to the exterior of the monitoring and communication device. In this manner, maintenance or replacement of the antenna is facilitated. The antenna may also include a boot 618 for providing additional strain relief at the base of the antenna. In one example, the boot may be made of a flexible material such as rubber to provide additional strain relief.

FIGS. 8 through 11 illustrate an example antenna 800. The antenna shown in FIGS. 8 through 11 can represent one or more examples of the antennas otherwise shown and/or described herein. The antenna extends from a first end 802 to a second end 804. The antenna includes a conductive member 406 having a hollow interior 808.

In one example, the conductive member may be formed of a copper braid material. By using copper braid as opposed to thin stainless steel or nickel based material, the conductive member may have a larger diameter and resulting higher bandwidth than antennas that use stainless steel or nickel based material. In one example, the nickel based material is included in a composite with titanium. Thus, by using copper braid material instead of steel or nickel based materials, better antenna performance and efficiency may be achieved. In one example the gain of the antenna is in a range between 0 and 20 dBi. In addition, the copper braid may also be more flexible than other metals, also providing an additional advantage.

The conductive member operably couples to a transceiver within the monitoring and communication device such that a communication path 809 may extend longitudinally along a center axis 410 of the antenna that is considered the beam axis of the antenna. The communication path is where communication signals to the antenna are received and provided to the transceiver, and are received from the transceiver and sent to locations remote of the monitoring and communication device. To this end, the communication signals may be sent to a remote communication device such as a dispatch, or alternatively may be sent to a communication device on-board the vehicle, such as a head of vehicle communication device.

Disposed within the hollow interior of the conductive member may be a flexible support member 812. The flexible support member may be elongated and extend from the first end to the second end. In one example, the flexible support member may be made of one-piece construction, while alternatively, the flexible support member may be made from multi-piece construction. In particular, in a multi-piece construction, the individual portions of the flexible support member may be spaced from one another and still be considered a flexible support member. The flexible support member may directly engage the interior wall of the interior. Alternatively, a secondary cushioning material such as foam, insulation, or the like may be disposed between the flexible support member and the interior wall of the conductive member.

The flexible support member may be formed of plastic, rubber, or the like. In particular, the flexible support member may be made from a material having a modulus of elasticity for Young's modulus of less than 10 GPa. In another example, the modulus of elasticity for Young's modulus is in a range between 0.01 GPa to 0.1 GPa. In another example, the modulus of elasticity for Young's modulus is in a range between 1 GPa and 5 GPa. The flexible support member may be a urethane rubber. In particular, the modulus of elasticity of the flexible support member may be less than the modulus of elasticity of the conductive member. Therefore, where the modulus of elasticity using Young's modulus for the flexible support member may be less than 10 GPa, the modulus of elasticity using Young's modulus for the flexible support member may be greater than 100 GPa such as when copper or another metal is used.

The flexible support member functions to receive force from the conductive member. The force received may be a stress, strain, compressive force, etc. The force may be experienced as a result of the environment of the antenna. In this manner, the force may be applied by wind, bumps, getting hit with debris, getting hit by a worker, etc. The force may be received directly from the conductive member, or passed through an intermediary material. Once the flexible support member receives the force, the flexible support member absorbs and displaces the force along the flexible support member. In particular, the flexible support member flexes to move back and forth. Because the flexible support member receives and absorbs the force from the conductive member, the conductive member may absorb significantly more force before breaking, shearing, bending, deforming, etc. In an experiment an antenna with a conductive member and flexible support member was dropped from ten feet onto concrete without breaking, shearing, bending, deforming, etc. the antenna. The reason the antenna was able to withstand the force of the fall without damage was because the flexible support member effectively absorbed the forces placed on the conductive member.

Because the flexible support member absorbs the forces placed on the conductive member, the conductive member may be made of a material such as copper braid that provides significantly enhanced signal performance over more robust materials such as stainless steel or nickel based materials. Additionally, because the flexible support member extends the length of the conductive member from the first end to the second end, forces experienced all along the conductive member may be absorbed. This is an improvement over a whip-type antenna that may include a flexible base, but may still be damaged by materials and individuals hitting the antenna.

The antenna may also include additional protection. In one example, a polymer-based layer 415 provides additional protection. This polymer-based layer can be a heat shrink layer in one example may be a heat shrink tubing that may surround and secure to the exterior of the conductive member. Heat shrink tubing may be a plastic based material that may be secured to the conductive member via heating to provide additional abrasion protection for the conductive member. Alternatively, the polymer-based layer can be a polymer coating or other protective layer. As a result, a thin protective layer may be formed around the conductive member. To this end, while the flexible support member prevents bending, breaking, and other impact type damage to the conductive member, the heat shrink layer may prevent scratches and other surface damage that may affect performance of the conductive member. Alternatively, plating may be provided. Though, if plated, to prevent radio frequency resistance, the plating may be a metal that has a higher conductivity than copper such as silver, gold, platinum, or the like.

A coupling element 814 may be secured to the conductive member with a fastening device 416. The coupling element may be a fitting that may include a threaded exterior for coupling with corresponding threads in a coupling disc of the monitoring and communication device. Alternatively, the coupling element may include snap fits, tabs, other mechanical couplings, or the like, that may include a corresponding coupling element of the monitoring and communication device. By using a coupling element such as mating threads, the antenna may be quickly installed and removed. Compared to other high gain antenna that can take over thirty minutes to remove and install, the antenna of this disclosure may be removed and replaced in less than two minutes. Consequently, significant time savings for maintenance and repair is realized.

In one example, the fastening device may be a crimp ring that crimps the conductive element together with the coupling element. Alternatively, other fastening devices may include a press fit, adhesives, or the like may be used to secure the coupling element to the conductive element.

The coupling element may also include a hollow interior 1020 (shown in FIG. 10) that forms a cavity that includes an end wall 1022 and sidewall 1024 that in one example may have a circular cross-section. The flexible support member may be inserted into the cavity to engage the end wall. In one example an adhesive may be used to secure the flexible support member to the sidewall and/or end wall to secure the flexible support member partially within the coupling element.

A boot 926 (shown in FIG. 9) may be placed over the fastening device and surround the exterior of the conductive member to engage the exterior of the monitoring and communication device when the coupling element has been inserted into the end of the vehicle device. The boot may include an arcuate flange 928 (shown in FIG. 9) extending around a base that may engage an adapter 432. The arcuate flange provides additional stability and transfer of forces for strain relief. In one example, the boot may be flexible, including made of a plastic material, rubber material, etc. The adaptor is provided to provide a coupling between the transceiver and the antenna as needed and also includes an arcuate flange for engaging the arcuate flange of the boot to provide additional strain relief. The adapter in one example is the circular disc, and provides a coupling at the exterior of a monitoring and communication device. In this manner, the adapter may be considered included as part of the end of vehicle device, or as part of the antenna. A sealing element 934 (shown in FIG. 9) such as an O-ring, and fastening members 936 (shown in FIG. 9) such as washers, lock washers, hex nuts, or the like may be provided to provide a secured sealing coupling between the antenna and monitoring and communication device to prevent debris, dust, water, or other contaminants from entering the monitoring and communication device.

In the illustrated embodiment, a sealing coupling element 937 may be provided that includes a threaded interior that threads into the periphery of the arcuate flange of the adapter. In one example, the sealing coupling element may be a retaining nut that engages the exterior of the monitoring and communication device. For example, the sealing coupling element may be an annular or ring-shaped body that extends over the conductive member and the polymer-based layer to engage the monitoring and communication device (e.g., the housing of this device). Upon engagement of the monitoring and communication device, the sealing coupling element provides a seal to prevent debris or other material within the interior of the monitoring and communication device. In one example, the sealing coupling member may be made of a metal material, flexible material, etc.

A cap 838 may be provided at the first end of the conductive member. The cap may be made of a flexible material to provide additional protection to the conductive member from water or other environmental contaminants. In addition, the cap functions to prevent individuals from scraping or hurting themselves on a sharp edge of the conductive member.

Figure 12:
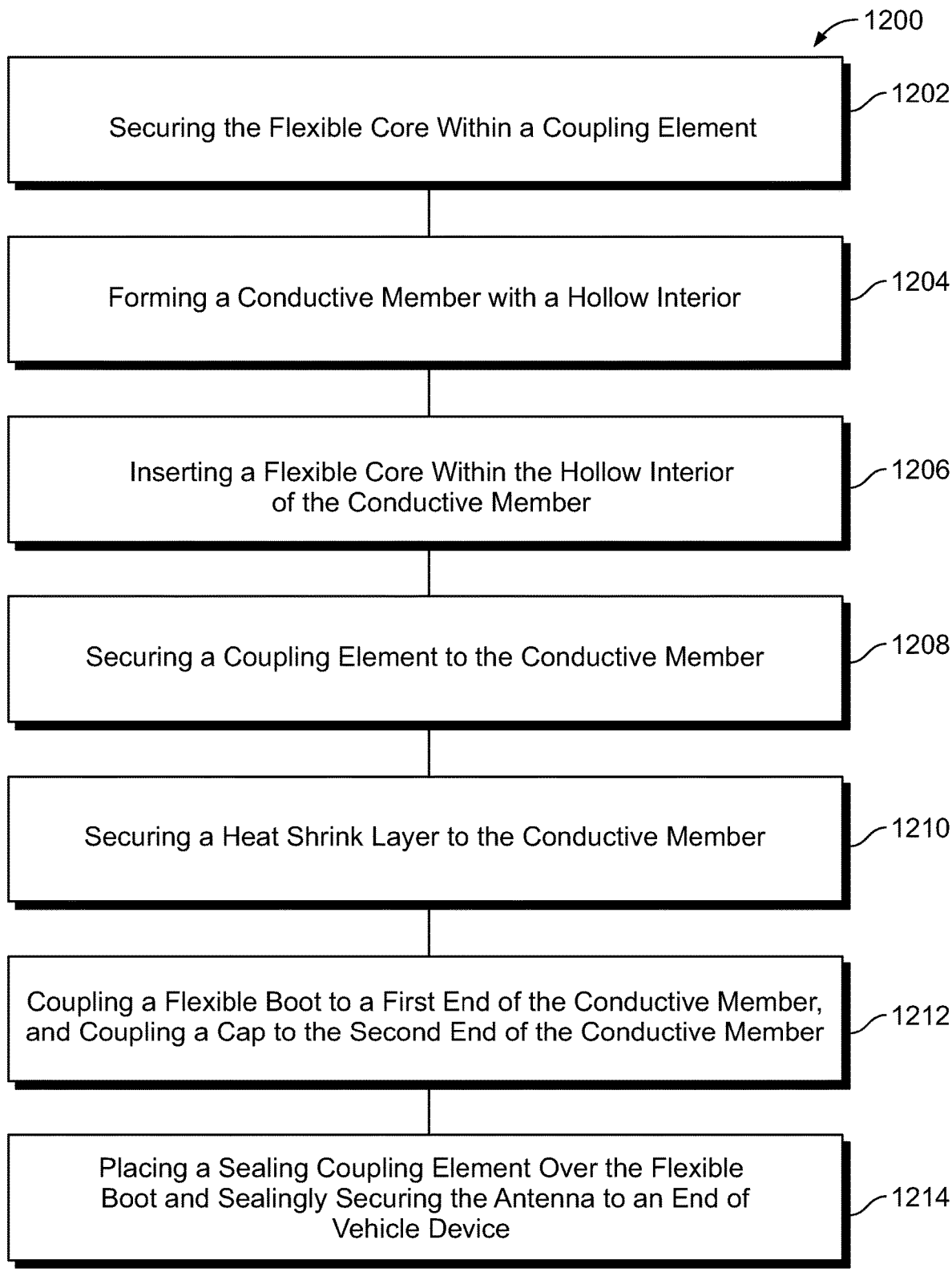
FIG. 12 illustrates a flow diagram of one example of a method for forming an antenna.

FIG. 12 illustrates a schematic block flow diagram of an example process 1200 for forming an antenna. In different examples, the antenna may be the antenna illustrated in any of the Figures. The method, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method may be able to be performed in one or more operations described herein.

At step 1202, the flexible support member is secured within a coupling element. The flexible support member may be formed of rubber, plastic, including urethane, or the like. In one example, the coupling element may be a threaded coupling element. The flexible support member may be inserted into a cavity formed by an interior wall of the coupling element and an end wall. In one example, to secure the flexible support member within the coupling element, adhesive is applied to the portion of the flexible support member within the coupling element. Alternatively, the flexible support member may be secured through a friction fit, fasteners, etc.

At step 1204, a conductive member with a hollow interior is formed. In one example, the conductive member may be the conductive member as described in relation to FIGS. 8 through 11. To this end, the conductive member may be configured to provide a gain in a range between zero and twenty decibels per isotropic radiator. The conductive member may also be flexible to provide stain relief for the antenna. The conductive member may be formed through an additive process such as three-dimensional printing, by molding, through machining, etc. The conductive member may be formed to have a circular cross-section, a square cross-section, a rectangular cross-section, a triangular cross-section, or the like. Similarly, the hollow interior may be formed through the additive process, through molding, drilling, etc. In one example, the conductive member may be made of a copper braid, and specifically from machining a copper braid. In an example, the conductive member during the formation process may be plated with at least one of silver, gold, or platinum. Specifically, the hollow conductive member may be plated with a material with a higher conductivity than the conductive member material to reduce or prevent radio frequency interference.

At step 1206, the flexible support member is inserted within the hollow interior of the conductive member. While in one example the flexible support member may be inserted into the hollow interior after the conductive member is formed, in another example, the flexible support member may be inserted within the hollow interior by forming the conductive member around the flexible support member. In another example, inserting the flexible support member within the hollow interior of the conductive member occurs during an additive process where the flexible support member is printed inside of the conductive member.

At step 1208, a coupling element is secured to the conductive member. The coupling element may be secured to the conductive member with a crimping ring that provides a pressure to the coupling element and conductive member. Alternatively, adhesive, fasteners, friction fit, or the like may secure the coupling element of the conductive member.

At step 1210, a heat shrink layer is secured to the conductive member. The heat shrink layer may be formed and secured by sliding tubing over the conductive member, and then heating the tubing to adhere the tubing to the conductive layer. The heat shrink layer may be a plastic based material that once heated shrinks to adhere to the conductive member. In one example, two heat shrink layers are applied, a first heat shrink layer that may be applied to the flexible support member, and a second heat shrink layer that may be applied to the conductive member. In this manner, both the flexible support member, and conductive member include additional protection from the environment.

At step 1212, coupling a flexible boot to a first end of the conductive member, and coupling a cap to the second end of the conductive member. The flexible boot may be friction fit around the conductive member to provide a base portion of the antenna that may sealingly engage an adapter of a monitoring and communication device of a vehicle when the antenna is secured to the end of vehicle device. For example, the base portion may couple, adhere to, or otherwise engage the adapter such that a seal is formed between the base portion and the adapter with the formed seal preventing passage of water or other fluids between the base portion and the adapter. The cap meanwhile may prevent water and other environmental contaminants from harming the antenna during use.

At step 1214, a sealing coupling element is placed over the flexible boot and sealingly secures the antenna to a monitoring and communication device. In one example, the sealing coupling element may be a retaining nut that engages the exterior of the monitoring and communication device. Upon engagement of the monitoring and communication device, the sealing coupling element provides a seal to prevent debris or other material within the interior of the monitoring and communication device. In one example, the sealing coupling member may be made of a metal material, flexible material, etc.

By using the process, forming of the antenna may be facilitated. Additionally, by using the flexible support member, materials for the conductive member may be selected based on antenna performance, ease of manufacturing, etc. improving the antenna and/or the manufacturing process.

In one or more embodiments, a system may be provided that may include a vehicle device. An antenna may be coupled to an exterior of the vehicle device and may be configured to communicate signals to or from the vehicle device. The antenna may include a conductive member configured to communicate the signals to or from the vehicle device, and a flexible support member disposed within the conductive member and configured to receive, absorb, and displace force from the conductive member.

The conductive member may comprise copper braid. The flexible support member may comprise one of rubber or plastic. The antenna may comprise a heat shrink layer at least partially surrounding the conductive member.

The conductive member may be plated with at least one of silver, gold, or platinum. The antenna may have a gain between zero decibels per isotropic radiator and twenty decibels per isotropic radiator. The antenna may include a coupling element removably coupled within the vehicle device to provide a communication path from the antenna to within the vehicle device. In another aspect, the coupling element may include at least one of threads, or a fastener. A flexible boot may be coupled to the conductive member to provide strain relief for the antenna.

In one or more embodiment, a method for forming an antenna may be provided that may include forming a conductive member with a hollow interior. The conductive member may be configured to provide a gain of a communication signal between zero decibels per isotropic radiator and twenty decibels per isotropic radiator. The method may also include inserting a flexible support member within the hollow interior of the conductive member. The flexible support member may be configured to receive, absorb, and displace force from the conductive member.

The method may also include crimping a coupling element to the conductive member. The coupling element can be configured to removably couple to a monitoring and communication device. The method may also include plating an exterior of the conductive member with at least one of silver, gold, or platinum. The method may also include coupling a flexible boot to a first end of the conductive member, and coupling a cap to a second end of the conductive member.

The method may also include securing the heat shrink layer over the conductive member including sliding heat shrink tubing over the conductive member, and heating the heat shrink tubing until the heat shrink tubing forms the heat shrink layer on the conductive member.

In one or more embodiments, a system may include an end-of-vehicle device or a monitoring and communication device that includes a transceiver. The system may also include an antenna coupled to the transceiver and configured to communicate signals of the transceiver to or from the monitoring and communication device. The antenna may include a conductive member with a hollow interior that may be configured to communicate the signals to or from the monitoring and communication device, and a flexible support member may be disposed within the hollow interior and engaging the conductive member. The modulus of elasticity of the flexible support member may differ from the modulus of elasticity of the conductive member.

The monitoring and communication device may include a housing with an opening disposed therethrough, and the conductive member may be secured to a coupling element that may be disposed through the opening in the housing. The antenna may include a sealing coupling element sealingly coupling the conductive member to the housing of the monitoring and communication device. The antenna may include a matching circuit electrically coupling the transceiver to the antenna. The conductive member may be configured to provide a gain of a communication signal between zero decibels per isotropic radiator and twenty decibels per isotropic radiator. A heat shrink layer may at least partially surround the conductive member.

While one or more embodiments are described in connection with a rail vehicle system, not all embodiments are limited to rail vehicle systems. Unless expressly disclaimed or stated otherwise, the inventive subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

Embodiments of the subject matter described herein also relate to systems and methods that enable controllers to determine different states of vehicle signaling and monitoring devices (e.g., monitoring and communication devices, end-of-vehicle devices, etc.) based on information received from one or more sensors that obtain information related to the monitoring device and/or vehicle systems. The different states may indicate whether the monitoring device is in a fully locked or fully loaded position relative to the vehicle system, or if the device is not in a fully locked of fully loaded position relative to the vehicle system. For example, the sensors may generate and communicate sensor signals that indicate to an operator of the vehicle system that the monitoring device is slipping off of the vehicle system to which it is coupled.

The different states may indicate whether the monitoring device is coupled with a vehicle system, or is not coupled with a vehicle system. For example, sensor signals generated by sensors of the monitoring device may correlate with sensor signals generated by sensors of the vehicle system. One or more processors may determine that the monitoring device is onboard and/or coupled with the vehicle system based on the correlated sensor signals. Alternatively, one or more processors may determine that the monitoring device is not onboard a vehicle system based on correlated sensor signals.

Optionally, the different states may indicate whether the monitoring device off-board the vehicle system is available for use, or is not available for use. For example, the monitoring device may be unavailable for use because the monitoring device requires maintenance or repair. Optionally, the monitoring device may be unavailable for use because the monitoring device has been assigned to another vehicle system.

Figure 13:
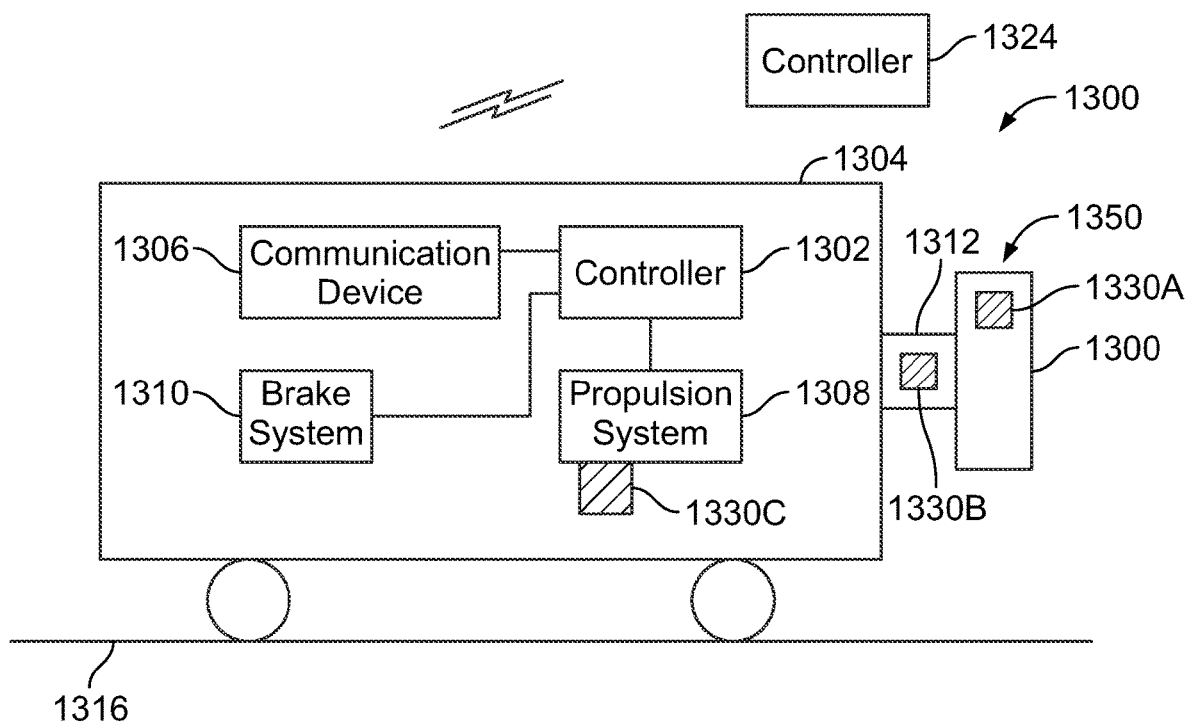
FIG. 13 schematically illustrates one example of a system.

FIG. 13 illustrates another example of a control system 1300 that includes a vehicle system 1304. The vehicle system can be a rail vehicle system, but optionally can be automobiles, trucks, buses, mining vehicles, marine vessels, aircraft, agricultural vehicles, or other off-highway vehicles. The illustrated vehicle system includes a single vehicle, but optionally can be formed from two or more vehicles that may travel together (by being mechanically coupled or by being mechanically separate but communicating with each other to travel together, such as in a convoy). The vehicle system travels along a route 1316, such as tracks, roads, highways, land-based paths, airborne paths, waterways, or the like.

The vehicle system includes a controller 1302, which may be referred to as an onboard controller and can represent one or more of the controllers described herein. The onboard controller can represent hardware circuitry that includes and/or is connected with one or more processors that perform operations described in connection with the onboard controller. The onboard controller can communicate with onboard and/or off-board components via a communication device 1306. The communication device represents transceiving circuitry, one or more antennas, modems, or the like. In one or more embodiments, the communication device may receive and provide the data signals to the onboard controller. The communication device may be the same as or similar to other communication devices described herein.

The vehicle system includes a propulsion system 1308 that operates to move the vehicle system along the route. The propulsion system can represent one or more engines, motors, transmissions, propellers, or the like, that generate propulsion to move the vehicle system. The vehicle system also can include a brake system 1310 that operates to slow or stop movement of the vehicle system. The brake system can include air brakes, friction brakes, motors (e.g., used for dynamic or regenerative braking), or the like. The onboard controller can communicate control signals with the propulsion system and/or the brake system to control or change movement of the vehicle system.

In one or more embodiments, the vehicle system may include one or more energy storage devices that store and/or generate electric current. This current can be used to power components onboard the vehicle system, such as the propulsion system, a lighting system, or the like. Optionally, the energy storage devices can include or represent one or more motors of the propulsion system and/or the brake system (e.g., where the motors generate current during regenerative braking). The energy storage devices can include one or more batteries, fuel cells, photovoltaic devices, flywheels, alternators, generators, or the like. The onboard controller can communicate control signals to the energy storage devices to control supply of the current to one or more components of the vehicle system.

An off-board controller 1324 may communicate with the onboard controller of the vehicle system. The off-board controller can represent hardware circuitry that includes and/or is connected with one or more processors that perform operations of the off-board controller. In one or more embodiments, the off-board controller can communicate with the onboard controller of the vehicle system to control or restrict movement of the vehicle system. For example, the off-board controller can communicate with the onboard controller of the vehicle system to notify the vehicle system where the vehicle system is allowed to travel, how fast the vehicle system is allowed to travel, or the like.

In one embodiment, the off-board controller may represent a back-office server of a positive vehicle control (PVC) system. A PVC system is a control system in which a vehicle system is allowed to move, and/or is allowed to move outside a designated restricted manner (such as above a designated penalty speed limit), only responsive to receipt or continued receipt of one or more signals (e.g., received from off-board the vehicle) that meet designated criteria, e.g., the signals have designated characteristics (e.g., a designated waveform and/or content) and/or are received at designated times (or according to other designated time criteria) and/or under designated conditions. This is opposed to 'negative' vehicle control systems where a vehicle is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board controller represents another computerized system that communicates with vehicle systems described herein.

A mounting assembly 1350 may couple a vehicle signaling and monitoring device 1352 with the vehicle system via a coupler device 1312. The vehicle signaling and monitoring device may also be referred to as an EOT or end-of-vehicle (EOV) device. The EOV device includes a housing and a monitoring device disposed within the housing. The EOV monitoring device may monitor the vehicle system and/or the route along which the vehicle system moves. The EOT device may be a transferrable device that may be moved from one vehicle to another vehicle that may change the designation of the respective vehicle from which the EOT device is removed, and the other vehicle where the EOT is moved to may be identified as a new EOT vehicle.

The vehicle system, the coupler device, and the vehicle signaling and monitoring device includes one or more sensors 1330A-C. The sensors can detect characteristics of the vehicle system, the vehicle, the monitoring device, and/or the route. For example, the sensors can detect characteristics of the vehicle system such as, but not limited to, if the vehicle system is stationary or moving, operating parameters of the moving vehicle system (e.g., a speed, direction, or the like), a geographic location of the vehicle system, or the like. The sensors can detect characteristics of the monitoring device such as, but not limited to, if the monitoring device is in a fully open or fully closed position, a location of the device, a health score or index of the device, or the like. The sensors can detect characteristics of the route such as, but not limited to, identifications, locations, and/or statuses of wayside devices disposed along the route, route gradients, or the like.

The sensors can generate and communicate one or more sensor signals with the onboard controller and/or the off-board controller. The onboard controller may determine states of the vehicle system, the mounting assembly, the monitoring device, or the like, based on the sensor signals. As one example, the controller may determine that the vehicle signaling and monitoring device is unavailable for use because the monitoring device is in a fully closed position and is coupled with the vehicle system based on correlating sensor signals indicating that monitoring device is in a closed position, sensor signals indicating that the monitoring device is proximate the vehicle system, and sensor signals indicating that the vehicle system is moving. As another example, the controller may determine that the monitoring device is unavailable for use and requires attention by an operator because the monitoring device is not in a fully closed position and is coupled with the vehicle system. As another example, the controller may determine that the monitoring device is unavailable for use because the location of the monitoring device is within or at a repair or maintenance facility. Optionally, the controller may determine that the monitoring device is unavailable for use because the sensor signals indicate that the monitoring device is not operating correctly and needs repair or maintenance.

In one or more embodiments, the onboard controller may communicate the sensor signals and/or information about the determined states to the off-board controller. For example, the onboard controller may communicate the sensor signals to the off-board controller, and the off-board controller may determine states of vehicle system, the mounting assembly, the monitoring device, or the like, based on the sensor signals. The state of the vehicle system may refer to whether the vehicle system is moving or stationary, a geographic location of the vehicle system, a health of the vehicle system, or the like. The state of the monitoring device may refer to a position of the monitoring device with respect to the coupler device, a position of the monitoring device with respect to the vehicle system, a position of one or more components of the monitoring device (e.g., in an open position, in a fully closed position, etc.), a health of the monitoring device (e.g., in need of repair, low battery, or the like), or the like. The state of the coupler device may refer to a position of the monitoring device with respect to the coupler device (e.g., fully coupled, partially coupled, disconnected, or the like), or the like.

In one or more embodiments, the onboard controller may correlate the sensor signals from sensors sensing characteristics of two or more of the vehicle system, the monitoring device, and the coupler device with each other to determine the state of the monitoring device with respect to the vehicle system and/or the coupler device. For example, the onboard controller may receive sensor signals from a sensor 1330C indicating that the vehicle system is moving, and may receive sensor signals from a sensor 1330A indicating that the vehicle signaling and monitoring device is coupled with the vehicle system. The onboard controller may determine that the monitoring device is coupled with the vehicle system as the vehicle system is moving along the route. As another example, the sensors 1330A and 1330B may represent contact switches, and the onboard controller may receive sensor signals from the sensors 1330A and 1330B indicating that the sensors are in contact or within a predetermined proximity to each other. The onboard controller may determine that the vehicle signaling and monitoring device is disposed onboard the vehicle system based on the sensor signals from the sensors.

In one or more embodiments, the sensor signals may indicate if the vehicle signaling and monitoring device is available for use by a vehicle system or is unavailable for use by a vehicle system. The monitoring device may be unavailable for use because the monitoring device is already in use by another vehicle system, is in need of maintenance, or the like. As one example, the off-board controller may receive sensor signals from one or more of the sensors and/or sensor signals from one or more other sensors disposed off-board the vehicle system (not shown). For example, the off-board controller may receive sensor signals from a contact sensor at a storage facility and sensor signals from a contact sensor of the vehicle signaling and monitoring device. The sensor signals may indicate that the vehicle signaling and monitoring device is disposed at the storage facility, that the monitoring device is not disposed onboard the vehicle system, or that the monitoring device is not disposed onboard another vehicle system.

Figure 14:
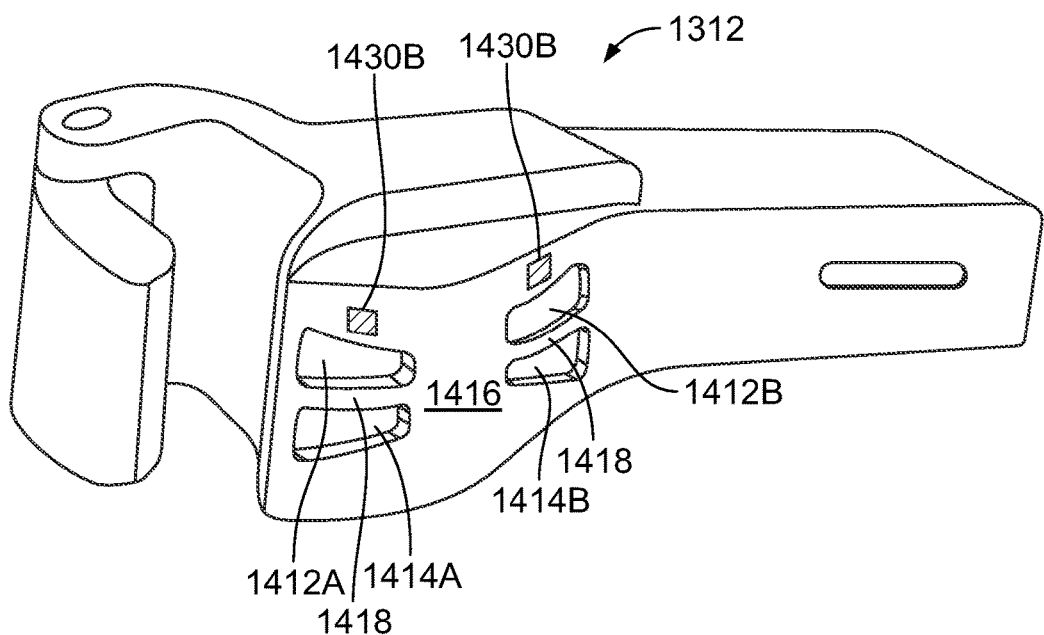
FIG. 14 illustrates a vehicle signaling and monitoring device in accordance with one embodiment.
Figure 15:
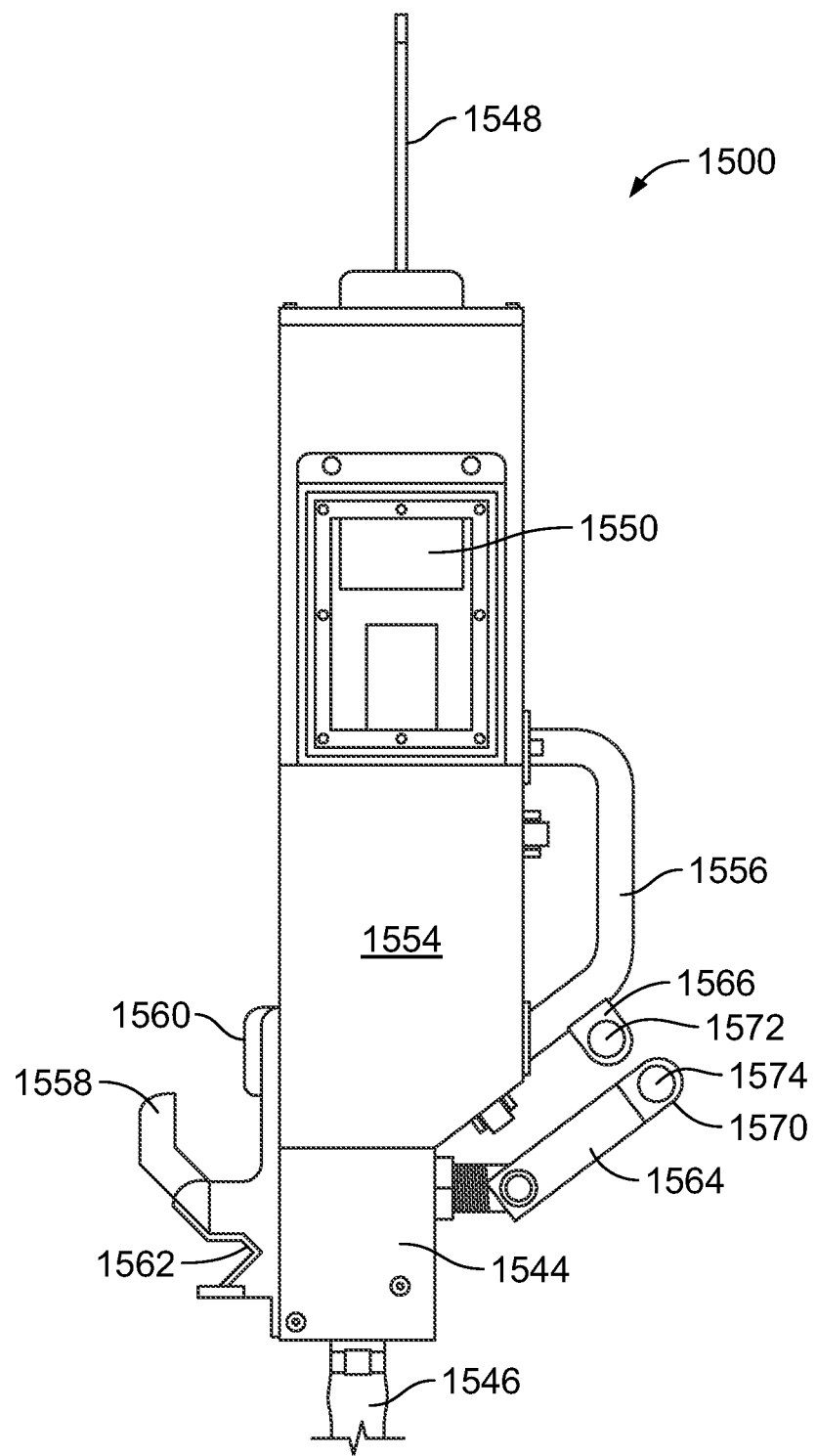
FIG. 15 illustrates a coupler device in accordance with one embodiment.
Figure 16:
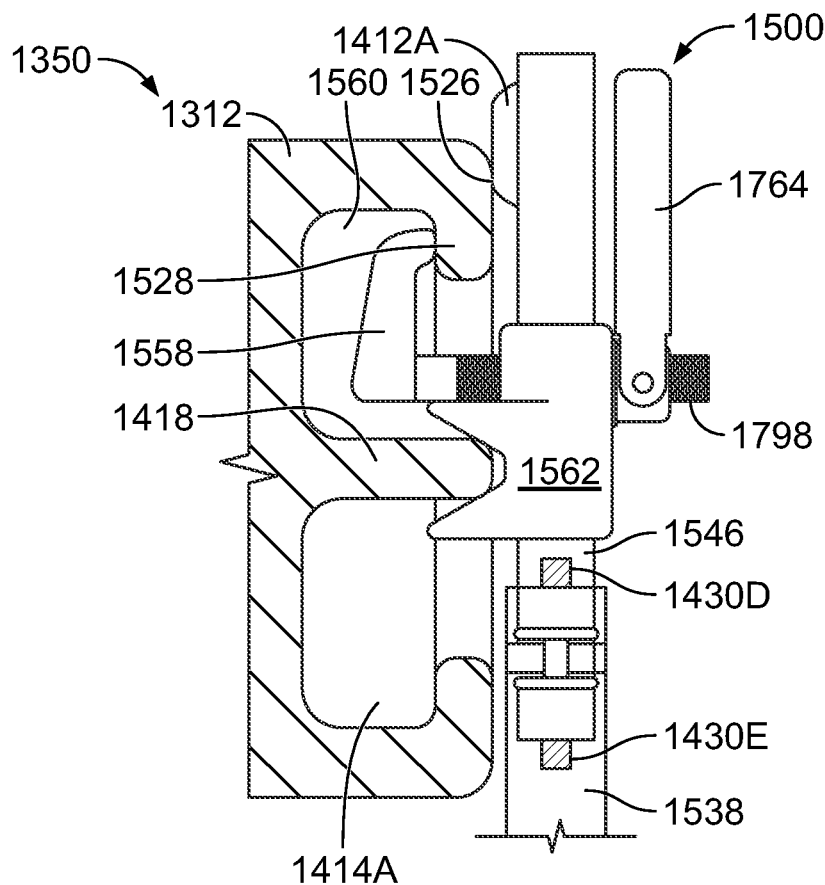
FIG. 16 illustrates a mounting assembly of the system shown in FIG. 13 in accordance with one embodiment.

FIG. 14 illustrates a front view of the vehicle signaling and monitoring device in accordance with one embodiment. FIG. 15 illustrates one example of the coupler device. FIG. 16 illustrates one embodiment of the mounting assembly comprising the vehicle signaling and monitoring device coupled with the coupler device.

The coupler device is one example of a device that is disposed onboard the vehicle system and enables coupling of the monitoring device with the vehicle system. In one or more alternative embodiments, the coupler device may have an alternative shape, size, orientation, configuration, or the like. In the illustrated embodiment of FIG. 14, the coupler device includes four core holes 1412a, 1412b, 1414a, 1414b that are interconnected to provide passages underneath a central region 1416 and are divided from each other by a rib 1418.

The monitoring device may include a first member (e.g., first engagement member), a second member (e.g., second engagement member), and a handle. The first and second engagement members are configured to engage the vehicle under actuation of the handle. For example, the first member, the second member, and the handle may be configured to that after attaching the first member to the vehicle (e.g., by inserting it in a hole in the vehicle, or around a stanchion or protuberance on the vehicle), actuating the handle causes the second member to move relative to the first member, to couple and decouple the monitoring device with the vehicle system (e.g., via clamping).

For example, the monitoring device may include a first member 1558 that fits within one of the core holes of the coupler device. A second member 1562 rides on a rib 1418 that separates the core holes 1412a, 1412b. In one or more embodiments, the first member may be a hook or hook member, and the second member may be a jaw or jaw member. The monitoring device includes a pad 1560 that abuts against a side wall 1562 of the coupler device. When the hook is tightened against the inside upper lip 1528 of the core hole, the pad becomes braced against the top side wall and the jaw member becomes engaged with the rib to provide at least three points of contact with the coupler device. For example, the hook moves relative to the jaw member with actuation of the handle to couple and decouple the monitoring device with the vehicle system. Alternative examples of the first and second members include two clamp members, two jaw members, insertable elements other than hooks, etc.

The monitoring device includes a coupler mount or housing 1544 and hose connections 1546. The hose connection may be coupled with or connected to brake line hose connections 1538 while the monitoring device is coupled with the vehicle system. The monitoring device may include an antenna 1548 for communicating with the onboard controller, the off-board controller, and any alternative system. For example, the monitoring device may communicate vehicle operating information to an operator onboard the vehicle system, or an operator of the off-board controller. The monitoring device may include a light 1550, an input and/or output device 1552 for use by an operator to manually control one or more operations, settings, or the like, of the monitoring device. An energy compartment, such as a battery system, may be accessed by a door 1554. A carrying handle 1556 may be provided to allow an operator or machine to transport and install the monitoring device from a storage facility to the vehicle system, from one vehicle to another vehicle of the same vehicle system, from one vehicle system to a different vehicle system, or the like.

Figure 17:
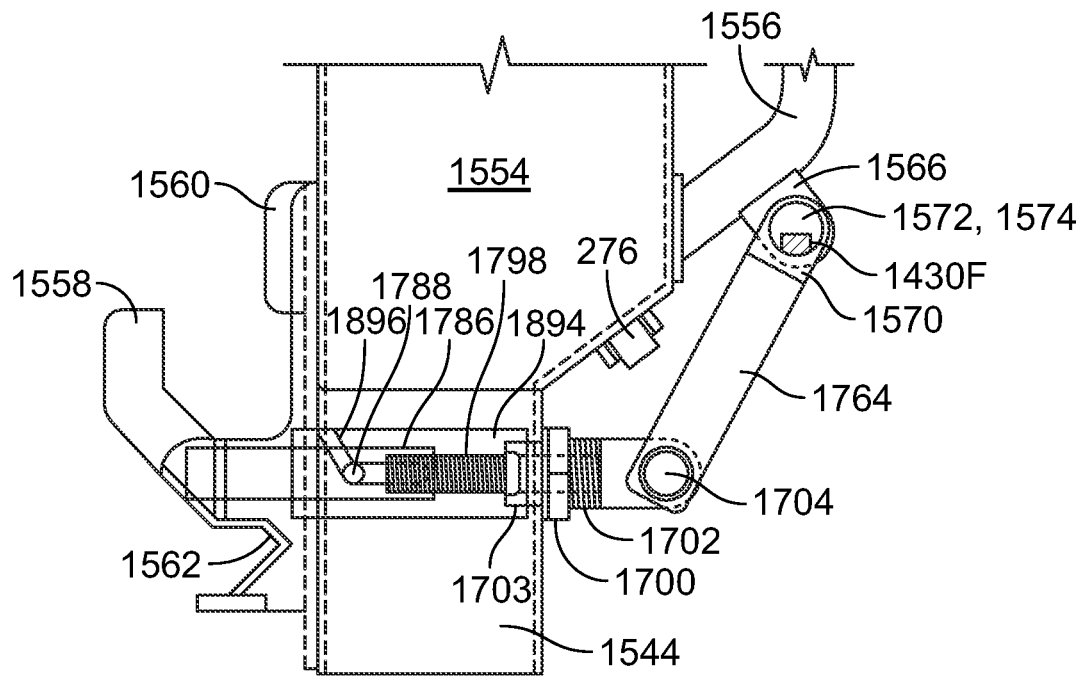
FIG. 17 illustrates a cross-sectional view of a vehicle signaling and monitoring device in accordance with one embodiment.
Figure 18:
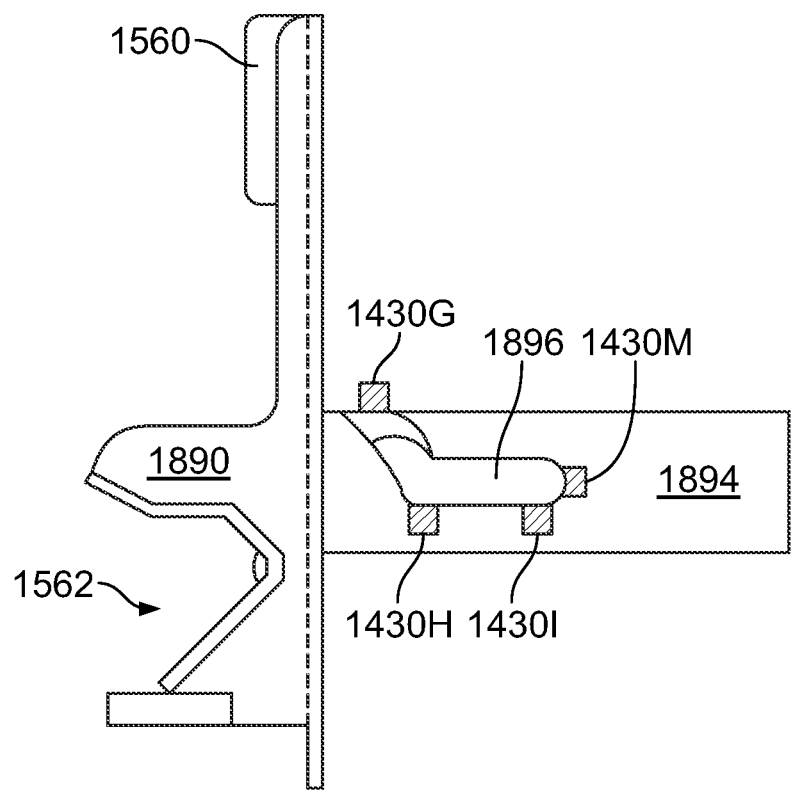
FIG. 18 illustrates a portion of the vehicle signaling and monitoring device shown in FIG. 17 in accordance with one embodiment.
Figure 19:
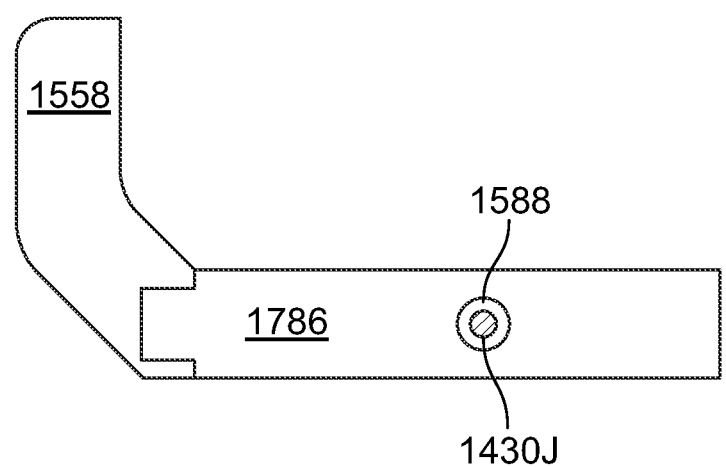
FIG. 19 illustrates a portion of the vehicle signaling and monitoring device shown in FIG. 17 in accordance with one embodiment.
Figure 20:
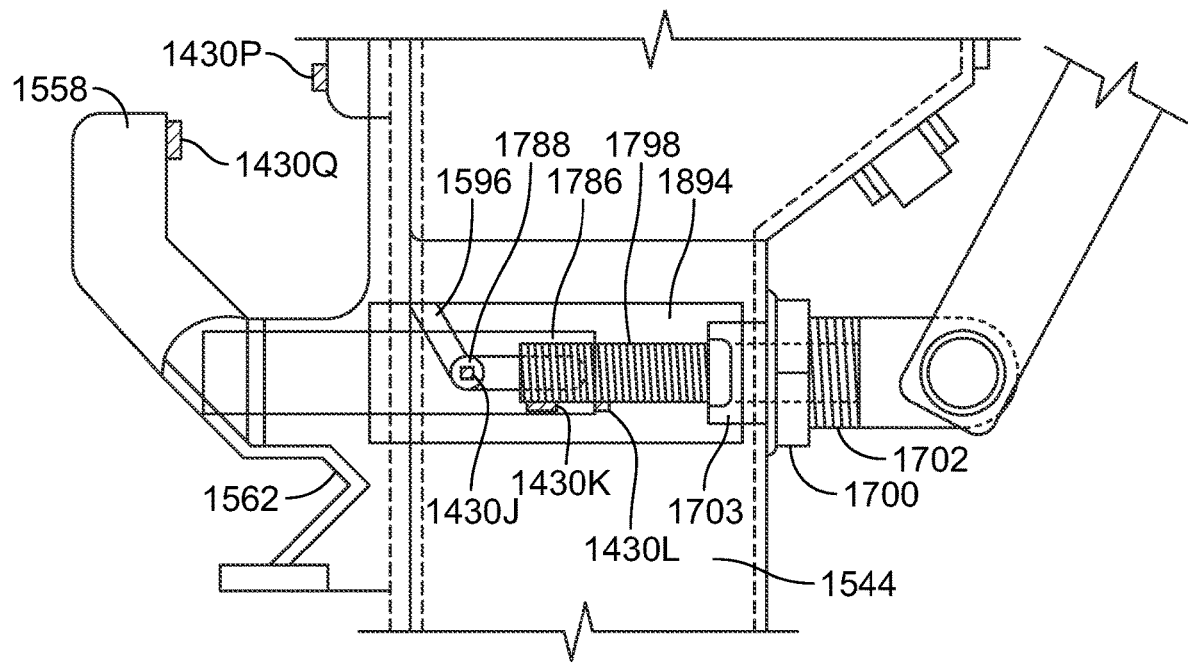
FIG. 20 illustrates a magnified view of the vehicle signaling and monitoring device shown in FIG. 17.

FIG. 16 illustrates a cross-sectional view of the vehicle signaling and monitoring device. FIG. 17 illustrates a portion of the mounting assembly of the monitoring device. FIG. 18 illustrates another portion of the mounting assembly of the monitoring device.

The hook 1558 is connected to a tube 1786 which has a pin 1788 projecting outward from an exterior surface of the tube. A bracket 1890 shown in FIG. 18 includes a jack tube 1894 with a guide slot 1896. The jack tube and the guide slot cooperate with the outwardly extending pin on the tube connected to the hook. The hook is rotated and drawn inward or moved outward relative to the pad 1560 by rotating a handle 1764. The handle is connected to a screw 1798 via a pin 1704. The screw passes through a washer stack 1702 and nut 1700, and is retained in the nut by a retaining ring 1703. The nut extends into the jack tube and provides a base for the screw to bear against. The screw is connected to threads in a rear opening of the tube.

As the handle is rotated, the screw causes the tube to be drawn inward or moved outward, thereby moving the hook toward or away from the pad 1560. The handle does not directly rotate the hook, rather the rotation of the hook is accomplished by the pin of the tube riding in the slot of the jack tube. To couple the monitoring device to the coupler device or any other device, actuation of the handle may cause the hook to move between one or more unloaded positions and a fully loaded position. For example, the handle is rotated that translates to initial travel of the hook from a transverse position to an upright position. For example, the pin slides down and along the slot in the jack tube and rotates the hook from the transverse position to the upright position. From the upright position, the hook moves inward via additional rotation of the handle until the inside upper lip coupler device is sandwiched between the hook and the pad. In one or more embodiments, the hook, jaw member, and the linkage between the handle and the hook may be referred to as the mounting assembly. The mounting assembly may mount or couple the end-of-vehicle monitoring device with an exterior surface of a vehicle system.

In one or more embodiments, the monitoring device may be locked in a loaded position to lock the hook in engagement with the upper lip of the coring hole. As one example, the handle may be locked by passing a lock through apertures 1572, 1574 of tabs 1566, 1570, respectively.

To decouple the monitoring device from the coupler device or any other device, the handle is rotated, such as in an opposite direction. The initial movement of the hook is in a direction away from the coupler device, such that a space or gap is disposed between the hook and the inside upper lip coupler device. As the handle is rotated, the pin moves along the slot in the jack tube and rotates the hook from the upright position to the transverse position. In one or more embodiments, the monitoring device may include different linkage or a different linkage configuration between the hook and the handle. Optionally, the monitoring device may be coupled with another component of the vehicle system.

The sensors may be disposed at one or more positions relative to the vehicle system, the vehicle signaling and monitoring device, the coupler device, or the like. In the illustrated embodiment, the sensors coupled with the propulsion system, the brake system, at one or more locations on or within the vehicle signaling and monitoring device, and at one or more locations on or within the coupler device. The sensors may represent one or more different types or kinds of sensors that may sense, or otherwise detect, characteristics of the vehicle system, the monitoring device, the route, wayside devices, geographic information, or the like. Nonlimiting examples of the different types of sensors may include position sensors, light sensors, pressure sensors, accelerometers, magnetic sensors, contact switches, or the like.

In one or more embodiments, two or more different sensors may operate together. As one example, as illustrated in FIG. 18, a position sensor 1430J coupled with the pin 1588 may be in communication with one or more of sensors 1430G, 1430H, 1430I coupled with or disposed within the slot 1596 such that the sensors may indicate the travel of the pin along the slot. The sensors may be proximity and/or contact switches that may indicate to the processors of the onboard controller and/or the off-board controller a position of the pin within the slot. Based on the information communicated from the sensors, the processors may determine if the mounting assembly is in a fully open position, a fully closed position, or a position between a fully open and fully closed position. Optionally, the position sensor may communicate with one or more of sensors 1430K, 1430L coupled with the screw to determine a position of the pin relative to different positions of the screw.

As another example, one of the sensors 1430M may include a laser that emits a beam of light in a direction toward another sensor 1430G. The sensor signals directed to the onboard and/or off-board controllers may determine a position of the pin, the hook, the handle, the screw, or the like, based on the light being received by the sensor 1430J (e.g., the light is open between the two sensors such that there is a direct line of sight between the laser and receiving sensor) or the light not being received by the sensor (e.g., the light is blocked between laser and receiving sensor). For example, if the sensor 1430J receives the light beam, the sensor signal indicates that the hook may be in the upright position. Alternatively, the sensor signal may indicate that the hook may be in the transverse position. The processors may determine a state of the monitoring device based on the line of sight between the sensors being open or closed.

As another example, sensors 1430P, 1430Q may be pressure sensors. One or more of the sensors 1430P, 1430Q may generate and communicate sensor signals to the onboard and/or off-board controller responsive to the hook being in contact with the inside upper lip 1528 of the coupler device and/or the pad 1560 being in contact with the side wall 1526 of the coupler device.

As another example, a sensor 1430D coupled with the hose connection 1546 may generate and communicate sensor signals that indicate that the hose connection is coupled with the brake line hose connection 1538 of the vehicle system. For example, the sensor 1430D may sense or otherwise detect that the hose connection is receiving brake fluid via the brake line hose connection. Optionally, the sensor signal may indicate that the sensor 1430D is within a proximity to a sensor 1430E coupled with the brake line hose connection.

The processors of the onboard controller and/or the off-board controller may receive sensor signals from one or more of the sensors in order to determine a state of the mounting assembly based on the information obtained from the sensors. In one or more embodiments, the processors may determine the status of the vehicle signaling and monitoring device based on correlating data received from one or more sensors associated with different parts of the device, the mounting assembly, the storage facility, the vehicle, or the like. For example, the status of the monitoring device may be based on data associated with the mounting assembly, a position of the device (locked, unlocked, geographic, etc.) combinations of two or more therein, analyzing movement patterns (of the vehicle system, of the device, or the like) over time, or the like.

In embodiments, the one or more processors may be configured to receive information from the one or more sensors (coupled to the device and/or vehicle system) about one or more of the mounting assembly or position of the device (e.g., latitude/longitude/altitude, position relative to other known positions, etc.) In one aspect, the one or more processors are configured to determine a state of the device (e.g., coupled to a vehicle for use, or not coupled to a vehicle for use) based on the information of the mounting assembly (e.g., actuated or not actuated). In another aspect, the one or more processors are configured to determine a state of the device based on the information of the mounting assembly and the position information. In another aspect, the one or more processors may be configured to determine the state of the device, based on the mounting assembly and the position, by determining if multiple instances of the position information over time meet one or more designated criteria, in an absolute sense (e.g., moved vs. not moved) and/or relative to position information of the vehicle system and/or relative to the mounting assembly information. For example, the one or more processors may be configured to determine that the device is not coupled to a vehicle system for use if, despite the mounting assembly having been actuated, the device was not moved during a designated time threshold ahead of when the mounting assembly was actuated. In another example, the one or more processors may be configured to determine the state of the device based on multiple instances of position information (of the device, and/or the device relative to a vehicle system) over time (alone or in conjunction with mounting assembly information) that meet designated criteria of devices being moved from an off-board location to an on-board location for use (e.g., the criteria determined based on previous empirical observations, or otherwise).

In one or more embodiments, the state of the mounting assembly may be based on one or more of a position of the handle, a position of the hook, a position of the jaw member. The processors may determine the state of the mounting assembly by determining whether the mounting assembly is in a locked position, whether the mounting assembly is in an unlocked position, or determining a location of the mounting assembly relative to the vehicle system (e.g., coupled with the vehicle system, moving with the vehicle system, separate from a vehicle system, or the like).

In one or more embodiments, some of the information obtained from the sensors may include information about movement of the hook in one or more directions (e.g., inward and outward, transverse and upright, or the like) relative to the jaw member. For example, the hook may move between plural unloaded positions and a fully loaded position. The processors may determine if the hook is in the fully loaded position or if the hook is in one of the unloaded positions. In one or more embodiments, the processors may determine the state of the mounting assembly based on an amount of time between the hook being in the fully loaded position and the hook being in one of the plural unloaded positions. If an amount of time exceeds a predetermined threshold, the processors may determine that the mounting assembly has gradually, over time, become lose. For example, the processors may determine if the mounting assembly is no longer in a fully loaded position and may be slipping off of the vehicle system. The processors may alert an operator that the vehicle signaling and monitoring device needs to be checked, re-attached to the vehicle system, tightened onto the vehicle system, or the like.

In one or more embodiments, the onboard and/or off-board controllers may determine whether the vehicle signaling and monitoring device is coupled with the vehicle system, or determine that the monitoring device is not coupled with the vehicle system. For example, the processors may determine that the monitoring device is coupled with the vehicle system responsive to receiving sensor signals from sensors of the monitoring device and other sensors of the vehicle system, and correlating the information obtained from the different sensors. The sensor signals may include propulsion and/or braking information of the vehicle system that is correlated with sensor signals including information that the mounting assembly is in a locked position. The correlation may indicate that the monitoring device is coupled with a vehicle system, and the vehicle system may be moving along the route. For example, the processors may determine the state of the mounting assembly to be coupled with the vehicle system and in the locked position. As another example, sensors of the monitoring device may be in communication with proximity sensors of the vehicle system, and the processors may determine that the mounting assembly is coupled with a stationary or mobile vehicle system.

In one or more embodiments, the processors may determine that the mounting assembly including the vehicle signaling and monitoring device is disposed off-board the vehicle system. For example, the sensor signals may indicate that the monitoring device may be in a locked or unlocked position, but in proximity to one or more sensors of a storage facility or warehouse. The processors may determine the state of the monitoring device to be available for use by another vehicle system.

For example, one technical problem of existing systems is an inability to quickly and easily track large volumes (e.g., hundreds) of these monitoring devices. The devices may only report locations when the devices are activated. The devices may be deactivated when not in use and cannot report locations while deactivated. Additionally, tracking relies on human operators to record and report current locations, but given the large numbers of devices and frequent swapping out of devices, locations and statuses are rarely tracked or recorded accurately or in a timely manner. The present invention solves at least this technical problem by generating and communicating sensor signals that may be used to determine a state of plural different monitoring devices. The sensor signals may be generated by sensors coupled with or disposed within the plural different monitoring devices. Optionally, the sensor signals of the sensors of the monitoring devices may be correlated with sensor signals of other sensors, such as other sensors onboard different vehicle systems, other sensors at storage facilities, other sensors of coupler devices that may couple the monitoring devices to vehicle systems, or the like. The onboard and/or off-board controllers may determine states of the plural different monitoring devices based on the different sensor signals, and may communicate the states of the plural different devices with an operator. For example, the controllers may determine the states of 10 different monitoring devices, 100 different devices, 1,000 different devices, or the like.

In one or more embodiments, the processors may determine that the monitoring device is in proximity to one or more sensors of the storage facility, and also receive sensor signals indicating that the monitoring system is in need of maintenance, repair, or the like. Therefore, the processors may determine the state of the monitoring device unavailable for use by a vehicle system.

In one or more embodiments, the processors may communicate or display to one or more operators onboard and/or off-board the vehicle system how many vehicle signaling and monitoring devices may be available for use and stored at a storage facility. Optionally, the processors may communicate or display to one or more operators onboard and/or off-board the vehicle system how many vehicle signaling and monitoring devices may be available for use and stored at a storage facility, but are unavailable due to the need for maintenance and/or repair. As one example, the onboard and/or off-board controller may determine that ten (10) different monitoring devices are coupled with ten different vehicle systems and that forty (40) monitoring devices are not coupled with any vehicle system and are disposed within a storage facility. The onboard and/or off-board controllers may also communicate to one or more operators that five (5) of the stored monitoring devices need repair or maintenance, and that the remaining thirty-five (35) are available for use. Optionally, the controllers may communicate that of the remaining thirty-five devices that are available for use, five (5) have been assigned to other vehicle systems and are not available for use. The onboard and/or off-board controller may communicate to the operator a location of each available and/or unavailable monitoring device, an identification of each of the available and/or unavailable devices, or the like.

Figure 21:
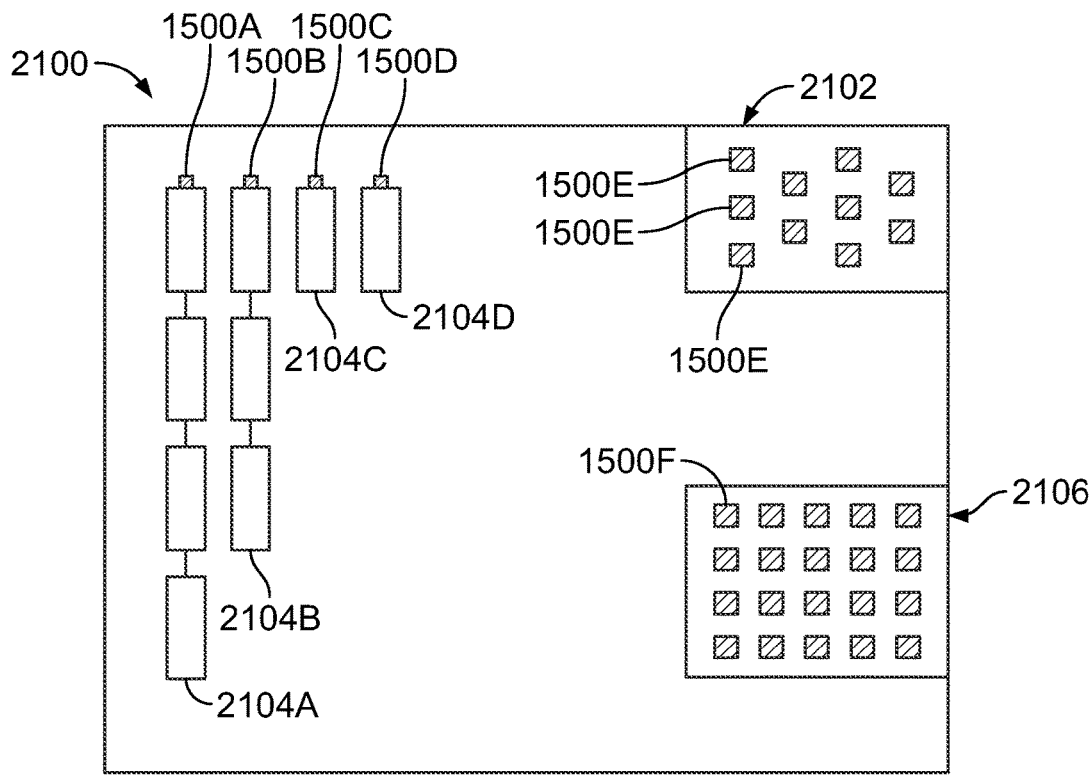
FIG. 21 illustrates plural vehicle signaling and monitoring devices in accordance with one embodiment.

For example, FIG. 21 illustrates plural vehicle signaling and monitoring devices in accordance with one embodiment. The monitoring devices may be stored, held, or positioned within a facility 2100 such as a warehouse, storage facility, rail yard, or the like. The one or more processors of the onboard and/or off-board controllers may receive sensor signals from each of the monitoring devices and/or one or more sensors of the facility, and may determine a state of each of the monitoring devices. The controllers may determine which monitoring devices, and how many monitoring devices are assigned to vehicle systems, which and/or how many monitoring devices are being repaired, and which and/or how many monitoring devices are available for use.

The controllers may determine that the monitoring devices 1500A-D are in use by vehicle systems 2104A-D. The controllers may communicate, display, or otherwise indicate to an operator that the four monitoring devices are not available, may indicate an identification of each of the four monitoring devices, or the like. Optionally, the controllers may indicate to the operator that the monitoring devices are unavailable because the monitoring devices are presently in use. Additionally or alternatively, the controllers may communicate, display, or otherwise indicate to the operator that ten (10) monitoring devices 1500E are disposed in a repair area 2102. For example, the controllers may indicate that the ten monitoring devices 1500E are unavailable, may indicate an identification of each of the ten unavailable monitoring devices, and/or may indicate that the ten unavailable monitoring devices are unavailable because the ten devices are in need of repair. Additionally or alternatively, the controllers may determine and communicate, display, or otherwise indicate to the operator that twenty (20) monitoring devices 1500F are disposed in a storage area 2106 and are available for use. Optionally, the controllers may indicate an identification of each of the twenty available monitoring devices.

In embodiments, the one or more sensors of the device/system (e.g., end-of-vehicle device) include a global navigation satellite system (GNSS) receiver, such as a global positioning system (GPS) sensor. The GPS sensor (e.g., GPS receiver) is configured to receive wireless signals from GPS satellites, with the wireless signals containing information for the GPS sensor to determine its approximate geographic location. The device also includes one or more of a transmitter and/or an energy storage device. The transmitter may be configured to transmit the determined geographic location to a remote location, e.g., a dispatch or maintenance center. The energy storage device may be configured to provide electrical power to the GPS sensor and transmitter even during times when the device is not attached to a vehicle, for determining a location of the device at the remote location, e.g., if the device is stolen, lost, or misplaced.

In one or more embodiments, a system may include a mounting assembly disposed onboard a vehicle system. The mounting assembly couples a vehicle signaling and monitoring device to the vehicle system. One or more sensors may obtain information related to one or more of the mounting assembly or the vehicle system. One or more processors may determine a state of the mounting assembly based on the information obtained by the one or more sensors.

The mounting assembly may include a first member and a second member. The first member may move relative to the second member with actuation of a handle to couple the mounting assembly with the vehicle system. The one or more processors may determine the state of the mounting assembly based on one or more of a position of the handle, a position of the first member, or a position of the second member. The information related to the mounting assembly may include movement of the first member in one or more directions relative to the second member.

The hook may move between plural unloaded positions and a fully loaded position. The one or more processors may determine if the first member is in the fully loaded position or if the first member is in one of the unloaded positions. The one or more processors may determine the state of the mounting assembly based on amount of time between the first member being in one of the plural unloaded positions and the first member being in the fully loaded position. The one or more processors may determine the state of the mounting assembly by one or more of determining whether the mounting assembly is in a locked position, determining whether the mounting assembly is in an unlocked position, or determining a location of the mounting assembly relative to the vehicle system.

The first member may be or comprise a hook and the second member may be or comprise a jaw member. The hook may move relative to the jaw member with actuation of the handle to couple the mounting assembly with the vehicle system. The one or more processors may determine if the mounting assembly is coupled with the vehicle system or if the mounting assembly is not coupled with the vehicle system.

The one or more processors may receive sensed information from one or more other sensors of the vehicle system. The one or more processors may determine if the mounting assembly is coupled with the vehicle system based at least in part on the sensed information from the one or more other sensors of the vehicle system. The one or more processors may correlate the information obtained from the one or more sensors with the sensed information from the one or more other sensors of the vehicle system.

The one or more sensors may include one or more of position sensors, pressure sensors, light sensors, accelerometers, or magnetic sensors. The one or more processors may be disposed off-board the vehicle system.

In one or more embodiments, a method may include obtaining information related to one or more of a mounting assembly or a vehicle system with one or more sensors coupled with one or more of the mounting assembly or the vehicle system. The mounting assembly may be disposed onboard the vehicle system. The mounting assembly may couple a vehicle signaling and monitoring device to the vehicle system. The method may include determining a state of the mounting assembly based on the information obtained by the one or more sensors.

The mounting assembly may include a first member and a second member. The first member may move relative to the second member with actuation of a handle to couple the mounting assembly with the vehicle system. The method may include determining the state of the mounting assembly based on one or more of a position of the handle, a position of the first member, or a position of the second member. The information related to the mounting assembly may include movement of the first member in one or more directions relative to the second member. The first member may move between plural unloaded positions and a fully loaded position. The method may include determining if the first member is in the fully loaded position or if the first member is in one of the unloaded positions.

Determining the state of the mounting assembly may include determining whether the mounting assembly is in a locked position, determining whether the mounting assembly is in an unlocked position, or determining a location of the mounting assembly relative to the vehicle system. The method may include determining if the mounting assembly is coupled with the vehicle system or if the mounting assembly is not coupled with the vehicle system.

In one or more embodiments, a system includes an end-of-vehicle device having a housing, a monitoring device disposed in the housing and configured to monitor one or more of a vehicle system or a route along which the vehicle system moves, and a mounting assembly attached to the housing and configured to couple the housing to an exterior end of the vehicle system. One or more sensors may be coupled to the end-of-vehicle device, may generate sensor signals and may communicate the sensor signals with one or more processors. The sensor signals may include information about the end-of-vehicle device for the one or more processors to determine a state of the end-of-vehicle device based on the information.

One or more embodiments described herein are directed to a communication assembly with an adjustable antenna mast. The communication assembly can represent one or more of the monitoring and communication devices described herein. The mast holds and supports at least one antenna of the assembly. The antenna is configured to receive and/or transmit RF signals with offboard communication devices, such as satellites, other vehicles, wayside devices, and the like. The mast can extend and retract in length relative to a housing of the assembly to which the mast is mounted. The mast may extend by telescoping along an axis. Extension of the mast increases a distance that the antenna projects from the housing. Extension of the mast can serve to enable the antenna to project beyond local obstructions on the vehicle, such as adjacent metal vehicle walls and/or metal cargo. Without extending the mast, the local obstructions may be disposed in a communication pathway (e.g., line of sight) between the antenna and the offboard communication device, and the obstructions can interfere with wireless communications to and from the antenna. Extending the mast can enable the antenna to achieve an unobstructed, or less obstructed, communication pathway, which can increase the quality of communications (e.g., higher signal-to-noise ratio) and reduce the number or risk of missed communications (e.g., dropped packets), relative to communicating with obstructions in the communication pathway. The mast is retractable from the extended state. Retracting the mast can also provide several benefits, such as reducing the risk of damage to the mast and antenna. For example, in the extended state the mast and antenna could be more vulnerable to collisions with off-board structures, such as bridges and tunnels, and damage due to wind, inertia, vibration, and/or the like, relative to being in the retracted state. The one or more embodiments described herein also provide a method for controlling the extension of the antenna mast.

Figure 22:
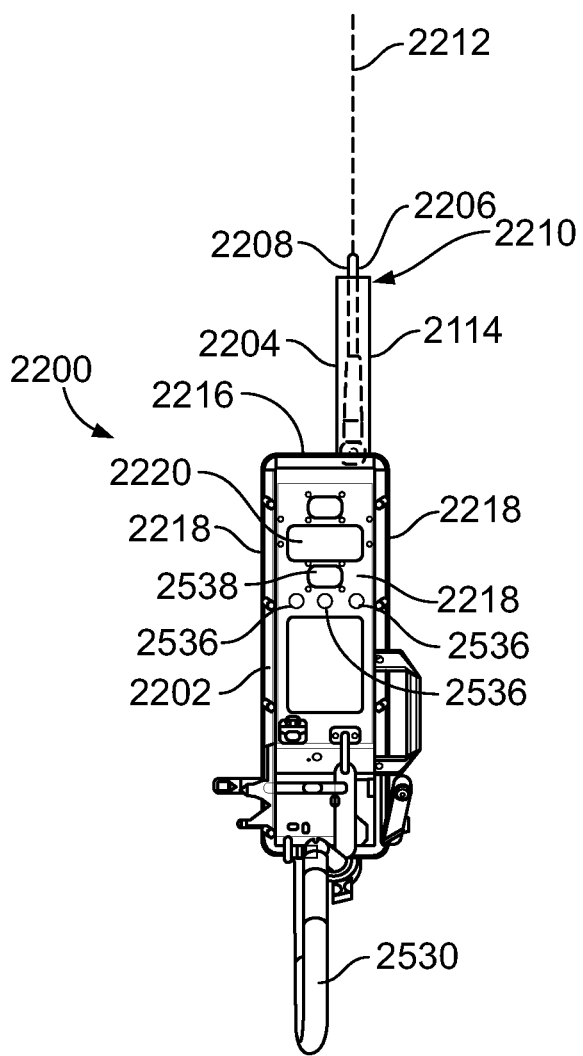
FIG. 22 illustrates a communication assembly according to an embodiment.

FIG. 22 illustrates a communication assembly 2200 according to an embodiment. The communication assembly is a communication apparatus or device that is configured to be mounted or installed on a vehicle. In an embodiment, the communication assembly, also referred to herein simply as assembly, is removably mounted to a vehicle using a securing mechanism. The securing mechanism enables the assembly to be selectively moved between and mounted to multiple different vehicles over time. The assembly includes a housing 2202, a mast 2204, and an antenna 2206. The housing is box-like, including multiple panels that define an interior volume. The housing may be sealed to prevent the ingress of debris and moisture into the interior volume. The housing includes an attachment mechanism for removably mounting the housing to a vehicle.

The mast is mechanically coupled to the housing and projects from the housing. In the illustrated embodiment, the mast is coupled to a top wall 2216 of the housing and projects upward. In another embodiment, the mast can be coupled to a side wall 2218 of the housing that extends from the top wall, with the mast oriented to project in the same upward direction. The antenna is mechanically coupled to and supported by the mast. For example, the antenna may include or represent at least one electrically conductive wire that is disposed within the mast. The mast protects the conductive wire or wires from impacts and environmental conditions. In the illustrated embodiment, a covered segment 2208 of the antenna projects beyond a distal end 2210 of the mast. In an alternative embodiment, no part of the antenna projects beyond the distal end of the mast. The antenna is operably connected to a device inside the housing. The device may include or represent a communication device for bi-directional communication with other vehicles, dispatch facilities, wayside devices, and the like, or for receiving signals from satellites. Optionally, the mast may hold and support multiple antennas, such as a first antenna of a communication device and a second antenna of a receiver device. In an alternative embodiment, the assembly may include two or more masts that hold and support different corresponding antennae.

Figure 23:
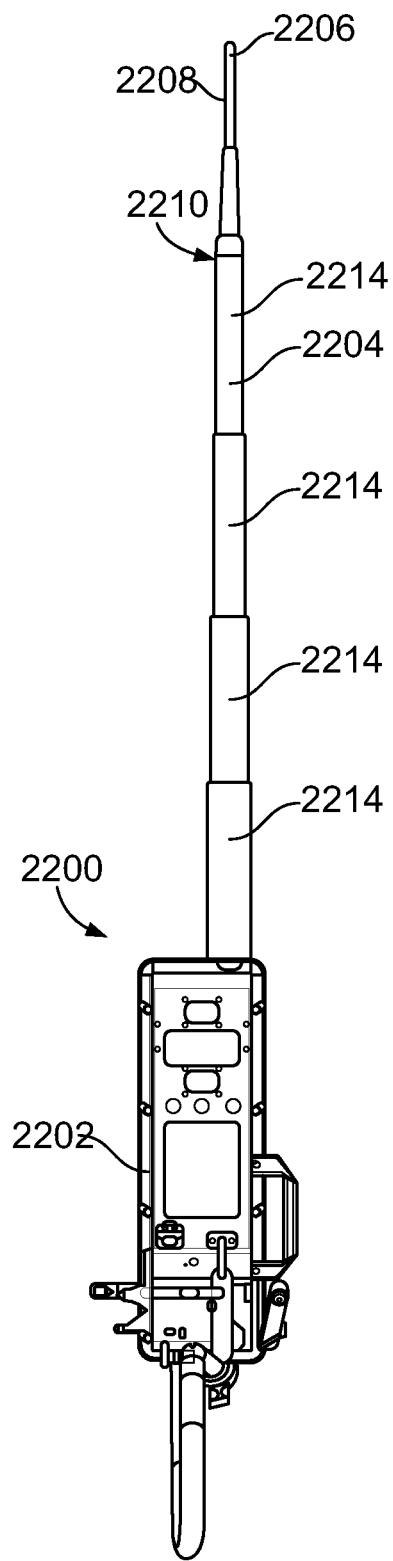
FIG. 23 illustrates the communication assembly of FIG. 22 with the mast in an extended position relative to the position of the mast in FIG. 22.

The mast is extendable to modify the length of the mast projecting from the housing. In FIG. 22, the distal end of the mast is located at a first position relative to the housing. FIG. 23 illustrates the communication assembly of FIG. 22 with the mast in an extended position relative to the position of the mast in FIG. 22. In FIG. 23, the distal end of the mast is located at a second position relative to the housing. The second position is farther from the housing than the first position relative to the housing. When the mast is in the extended, second position, the antenna extends a greater distance from the housing than the distance that the antenna extends in the retracted, first position.

In one or more embodiments, the extension and retraction of the mast is automatically controlled by an actuator device. The actuator may be powered by electric current, compressed air, or the like. Optionally, the mast may be manually extendable instead of, or in addition to, being automatically extendable. The mast may include multiple interconnected segments 2214 that move relative to one another during the extension and retraction processes. In an embodiment, the mast telescopes along an axis 2212. The interconnected segments are nested tubes or sleeves that move along the axis. Optionally, the tubes may have helical threads or tracks that convert rotational movement into linear movement along the axis. For example, an operator or an actuator may elongate the mast by twisting/rotating one tube that causes, via the helical threads, one or more other tubes to linearly move relative to the tube that is rotated. In an alternative embodiment, the adjacent interconnected segments may be connected via hinges, and the mast extends by unfolding at the hinges.

Figure 24:
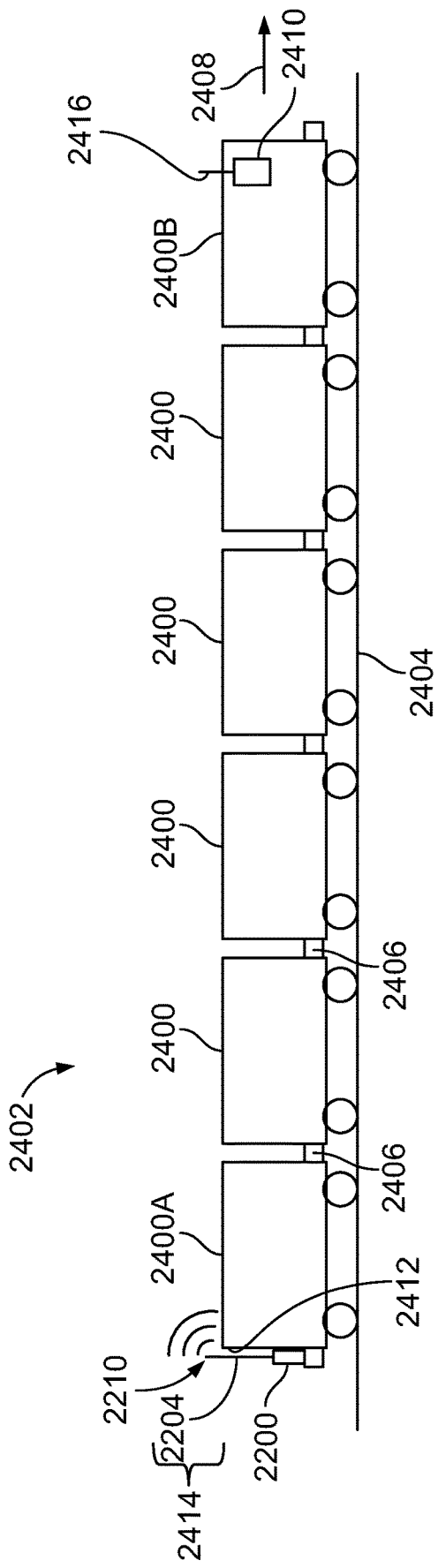
FIG. 24 illustrates the communication assembly mounted onboard a vehicle of a vehicle system according to an embodiment.

FIG. 24 illustrates the communication assembly 2200 mounted onboard a vehicle 2400A of a vehicle system 2402 according to an embodiment. The vehicle system is land-based and travels on a route 2404. The vehicle system includes multiple vehicles 2400 mechanically coupled in a line to travel together along the route. Adjacent vehicles are connected via couplers 2406. One or more of the vehicles in the vehicle system are configured to generate tractive effort for propelling the vehicle along the route. The vehicle system optionally may be longer and include more vehicles than the six vehicles illustrated in FIG. 24. In an embodiment, the vehicle system can be a railroad train, and the route is a track. In other examples, the assembly can be disposed onboard another type of vehicle, such as a train formed by multiple trucks (e.g., highway semi-truck, mining truck, logging truck, or the like), automobiles, buses, and/or the like, and the route can be a paved road, an off-road path, or the like. In an alternative embodiment, at least some of the vehicles of the vehicle system are mechanically separate (e.g., spaced apart without any linkage tethering the vehicles together). For example, mechanically separate propulsion-generating vehicles may be communicatively connected to each other to travel with coordinated movements along the route based on wireless control signals (e.g., to travel as a convoy).

In the illustrated embodiment, the communication assembly with the extendable mast 2204 is disposed on the vehicle that defines a rear end of the vehicle system based on a direction of travel 2408 of the vehicle system. The assembly can be an end-of-system device that communicates with one or more of the other vehicles of the vehicle system for integrity checks, status updates, emergency braking commands, and the like. In one embodiment, the assembly is an EOT device. The assembly may periodically communicate with a lead vehicle 2400B that defines a front end of the vehicle system. The assembly can communicate with a communication device 2410 onboard the lead vehicle using a dedicated radio link. The integrity check may include information that confirms that the rear end of the vehicle system is intact and properly operating, even if the rear end is not visible to an operator or a camera located at the lead vehicle. For example, the information that is periodically communicated to the lead vehicle from the assembly may include a brake pipe pressure in the rear vehicle 2400A, motion status of the rear vehicle (e.g., stationary or moving, vehicle speed, etc.), emergency braking valve status, health and/or charge state of a battery of the assembly, On or Off status of a marker light 2220 (shown in FIG. 22) of the assembly, and the like. The emergency braking valve allows for a secondary emergency application in case of a brake pipe blockage. The marker light is a high visibility light or array of lights that enables people and other vehicle systems to see the rear end of the vehicle system during reduced light conditions (e.g., at night, in tunnels, through forests, and the like). The content of the periodic status messages sent by the assembly to the lead vehicle can be displayed to an operator/engineer on the lead vehicle. In addition to transmitting periodic status messages, the communication assembly may be configured to send aperiodic messages, such as alert messages, to the lead vehicle in response to detecting an alarm condition. For example, the alarm condition may include the brake pipe pressure in the rear vehicle being outside of a designated pressure range (that represents an acceptable pressure range).

The extendable mast of the assembly is extended such that the distal end 2210 of the mast is disposed above the height of the rear vehicle 2400A. For example, the distal end projects above a top edge 2412 of a portion of the rear vehicle adjacent to the mast. The top edge can represent a back wall or body panel of the rear vehicle. In an alternative embodiment, the top edge can represent a portion of cargo carried by the rear vehicle, such as an intermodal container. By extending the mast beyond the top edge, the antenna supported by the mast can communicate without the rear vehicle causing substantial obstruction or interference of the communicated signals. For example, as shown in FIG. 24, the antenna at the distal end of the mast has an unobstructed communication pathway 2414 with an antenna 2416 of the communication device at the lead vehicle above the vehicles of the vehicle system. The communication pathway 2414 can represent a clear line of communication between the devices, even if the devices are not within a line of sight of each other due to the length of the vehicle system, route curvature, trees, and/or the like.

When the mast is retracted, the distal end of the mast may be positioned below the upper edge of the rear vehicle. In the retracted position, communication quality and success rate may be degraded relative to the mast in the extended position because the rear vehicle and/or other vehicles obstruct and interfere with wireless signal transmission. For example, the back wall of the rear vehicle and/or cargo on the rear vehicle can function as a shield that blocks wireless signals that impinge upon the wall. The communication quality may refer to the signal-to-noise ratio, the amount or percentage of a transmitted message that is received and able to be unpacked or interpreted at the recipient, or the like. For example, a greater communication quality may enable more of a transmitted message to be received and unpacked at the recipient than a reduced communication quality. The success rate may refer to a rate or percentage of messages in a series of messages that are successfully received and interpreted at the intended recipient device. A greater success rate indicates that fewer messages are undelivered or lost, relative to a lower success rate. Considering that the assembly may be utilized to communicate periodic status messages for system integrity checks and to communicate alert messages, extending the mast to the extended position shown in FIG. 24 increases the likelihood of such messages being received by the lead vehicle and thereby ensures the safety and continued, unaltered operation of the vehicle system traveling along the route.

In an embodiment, the mast can also hold an antenna of a device that receives RF signals from satellites. For example, the device may be a location determining device, such as a GNSS or GPS receiver. Extending the mast to the extended position can also provide an unobstructed communication pathway with one or more satellites from which the antenna receives signals. For a GPS receiver, the unobstructed communication pathway can enable a more precise determination of the location of the GPS receiver/rear vehicle relative to the location determination that can be made while the mast is retracted. The more precise location determination can improve vehicle system handling operations, such as providing confidence to allow a trailing vehicle system on the route to travel closer to the rear vehicle and/or enables more accurately implementing location-based vehicle tractive and braking settings, as defined in a trip plan.

Figure 25:
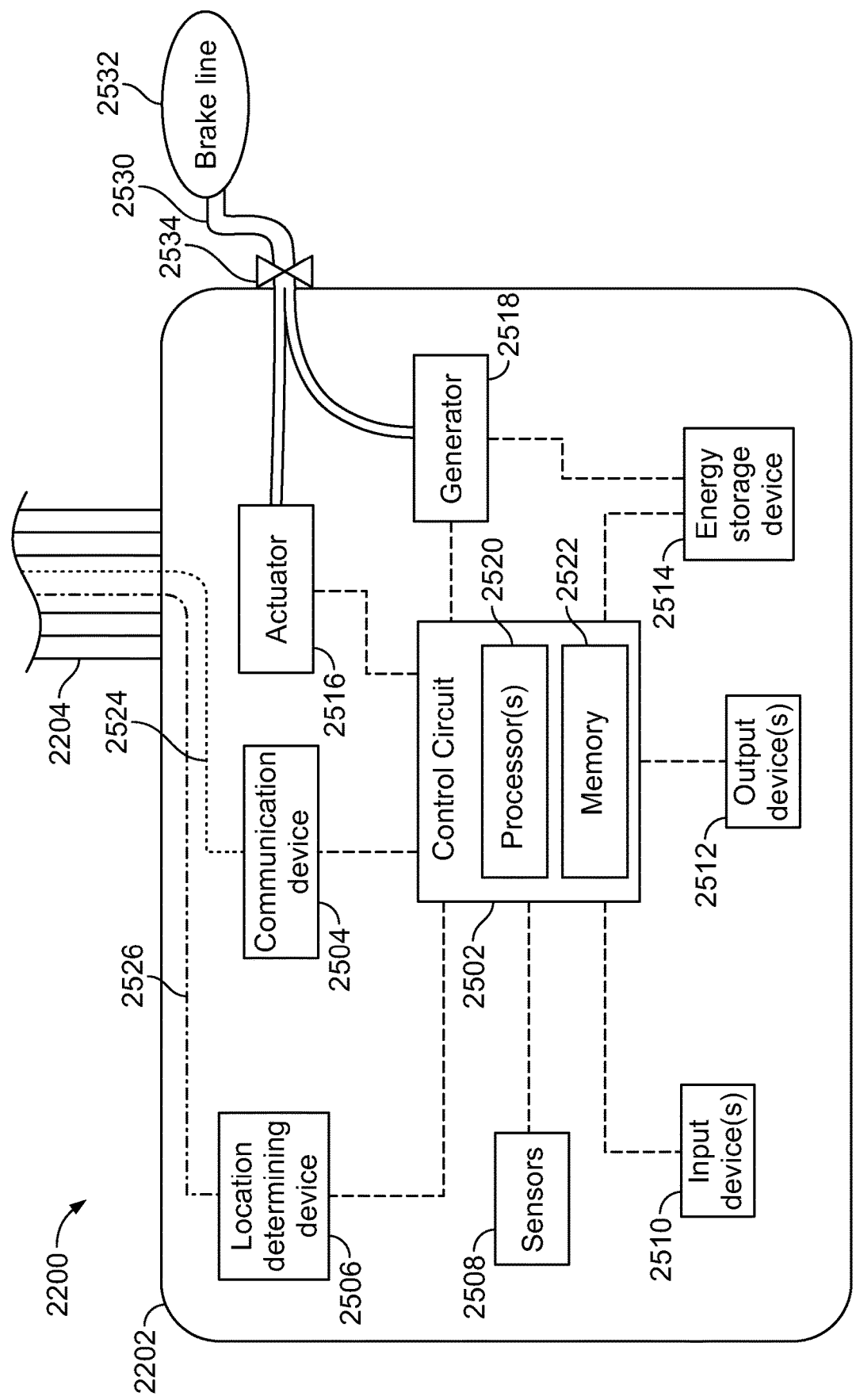
FIG. 25 is a schematic illustration of the communication assembly according to an embodiment.

FIG. 25 is a schematic illustration of the communication assembly 2200 according to an embodiment. The assembly includes various electronic components or devices that are represented as boxes in FIG. 25. The components include a control circuit 2502, a communication device 2504, a location determining device 2506, one or more sensors 2508, one or more input devices 2510, one or more output devices 2512, an energy storage device 2514, an actuator 2516, and a generator 2518. The communication assembly in other embodiments may include at least one additional component that is not shown in FIG. 25 and/or may omit one or more of the components shown in FIG. 25. For example, the assembly may lack the generator in one alternative embodiment, may lack the location determining device in a second alternative embodiment, and may lack the actuator in a third alternative embodiment. The inclusion of optional electronic components in the assembly may be based on application-specific needs and availability, as described herein. The electronic components may be commonly disposed within the housing 2202 of the assembly. Alternatively, one or more of the components may be outside of the housing and coupled to the housing.

The control circuit (or controller) is operably connected to the other electronic components via wired and/or wireless communication pathways. For example, the control circuit may be conductively connected to the electronic components via wires, cables, bus bars, or the like. The control circuit performs at least some of the operations described herein to determine when and how to control the positioning of the extendable antenna mast. The control circuit represents hardware circuitry that includes and/or is connected with one or more processors 2520 (e.g., one or more microprocessors, integrated circuits, microcontrollers, field programmable gate arrays, etc.). The control circuit includes and/or is connected with a tangible and non-transitory computer-readable storage medium (e.g., memory) 2522 disposed onboard the vehicle. For example, the memory may store programmed instructions (e.g., software) that is executed by the one or more processors to perform the operations of the control circuit described herein. The memory additionally or alternatively may store different information, such as (i) a route database, (ii) a trip schedule, (iii) a trip plan that provides tractive and braking settings associated with different locations along the route, and/or (iv) information about the vehicle on which the assembly is mounted (e.g., type of vehicle such as make and model, vehicle dimensions such as height of rear wall that would be adjacent to the assembly, etc.).

The communication device can include or represent circuitry for wirelessly communicating electrical signals. For example, the communication device can represent transceiving circuitry, at least one antenna 2524, and associated circuitry. The transceiving circuitry may include a transceiver or a separate transmitter and receiver. The communication device may communicate RF electrical signals, such as signals in the ultra-high frequency (UHF) range. The electrical signals can represent data packets that in the aggregate form messages. In various embodiments, the control circuit can generate messages that are communicated off-board by the communication device. The communication device can receive messages and forward the messages to the control circuit for analysis of the contents of the received messages.

The location determining device is configured to determine the respective location of the assembly, which indicates the location of the vehicle on which the assembly is mounted. When the vehicle is disposed at the rear end of the vehicle system, as shown in FIG. 24, then the location determining device can provide the location of the rear end of the vehicle system. The location determining device can include a receiver, at least one antenna 2526, and associated circuitry. In an embodiment, the location determining device may be configured to receive signals from satellites. For example, the device may be a global positioning system (GPS) device that generates a three-dimensional positional coordinate in a global coordinate system based on signals received from satellites. In an alternative embodiment, the location determining device can determine the location of the assembly based on a calculated distance from the assembly to a reference device (e.g., a cellular tower, wayside device, or the like) as the vehicle system travels along the route. The reference device is disposed at a known location along the route. The location determining device may measure an elapsed time for a signal to be communicated to the reference device and back to determine a separation distance between the devices. The location of the location determining device along the route can be calculated based on the known location of the reference device and the separation distance.

In the illustrated embodiment, both the antenna 2526 of the location determining device and the antenna 2524 of the communication device extend from the respective circuitry in the housing into the extendable mast 2204. The antennae may have lengths that are at least the length of the mast in the fully extended position to enable to the antennae to project beyond the upper edge of the vehicle as shown in FIG. 24. When the mast is retracted, the excess slack of antennae may be spooled or wound.

The actuator is mechanically coupled to the mast and is configured to exert a force on the mast to raise the mast. The actuator may operate based on control signals received from the control circuit. In the illustrated embodiment, the actuator is pneumatic and operates using compressed fluid to power the mast movement. For example, the actuator is fluidly coupled to a hose 2530 that extends from the housing to a brake line 2532 of the vehicle. The hose is shown in FIG. 22. The hose conveys compressed air from the brake line to the actuator. The pressure of the compressed air can be used to force the extension of the mast. The force exerted on the mast can be controlled by selectively opening and closing one or more valves 2534. In another embodiment, the actuator may consume electric current to power the mast movement. For example, the actuator may be a small motor, such as a servo motor or the like. The actuator may receive the electric current from the generator and/or the energy storage device.

The optional generator is configured to generate electric current using compressed air received from the brake line. For example, the generator may include a turbine that is rotated based on the flow of pressurized air across the turbine. The rotation of the turbine may rotate a rotor relative to a stator, which induces electric current based on a changing magnetic fields. The energy generated by the generator can be supplied to the energy storage device and/or to the actuator. The energy storage device includes or represents one or more battery cells, capacitors, or the like. In an embodiment, the energy storage device can be recharged by current received from the generator. The energy storage device can power the various loads of the communication assembly.

The input device(s) of the assembly can include one or more buttons, switches, a touchpad, a joystick, a mouse, or the like. The input device(s) enable an operator at the assembly to provide manual inputs and selections, such as to input a vehicle identifier for establishing a communication link with another vehicle, turn On or Off power of the assembly, and the like. The assembly in FIG. 22 shows three buttons 2536 that represent input devices. The output device(s) of the assembly can include display, one or more lights, audio speaker, and the like. For example, the marker light 2220 (shown in FIG. 22) represents an output device. The assembly in FIG. 22 also includes a small display screen 2538 proximate to the buttons that provides visual feedback to an operator.

The sensors can include various different types of sensors for monitoring certain conditions and parameters that can be used by the control circuit for determining when and how to adjust the mast height. At least some of the sensors may be coupled to an outer surface of the housing or disposed remote from the housing instead of within the housing. The sensors can include a wind speed sensor, a vehicle speed sensor, an accelerometer, a brake sensor, a proximity sensor, a pressure sensor, a camera, and/or the like. The sensors generate sensor data that is transmitted as signals to the control circuit, which analyzes the sensor data.

In an embodiment, the control circuit is configured to receive information from various electronic components of the assembly, including the communication device, the location determining device, the sensors, and the input device(s), and monitors the received information to determine the occurrence of one or more designated raise events and/or designated lower events. The raise and lower events serve as triggers that motivate the control circuit to adjust the height of the antenna mast. The descriptions of the various raise and lower events can be stored in the memory and/or hardwired into the logic of the one or more processors. In response to determining the occurrent of a raise event, the control circuit generates a signal to raise or extend the mast, such as from the first position shown in FIG. 1 to the second position shown in FIG. 2. In response to determining the occurrence of a lower event, the control circuit generates a signal to lower or retract the mast, such as from the second position shown in FIG. 2 to the first position shown in FIG. 1 or to a different, third position that is between the first and second positions.

In one or more embodiments, the assembly can operate fully autonomously without requiring operator intervention to prompt the mast adjustment or to perform the mast adjustment. In the automated examples, responsive to determining occurrence of a raise event or lower event based on sensor data, location data, and/or the like, the control circuit generates a control signal that is communicated to the actuator. The actuator, upon receipt of the control signal, automatically raises or lowers the mast based on the characteristics of the control signal. For example, the control signal may control a fluid valve to open to allow compressed air from the brake line through the valve into the mast to force the mast to raise. To lower the mast, the control signal may control a release valve to open to allow compressed air to exit the mast. The weight of the mast may cause the mast to retract due to the lack of air pressure maintaining the mast in the raised position. In another example, the control signal may control a motor of the actuator to rotate a designated amount (e.g., quantified in steps) which causes the mast to raise or lower a corresponding length.

In one or more alternative embodiments, the movement of the mast may be semi-automated. In a first semi-automated example, an operator input device is used to manually command the automated movement of the mast up and down. For example, the operator may push one of the dedicated buttons 2536 on the assembly, which can represent the input device. Optionally, the operator input device that provides the input can be an off-board device, such as a handheld mobile device or an output device located on another vehicle. The operator at the lead vehicle of the vehicle system can select a mast raise function on an input device integrated on the lead vehicle, and the communication device 2410 (shown in FIG. 24) can transmit the operator command to the communication device 2504 of the assembly. The manually input command can be electronically conveyed to the control circuit. The receipt of the manual input command at the assembly can represent a designated raise event or lower event. In response to receiving the input command, the control circuit generates the control signal, as described above, for automatically extending or retracting the mast via the actuator.

In a second semi-automated example, the assembly prompts an operator to manually adjust the mast up or down based on an autonomously-determined raise or lower event. The manual intervention relates to the triggering event in the first semi-automated example above, and the manual intervention relates to the mast adjustment in this second example. Upon determining the occurrence of a raise event or lower event, the control circuit generates an alert signal that is communicated to an output device. The output device uses the alert signal to generate a notification that instructs the operator to manually adjust the mast. The assembly according to this example may lack the actuator shown in FIG. 4. The output device that receives the alert signal may be an output device 2512 of the assembly, such as the display screen 2538 shown in FIG. 22. For example, the assembly may flash one or more lights, emit a sound, and/or display a text-based message on the display that instructs an operator viewing the display to raise the mast or lower the mast. Optionally, the communication device of the assembly may transmit the alert signal to an off-board device, such as a handheld mobile device or an output device located on another vehicle.

There are various conditions and/or events that can be designated as triggers for raising the mast. For example, one or more designated raise events may be associated with the start-up of a vehicle or vehicle system while stationary and/or during initial movement along the route. The mast may be in a retracted position when not in use, such as when the vehicle is stationary for an extended period of time. The default retracted position may reduce the risk of damage to the mast caused by wind or other environmental conditions, impacts from equipment, and/or the like, relative to the mast being in an extended position. In an embodiment, the mast may be configured to extend to a raised position as a default position during travel of the vehicle or vehicle system along the route in order to increase communication quality and success by avoiding obstructions in the communication pathways. There are various events that occur during vehicle start-up that can be used as designated raise events.

In one example, initiation of a communication linking procedure, or arming procedure, is a designated raise event. The communication linking procedure is performed to establish a communication link between the communication device of the communication assembly and a second communication device on another vehicle. The communication link may represent a designated RF frequency range or channel. With reference to FIG. 24, the communication device 2410 on the lead vehicle 2400B can represent the second communication device. The communication linking procedure can be initiated by one of the communication devices communicating a link request message that is received by the other communication device. The recipient device then transmits a link response message back to the sender. A communication link between the two communication devices can be established upon receipt of the link response message by the sender of the link request message. During subsequent travel of the vehicles along the route, the two communication devices can communicate with each other via the communication link. The control circuit may determine that the communication linking procedure is initiated based on the communication device of the assembly receiving the link request message and/or sending the link request message.

Another designated raise event involved with vehicle start-up may be detecting that the vehicle is in motion. For example, the control circuit may receive signals from a motion sensor that indicates that the vehicle is moving relative to the route. The motion sensor may be an accelerometer, a vehicle speed sensor, or the like. Upon detecting that the vehicle is in motion, based on the sensor signals, the control circuit may generate the signal to raise the mast. Yet another designated raise event may be detecting that brakes of the vehicle are released, which can indicate impending movement. The control circuit may receive signals from a sensor associated with the brakes. The sensor may be a position sensor or proximity sensor that can indicate that the brakes are not engaged with the wheels and/or axles, a pressure sensor that can detect a pressure in the brake line that is associated with the brakes being released, an audio sensor that can detect a sound associated with the release of air from a brake system, or the like. Upon detecting that the brakes are released, based on the sensor signals, the control circuit may generate the signal to raise the mast.

The designated raise event may occur based on a condition experienced as the vehicle travels along the route. In one example, the designated raise event may be based on sub-standard communication conditions between the communication device of the assembly and a second communication device off-board the vehicle. For example, the communication devices may be configured to send periodic communications at designated time intervals. The assembly at the end of the vehicle system can send a status update message every minute, for example, for a system integrity check. The communication device that receives the status update message may transmit a receipt confirmation messages to the assembly confirming that each status update is received. In an embodiment, the lack of receipt of an expected periodic message from the recipient communication device can indicate total communication loss between the two devices. For example, after communicated a status update message, if the assembly does not receive a confirmation message for at least a designated amount of time from the message send time, such as 45 seconds, then the assembly communication device may resend the update message. If no confirmation is received after another designated amount of time, then the control circuit may determine that communication is lost between the devices. The communication loss can be a designated raise event because the loss of communication can potentially be caused by obstructions in the wireless communication pathway. Raising the mast can enable the antenna to extend beyond the obstructions, reestablishing communication with the second communication device.

In another example related to sub-standard communication conditions, the control circuit may be configured to analyze received messages from the second communication device to grade the quality of the messages. If the determined communication quality of multiple messages received from the second communication device is below a designated threshold level, the control circuit can label the messages as having a degraded communication quality. The quality of the messages may be based on one or more parameters, such as signal-to-noise ratio. Upon labeling the messages as having degraded communication quality, the control circuit generates the signal to raise the mast. Identifying received messages as having degraded communication quality can be a designated raise event because messages having insufficient quality may not be able to be accurately interpreted and analyzed, such that the effect may be similar to total communication loss. Raising the mast can improve the signal quality by positioning the antenna beyond local obstructions.

One or more designated raise events may be based on a location of the vehicle along the route. For example, the location signals generated by the location determining device on the assembly can be analyzed by the control circuit. The memory of the control circuit may store a route database that provides a map of the route and various information about different segments of the route. The control circuit may compare the location signals with the map to determine the location of the vehicle relative to the route at different times during a trip. Optionally, the route database may indicate specific segments of the route that are associated with degraded communications. The degraded communication segments, or dead zones, may be determined based on historical data and/or observations from previous trips along the route. The dead zones may have wayside structures or route features that obstruct radio communications. For example, if a route winds around a mountain, the mountain may obstruct communications between the front vehicle and rear vehicle of a long vehicle system. The designated raise event may be the control circuit determining, based on the location signals and the route database, that the vehicle is approaching or entering a dead zone. Raising the mast for traveling through a dead zone can improve the chance of having successful communications by avoiding local obstructions on the vehicle system itself.

In another example, the route database may indicate specific segments of the route that have height restrictions and/or that lack height restrictions. The height restrictions may include tunnels, overpasses, a low canopy of tree branches, of the like. When the mast in the fully raised or extended position, the mast may extend higher than other portions of the vehicle, as shown in FIG. 3. However, the mast in the raised position can be damaged if the mast collides with trees or more solid structures above the vehicle. In an embodiment, the control circuit can determine, based on the location signals and route database, that the upcoming segment or segments are clear of height restrictions. Upon determining that there is no risk of collision along the next segment of route, the control circuit can raise the mast higher for the benefit of achieving improved communications.

The mast and/or actuator may be able to position the distal end at various different locations along a range between a fully retracted position and a fully raised position. In an embodiment, the distance that the mast is extended in response to a raise event may be based on the height of the vehicle, such as the height of the vehicle walls and/or onboard cargo. For example, if the mast is extendable to a height of 25 feet from the ground, and the vehicle on which the assembly is mounted has a height of 10 feet, it may not be advisable to extend the mast to the fully raised position. For example, the mast generally may be more vulnerable to damage due to wind, inertial forces, vibration, and the like the farther the mast extends. In the scenario above, raising the mast to a height of 11 or 12 feet would potentially improve communications by avoiding the obstruction caused by the 10 foot tall vehicle, without raising the mast the full height.

Figure 26:
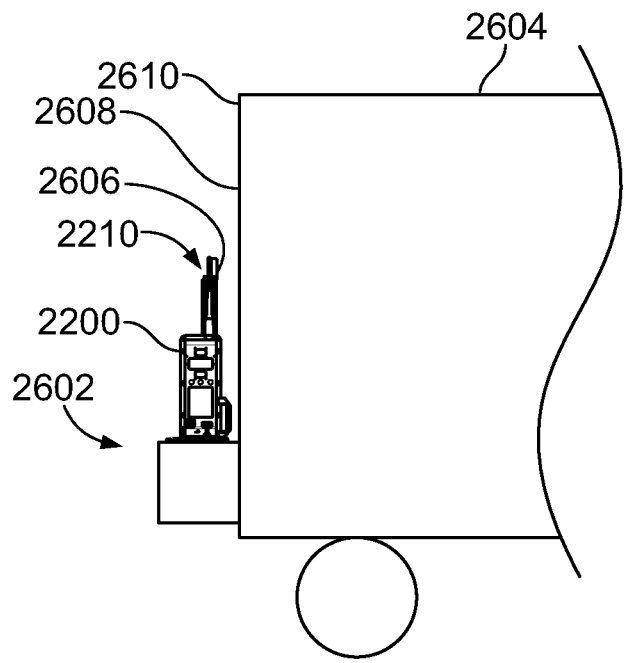
FIG. 26 illustrates the communication assembly mounted at a rear end of a vehicle and disposed in a retracted position.
Figure 27:
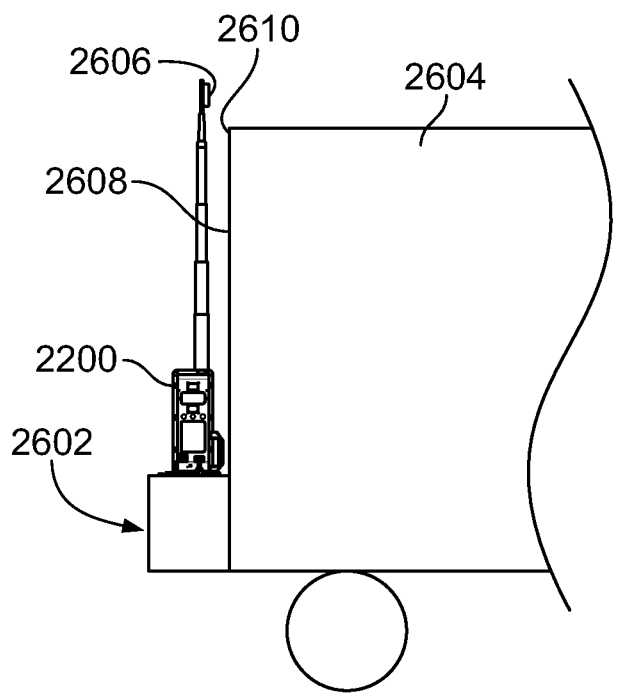
FIG. 27 illustrates the communication assembly and vehicle of FIG. 26 with the mast in a raised or extended position according to an embodiment.

FIG. 26 illustrates the communication assembly 2200 mounted at a rear end 2602 of a vehicle 2604 and disposed in a retracted position. FIG. 27 illustrates the communication assembly 2200 and vehicle 2604 of FIG. 26 with the mast in a raised or extended position according to an embodiment. The assembly includes a proximity sensor 2606 mounted on the mast 2204 at or proximate to the distal end 2210. In response to determining the occurrence of a designated raise event, the control circuit controls the actuator to begin raising the mast. In an embodiment, the proximity sensor is directed at a rear structure 2608 of the vehicle. The rear structure can represent a portion of the vehicle itself and/or a portion of cargo carried by the vehicle. The proximity sensor generates sensor signals that indicate whether the sensor is proximate to the rear structure at the current position of the sensor. The control circuit receives and analyzes the sensor signals as the mast rises. Once the sensor on the mast raises beyond a top edge 2610 of the vehicle, the sensor signals generated by the sensor may change, indicating that there is no portion of the vehicle adjacent to the sensor. Based on the sensor signals, the control circuit can detect when the mast projects above the top edge of the vehicle. The control circuit may control the actuator to hold the mast at a fixed position in which the distal end of the mast is marginally above the top edge, such as one foot, two feet, or three feet (e.g., approximately one meter) above the top edge, even if the mast has the ability to extend farther.

Optionally, instead of utilizing a sensor, the height of the vehicle may be stored in a database within memory of the control circuit. Based on identifying the type of vehicle that the assembly is mounted to, such as via operator input or stored trip information in the memory, the control circuit can control the actuator to raise the mast to a height that is associated with the height of the vehicle. For example, if the type of vehicle has a known height of 15 feet, the control circuit can command the actuator to raise the mast to 16 or 17 feet.

In an embodiment, while the mast is in the raised position, the control circuit is configured to monitor for conditions that represent designated lower events. In response to determining the occurrence of a designated lower event, the control circuit generates a signal to lower the mast from the raised position to a retracted position. One designated lower event may be determining that an upcoming segment of the route has a height restriction which poses a collision risk with the raised mast. The height restriction can be determined by comparing the current location of the vehicle, based on location signals, to known locations along the route of height restrictions as stored in a route database. Alternatively, the upcoming height restriction can be determined based on a camera or sensor disposed on a vehicle ahead of the vehicle on which the assembly is mounted. For example, the lead vehicle of the vehicle system shown in FIG. 3 may include a camera and/or sensors that generate data that can be analyzed to determine low clearance trees, tunnels, overpasses, or the like, as the lead vehicle travels under. The communication device on the assembly can receive a warning message from the lead vehicle indicating the upcoming low clearance. The receipt of such warning message can be the designated lower event that causes the control circuit to control the actuator to automatically retract the mast. Optionally, the control circuit may only lower the mast to the height of the vehicle based on signals received from the proximity sensor. The control circuit can raise the mast again after passing the height restriction.

One or more designated lower events may be based on environmental conditions. For example, in response to determining that the wind speed surrounding the vehicle exceeds a designated wind speed threshold, the control circuit may generate a signal to lower the mast. The wind speed threshold may be based on application-specific parameters, such as the structural rigidity of the mast. For example, the wind speed threshold may be selected based on the risk that the mast in the fully raised position can be damaged by the wind. The vehicle driving conditions can also represent one or more designated lower events. For example, if the speed of the vehicle exceeds a designated upper vehicle speed threshold, then the control circuit may lower the mast. At higher vehicle speeds, the inertial forces around curves and when braking could potentially damage the mast.

Other designated lower events may be based on indications that the vehicle has completed a trip or a segment of the trip. For example, upon detecting that the vehicle is stationary, the control circuit may generate a signal to lower the mast. The control circuit can detect that the vehicle is stationary based on a vehicle speed sensor, an accelerometer, and/or the like. Another lower event could be determining that the communication link between the communication device and the second communication device is terminated. Yet another lower event could be receiving a signal from an operator input device to turn Off the assembly and/or lower the mast. In an embodiment, the mast may automatically retract when not in use for storage purposes and to reduce the risk of damage to the mast.

Figure 28:
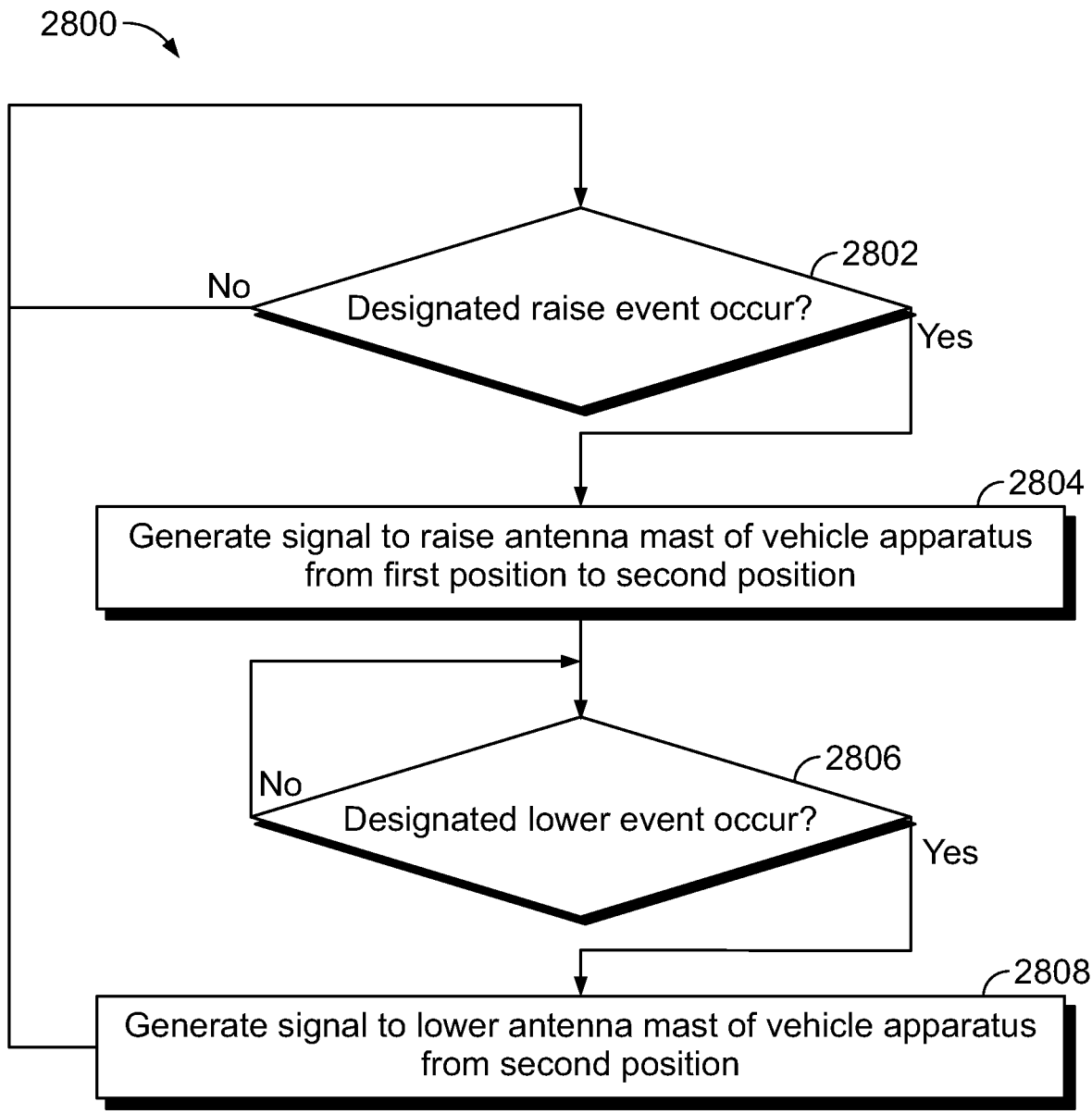
FIG. 28 is a flow chart of a method for controlling an extendable antenna mast of a communication assembly according to an embodiment.

FIG. 28 is a flow chart 2800 of a method for controlling an extendable antenna mast of a communication assembly according to an embodiment. The method may be performed by the communication assembly described above with reference to FIGS. 22 through 27. Certain steps of the method may be performed by the control circuit shown in FIG. 25 based on programmed logic or instructions. The method optionally includes additional steps than shown, fewer steps than shown, and/or different steps than shown. At step 2802, a determination is made whether a designated raise event has occurred. If it is determined that the designated raise event has indeed occurred, then flow proceeds to step 2804 and a signal is automatically generated to raise an antenna mast of a communication assembly from a first position to a second position. The first and second position may be defined based on a common portion of the mast, such as a distal end of the mast. The distal end in the second position is located farther away from a housing of the assembly than in the first position. If, on the other hand, the designated raise event has not occurred, monitoring continues for the designated raise event.

At step 2806, with the mast at the second position, a determination is made whether a designated lower event has occurred. If it is determined that the designated lower event has indeed occurred, then flow proceeds to step 2808 and a signal is automatically generated to lower the antenna mast. The mast may be lowered back to the first position or to third position. If the designated lower event has not occurred, monitoring continues for the designated lower event.

One or more technical effects of the communication assembly described herein include the ability to improve communications by extending the antenna or antennae to heights that clear the local obstruction caused by the vehicle on which the assembly is mounted. The improved communications can result in fewer missed messages and misinterpretations of message content and/or increased location determination accuracy. Another technical effect is the ability to determine when and how to adjust the mast based on conditions experienced during use. The condition-based control of the mast height can enable selective balancing of the communication benefits achieved with a tall antenna mast with the associated increased risk of damage.

In one or more embodiments, an assembly (e.g., a communication assembly) is provided that includes a housing, a communication device, an extendable mast, and a control circuit. The housing is configured to be mounted on a vehicle. The communication device includes an antenna and is disposed at least partially within the housing. The extendable mast is mechanically coupled to the housing and supports the antenna. The control circuit is operably coupled to the mast and is configured to generate a signal to raise the mast from a first position of a distal end of the mast to a second position of the distal end in response to determining occurrence of a designated raise event. The antenna extends a greater distance from the housing in the second position of the mast than in the first position.

Optionally, the signal is a control signal that is communicated to an actuator mechanically coupled to the mast. The actuator is configured to automatically raise the mast in response to receipt of the control signal. The assembly may also include a proximity sensor mounted on the mast proximate to the distal end. The actuator may be configured to raise the mast until the control circuit determines, based on sensor signals from the proximity sensor, that the distal end of the mast is located above a top edge of the vehicle.

Optionally, the signal is an alert signal that is communicated to an output device. The output device may be configured to automatically generate a notification in response to receipt of the control signal for prompting an operator to manually raise the mast.

Optionally, the communication device is configured to communicate with a second communication device on another vehicle. The control circuit is configured to detect, as the designated raise event, one or more of degraded communication quality or total communication loss between the communication device and the second communication device.

Optionally, the assembly also includes a location determining device operably coupled to the control circuit and configured to generate location signals as the vehicle travels along a route. The control circuit may be configured to determine, as the designated raise event and based on the location signals, that an upcoming segment of the route is associated with degraded communications. The control circuit may be configured to determine, as the designated raise event and based on the location signals, that an upcoming segment of the route is clear of height restrictions.

Optionally, the control circuit is configured to detect, as the designated raise event, initiation of a communication linking procedure between the communication device and a second communication device on another vehicle. Optionally, the control circuit is configured to detect, as the designated raise event, that one or more of the vehicle is in motion or brakes of the vehicle are released. Optionally, the communication device is configured to receive, as the designated raise event, a command signal to raise the mast communicated from an operator input device.

Optionally, the assembly also includes a pneumatic actuator operably coupled to a brake line of the vehicle and configured to power the raising of the mast using compressed air received from the brake line.

Optionally, the control circuit is further configured to generate a second signal to lower the mast from the second position of the distal end of the mast to the first position and/or a third position of the distal end in response to determining occurrence of a designated lower event. The assembly may also include a location determining device operably coupled to the control circuit and configured to generate location signals as the vehicle travels along a route. The control circuit may be configured to determine, as the designated lower event and based on the location signals, that an upcoming segment of the route has a height restriction. Optionally, the control circuit is configured to detect, as the designated lower event, that the vehicle is stationary. Optionally, the control circuit is configured to determine, as the designated lower event and based on signals received from one or more sensors onboard the vehicle as the vehicle travels along a route, that (i) a wind speed exceeds a designated wind speed threshold and/or (ii) a speed of the vehicle exceeds a designated upper vehicle speed threshold.

Optionally, the vehicle on which the housing is mounted is located at a rear end of a vehicle system comprising multiple vehicles. The rear end is based on a direction of travel of the vehicle system along a route.

In one or more embodiments, a method (e.g., for controlling an extendable antenna mast) is provided that includes determining, via a control circuit of a communication assembly disposed on a vehicle, occurrence of a designated raise event. The communication assembly includes a housing and an extendable mast mechanically coupled to the housing. Responsive to determining the occurrence of the designated raise event, the method includes automatically generating a signal to raise the mast from a first position of a distal end of the mast to a second position of the distal end. The mast mechanically supports an antenna of a communication device of the communication assembly, and the antenna extends a greater distance from the housing in the second position of the mast than in the first position.

Optionally, determining the occurrence of the designated raise event includes detecting one or more of degraded communication quality or total communication loss between the communication device and a second communication device disposed on another vehicle.

Optionally, the method also includes receiving location signals at the control circuit. The location signals are generated by a location determining device of the communication assembly. Determining the occurrence of the designated raise event includes determining, based on the location signals as the vehicle travels along a route, that an upcoming segment of the route is associated with degraded communications and/or is clear of height restrictions.

Optionally, determining the occurrence of the designated raise event includes detecting initiation of a communication linking procedure between the communication device of the communication assembly and a second communication device on another vehicle. Optionally, determining the occurrence of the designated raise event includes detecting that one or more of the vehicle is in motion or brakes of the vehicle are released.

In one or more embodiments, an assembly (e.g., a communication assembly) is provided that includes a housing, an extendable mast, an antenna, and a control circuit. The housing is configured to be mounted on a vehicle. The mast is mechanically coupled to the housing and configured to extend and retract relative to the housing to control a position of a distal end of the mast. The antenna is mechanically coupled to and supported by the mast. The control circuit is operably coupled to the mast and configured to generate a first signal to raise the mast from a first position of the distal end to a second position of the distal end in response to determining occurrence of a designated raise event. The antenna extends a greater distance from the housing in the second position of the mast than in the first position. The control circuit is configured to generate a second signal to lower the mast from the second position of the distal end to the first position and/or a third position of the distal end in response to determining occurrence of a designated lower event.

One or more other embodiments of the subject matter described herein relate to systems and methods that change characteristics of data signals wirelessly communicated by a communication device of a system, such as a monitoring and communication device, an EOT or end-of-vehicle monitoring system, etc. The EOV monitoring system may be transferably coupled with a vehicle system, and may monitor the vehicle system, the route along which the vehicle system moves, or the like. Alternatively, the communication device may be onboard the vehicle in another location, such as a head or leading end of the vehicle or another location. The system includes a housing with a vehicle monitoring device disposed within a cavity of the housing. Additionally or alternatively, the vehicle monitoring device may operate as a vehicle signaling device. The vehicle monitoring device includes a communication device that includes one or more of an antenna, a modem, or the like, that wirelessly communicate data signals. As one example, the communication device may include an antenna that may be an ultra-high frequency antenna, such that the communication device may be able to communicate within a frequency range of about 300 megahertz and about 3 gigahertz (e.g., within 1% of 300 megahertz and within 1% of gigahertz in one embodiment, within 3% of 300 megahertz and within 3% of gigahertz in another embodiment, or within 5% of 300 megahertz and within 5% of gigahertz in another embodiment). Optionally, the communication device may be an alternative antenna or device that may be capable of communicating in different frequency ranges or at different discrete frequencies.

The wireless communication device is operably coupled with one or more ground radials or other ground radials that conduct data signals to and/or from the communication device. For example, the communication device may communicate with a controller onboard a vehicle system via a vehicle communication system, may communicate with a controller off-board the vehicle system via an off-board communication system, or the like. The ground radials may form a ground plane of the antenna, such as while the vehicle system is moving, while the antenna is wirelessly communicating the data signals, or the like. Optionally, the ground radials may change one or more characteristics of the data signals wirelessly communicated by the communication device. For example, first ends of the ground radials may be operably coupled with the communication device, and second ends of the ground radials may be disposed a distance away from the communication device and routed to different locations within the housing of the EOV system and/or locations outside of the housing of the EOV system.

In one or more embodiments, the ground radials may be flexible ground radials that may be able to be formed, bent, shaped, or the like, to allow the ground radials to be routed around different components within the housing of the EOV system. Optionally, one or more of the ground radials, or portions of the ground radials, may be rigid structures that may not be able to be bent, shaped, deformed, or the like. Optionally, a portion of one of the ground radials may extend within one of the walls or surfaces of the housing of the EOV system. Optionally, a portion of one of the ground radials may extend outside of the housing of the EOV system.

Figure 29:
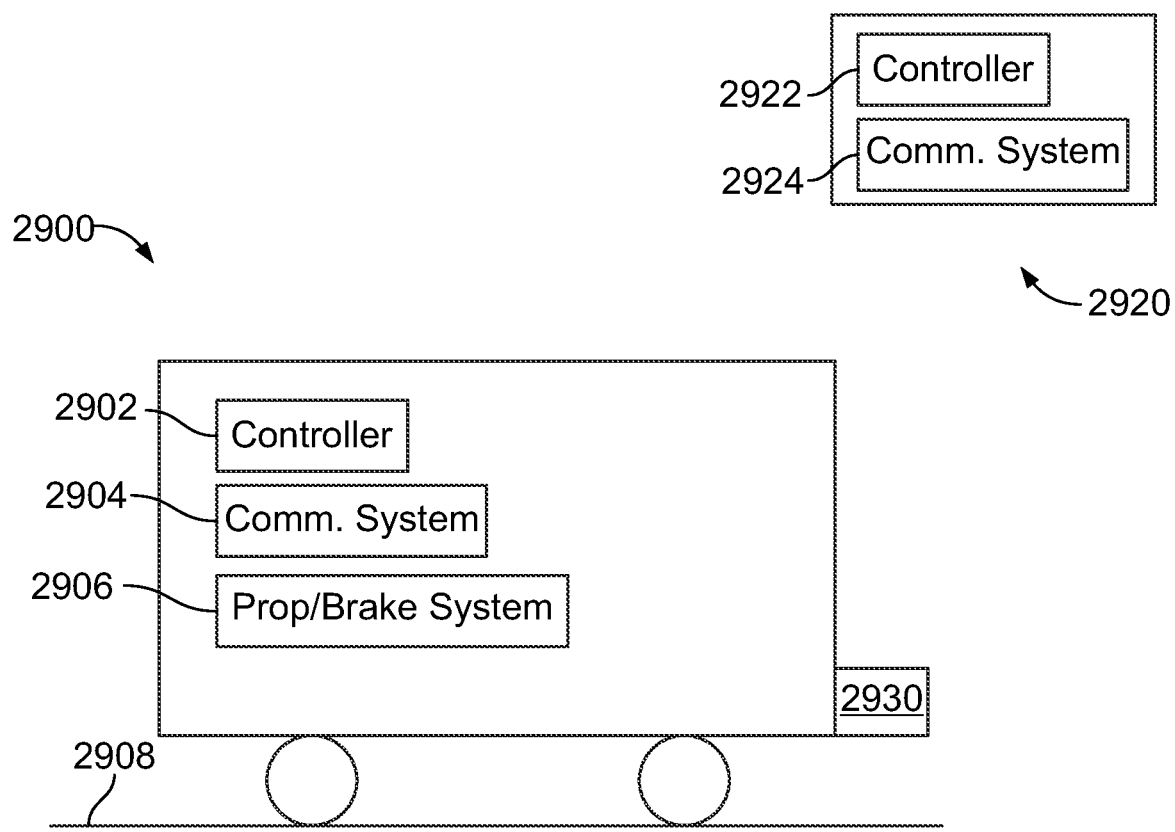
FIG. 29 schematically illustrates a vehicle system in accordance with one embodiment.

FIG. 29 illustrates a vehicle system 2900 in accordance with one embodiment. The vehicle system can be a rail vehicle system, but optionally can be an automobile, a truck, a bus, a mining vehicle, a marine vessel, aircraft, agricultural equipment or vehicles, or other off-highway vehicle. While some embodiments described herein relate to vehicle systems, not all embodiments of the inventive subject matter are restricted to vehicle systems. One or more embodiments of the inventive subject matter may relate to other types or models of systems, such as mechanical systems, warehouse facilities, power grid components, mining and/or agricultural equipment, or the like. The illustrated vehicle system includes a single vehicle, but optionally can be formed from two or more vehicles that may travel together (by being mechanically coupled and/or by being mechanically separate but communicating with each other to travel together, such as in a convoy). The vehicle system travels along a route 108, such as tracks, roads, highways, land-based paths, airborne paths, waterways, or the like. Optionally, the vehicle system may include two or more different types of vehicles that may operate as a common vehicle system and that may communicate with each other via the off-board database. For example, the vehicle system may comprise a rail vehicle that may communicate with an unmanned aerial vehicle via the off-board database, or an aircraft that communicates with a marine vessel.

The vehicle system includes a controller 2902, which may be referred to as an onboard controller. The onboard controller can represent hardware circuitry that includes and/or is connected with one or more processors that perform operations described in connection with the onboard controller. The onboard controller can communicate with onboard and/or off-board components via a vehicle communication system 2904. The vehicle communication system can represent transceiving circuitry, one or more antennas, modems, or the like. In one or more embodiments, the vehicle communication system may receive and/or provide data signals to the onboard controller. The vehicle communication system may be the same or similar to other communication devices described herein.

The vehicle system includes a propulsion and brake system 2906 that operates to control movement of the vehicle system along the route. The propulsion and brake system can represent one or more engines, motors, transmissions, propellers, or the like, that generate propulsion to move the vehicle system. The brake system can operate to slow or stop movement of the vehicle system. The brake system can include air brakes, friction brakes, motors (e.g., used for dynamic or regenerative braking), or the like. The onboard controller can communication control systems to the propulsion and brake system to control or change movement of the vehicle system.

In one or more embodiments, the vehicle system may include one or more energy storage devices (not shown) that store and/or generate electric current. This current can be used to power components onboard the vehicle system, such as the propulsion system, a lighting system, or the like. Optionally, the energy storage devices can include or represent one or more motors of the propulsion system and/or the brake system (e.g., where the motors generate current during regenerative braking). The energy storage devices can include one or more batteries, fuel cells, photovoltaic devices, flywheels, alternators, generators, or the like. The onboard controller can communicate control signals to the energy storage devices to control supply of the current to one or more components of the vehicle system.

The onboard controller of the vehicle system may communication with an off-board controller 2922 of an off-board database 2920. The off-board controller can represent hardware circuitry that includes and/or is connected with one or more processors that perform operations of the off-board controller. The off-board database may be disposed at a location along the route, or may be positioned a distance away from the route, such as a database facility. For example, the off-board database may be located such that the vehicle system may be visible to an operator of the off-board database. Alternatively, the off-board database may be disposed in a different county, in a different state, in a different country, or the like, as the vehicle system. In one or more embodiments, the off-board controller can communicate with the onboard controller of the vehicle system to control or restrict movement of the vehicle system. For example, the off-board controller can communicate with the onboard controller of the vehicle system to notify the vehicle system where the vehicle system is allowed to travel, how fast the vehicle system is allowed to travel, or the like.

In one embodiment, the off-board database may represent a back-office server of a positive vehicle control (PVC) system. A PVC system is a control system in which a vehicle system is allowed to move, and/or is allowed to move outside a designated restricted manner (such as above a designated penalty speed limit), only responsive to receipt or continued receipt of one or more signals (e.g., received from off-board the vehicle) that meet designated criteria, e.g., the signals have designated characteristics (e.g., a designated waveform and/or content) and/or are received at designated times (or according to other designated time criteria) and/or under designated conditions. This is opposed to 'negative' vehicle control systems where a vehicle is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board database may represent another computerized system that communicates with vehicle systems described herein.

In one or more embodiments, a system 2930 may be coupled with the vehicle system. The system may be referred to as an EOT, EOV monitoring system, monitoring and communication system, or the like. The monitoring system may monitor the vehicle system and/or the route along which the vehicle system moves. In one or more embodiments, the vehicle system to which the monitoring system is coupled can be referred to as an EOT vehicle or EOV vehicle. The EOT system may be a transferrable device that may be moved from one vehicle to another vehicle that may change the designation of the respective vehicle from which the EOT system is removed, and the other vehicle where the EOT system is moved to may be identified as a new EOT vehicle.

Figure 30:
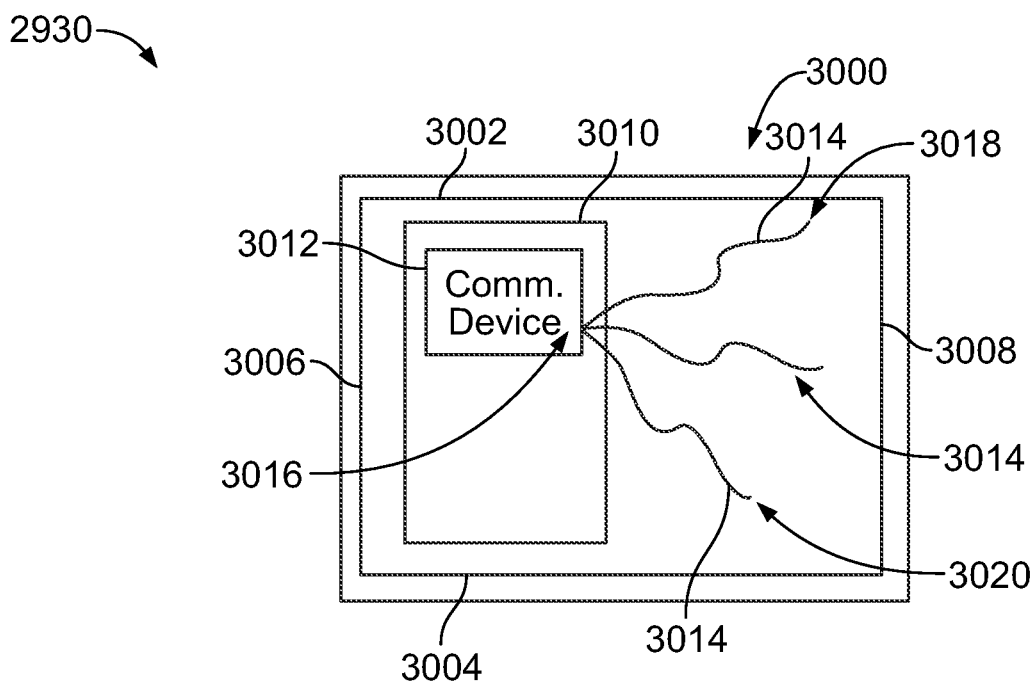
FIG. 30 illustrates a system of the vehicle system shown in FIG. 29 in accordance with one embodiment.

FIG. 30 illustrates the system 2930 or the EOV system in accordance with one embodiment. The EOV system includes a housing 3000 formed by plural surfaces, such as first, second, third, and fourth surfaces 3002, 3004, 3006, 3008, respectively, as illustrated in FIG. 29. The plural surfaces define an enclosure or cavity 3020 such that the cavity is separated from the environment outside of the plural surfaces. One or more of the plural surfaces may be rigid surfaces and may be manufactured and designed to withstand rugged environments. For example, the surfaces may be manufactured of a metal or metallic alloy, a plastic, or other engineered material, such that the shape of the surfaces may remain substantially unchanged responsive to impact or compression forces directed onto the surfaces.

The EOV system includes a vehicle monitoring device 3010 disposed within the cavity of the housing. The vehicle monitoring device includes a wireless communication device 3012 that can represent and/or include transceiving circuitry, one or more antennas, modems, or the like. In one or more embodiments, the wireless communication device of the vehicle monitoring device may receive and/or provide data signals via the antenna to the onboard controller by wirelessly communicating with the vehicle communication system. Optionally, the antenna of the communication device may communicate data signals with the off-board communication system, directly or via the vehicle communication system.

In one or more embodiments, the vehicle system may include plural vehicles operably coupled together, and the EOV system may be coupled with the last vehicle of the vehicle system in the direction of travel of the vehicle system. For example, the EOV system may be positioned at a location out of a direct line of sight with a lead vehicle of the vehicle system. The antenna of the communication device may wirelessly communicate command signals with one or more of the vehicles of the vehicle system. For example, the communication device may communicate data signals with a lead vehicle of the vehicle system and/or the same or different data signals with other vehicles of the vehicle system. The communication device of the vehicle monitoring device may be the same or similar to other communication devices described herein.

In one or more embodiments, the one or more processors of the onboard controller, the off-board controller, and/or the vehicle monitoring device may generate and/or communication electronic command messages to control operations of the propulsion and brake systems of the vehicle system, to control operations of other vehicles operably coupled with the vehicle system, to control operations of other vehicles mechanically separated from the vehicle system, or the like.

The vehicle system and/or the EOV system may include one or more sensors (not shown), that can detect characteristics of the vehicle system, the vehicle, the monitoring device, and/or the route. For example, the sensors may detect characteristics of the vehicle system such as, but not limited to, if the vehicle system is stationary or moving, operating parameters of the moving vehicle system (e.g., speed, direction, or the like), a geographic location of the vehicle system, or the like. The sensors may detect characteristics of the EOV system such as, but not limited to, a location of the EOV system, a health score or index of the system, or the like. The sensors may detect characteristics of the route such as, but not limited to, identifications, locations, and/or statuses of wayside devices disposed along the route, route gradients, a health status of the route (e.g., blockages, deteriorating conditions, or the like), or the like.

The EOV system includes one or more ground radials 3014 electrically coupled with the communication device. The ground radials conduct the data signals from the communication device, for example data signals communicated to the vehicle communication system, the off-board communication system, or the like. In the illustrated embodiment of FIG. 30, the EOV system includes three ground radials. Each of the ground radials extends from a first end 3016 operably coupled with the communication device, and a second end 3018 disposed a distance away from the communication device. The second end of each of the ground radials is unterminated or unconnected, such as from another electrical device. For example, the second ends of the ground radials may be unterminated to form a ground plane of the antenna of the communication device. The three ground radials are disposed within the cavity of the housing of the EOV system and extend in different directions away from the communication device and toward the first, second, and fourth surfaces 3002, 3004, 3008, respectively, but alternatively may extend in any alternative direction within the cavity.

The ground radials may change a characteristic of the data signals communicated by the communication device. For example, the communication device may be capable of communicating data signals a first distance away from the EOV system without the ground radials, and the communication device may be capable of communicating data signals a longer, second distance away from the EOV system with the ground radials. In one or more embodiments, the communication device may be an ultra-high frequency antenna device that communicates signals having a frequency range of about 300 megahertz and about 3 gigahertz. The communication device may be unable to communicate the data signals within the frequency range of about 300 megahertz and 3 gigahertz without the ground radials, and the ground radials may allow the communication device to communicate the data signals with the onboard controller and/or the off-board controller via the vehicle communication system and/or the off-board communication system, respectively within the ultra-high frequency range. For example, the ground radials may change a strength of the data signals, may change a distance away the data signals may be communicated, or the like.

In one or more embodiments, the ground radials may be referred to as radials, ground radials, ground conductors, or the like. The ground radials form a ground plane of the antenna of the communication device of the vehicle monitoring device. For example, the ground radials may form a conducting surface within the housing of the vehicle monitoring device that receives and/or reflects data signals wireless communicated with the communication device. The placement or position of the different radials may control a size, shape, and/or orientation of the ground plane. Optionally, the size, shape, and/or orientation of the ground plane may be based on the frequency range used by the antenna to communicate the data signals.

In one embodiment, the ground radials may form the ground plane of the antenna within the vehicle monitoring device while the vehicle system is in transit or moving. Optionally, the ground radials may form a ground plane of the antenna while the vehicle system is stationary. Optionally, the ground radials may form the ground plane of the antenna while the antenna is wirelessly communicating data signals between a controller outside of the vehicle monitoring device. In one or more embodiments, the ground radials may change the performance of the communication device of the vehicle monitoring device. For example, the communication device performs to a first standard threshold (e.g., signal strength, clarity, or the like) with the ground radials relative to an EOV system that is devoid ground radials.

In one or more embodiments, one or more of the ground radials may be a flexible ground radial such that a shaped of the flexible ground radial may be defined or based on a location of the flexible ground radial within the cavity of the housing. For example, the ground radial may be a flexible or malleable wire or other conductive material that may be able to bend, deform, or the like, to be positioned around other components of the EOV system (not shown). For example, the shape of the ground radials may be based on the location of the ground radial, based on other components within the cavity, based on a position where the second end of the ground radial is to be located, or the like. In one or more embodiments, an operator of the EOV system may manually flex, bend, deform, reshape, or the like, one or more of the flexible ground radials based on a performance of the communication device, based on a size of the vehicle system (e.g., a number of vehicles of the vehicle system, a distance the data signals may need to wirelessly travel between the EOV system and a lead vehicle, or the like), based on an environment in which the vehicle system moves (e.g., ambient conditions such as temperature, humidity, pressure, or the like; natural geographic conditions such as mountains, forests, valleys, or the like; environments of the route such as bridges, tunnels, buildings, or the like), or the like.

Figure 31:
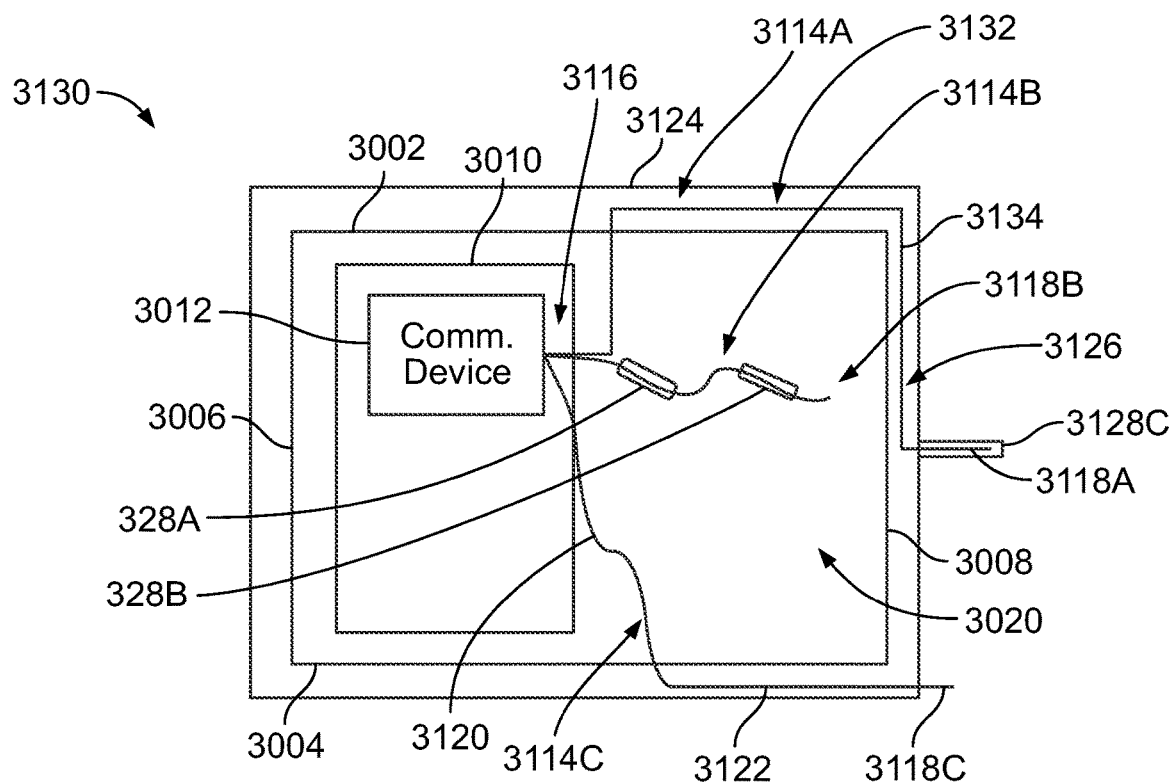
FIG. 31 illustrates a system in accordance with one embodiment.

FIG. 31 illustrates an example of a system 3130 in accordance with one embodiment of the subject matter described herein. Like the system 2930, the system 3130 may also be referred to as an EOV system or EOV monitoring system. The system includes the vehicle monitoring device disposed within the cavity of the housing of the system formed by the plural surfaces.

The communication device of the vehicle monitoring system is operably coupled with plural ground radials 3114. For example, a first end 3116 of each of the ground radials 3114A, 3114B, 3114C is operably coupled with the communication device to communication data signals between the communication device and the vehicle communication system, the off-board communication system, or the like.

In the illustrated embodiment of FIG. 31, a first ground radial 3114A is a rigid ground radial such that the shape of the ground radial may remain substantially unchanged. The first ground radial extends between the first end 3116 and a second end 3118A. A first portion 3132 of the first ground radial extends within the first surface 3002 of the housing, and a second portion 3134 of the first ground radial extends within the fourth surface 3008 of the housing. Optionally, the first ground radial may extend within any one or more surfaces of the housing between the first and second ends of the ground radial. Additionally, the second end of the first ground radial is disposed as a position outside of the housing. In the illustrated embodiment of FIG. 31, the second end extends in a substantially horizontal direction outside of the housing, but alternatively may extend in any one or more directions, and may extend any length outside of the housing.

The EOV system includes a second ground radial 3114B that extends between the first end 3116 and a second end 3118B. The second ground radial may be a flexible ground radial, like the ground radials shown in FIG. 30. For example, the shape or the second ground radial may be based on one or more components (not shown) that the second ground radial needs to be positioned around within the cavity of the housing.

The EOV system includes a third ground radial 3114C that extends between the first end 3116 and a second end 3118C. The third ground radial includes a flexible portion 3120 at a location between the first and second ends, and a rigid portion 3122 between the first and second ends. The flexible portion of the third ground radial is disposed at a first location within the cavity of the housing, and the rigid portion of the third ground radial is disposed at a second location and extends within the second surface 3004 of the housing. For example, the rigid portion of the third ground radial extends within a portion of the second surface of the housing. Like the second end of the first ground radial, the second end of the third ground radial is disposed outside of the housing. In the illustrated embodiment of FIG. 31, the second end of the third ground radial extends in a substantially horizontal direction outside of the housing, but alternatively may extend in any one or more directions, and may extend any length outside of the housing.

One or more of the ground radials may include an insulator or insulator material disposed around an exterior surface of the ground radials. In one or more embodiments, the insulators may be flexible insulators that are wrapped or otherwise disposed around the ground radials such that the insulators may flex or move relative to movement or flexing of the ground radials. In one or more embodiments, the system may include one or more sleeves 3128 that may be disposed around a portion of the one or more ground radials. For example, a portion of the ground radials may extend through the sleeves. The sleeves may be disposed around the insulator of the ground radials, or may be coupled directly with an exterior surface of the ground radial. In the illustrated embodiment of FIG. 31, two sleeves 3128A, 3128B are disposed over two portions of the flexible second ground radial between the first and second ends of the second ground radial. Additionally, a single sleeve 3128C is disposed over the second end of the first ground radial that extends outside of the housing. For example, the sleeve 3128C and the second end of the first ground radial are disposed outside of the housing.

The sleeves may change a durability of the portion of the ground radial that extends within the sleeve. For example, the portion of the ground radial that extends or is disposed within the sleeve may be a flexible ground radial, and the sleeve may prohibit the shape of the portion of the flexible ground radial to be changed or deformed. Optionally, the portion of the ground radial that extends within the sleeve may be a rigid ground radial, and the sleeve may increase a rigidity or hardness of the ground radial, such as to provide additional protection to the rigid ground radial. Optionally, the system may include any number of sleeves, that may be disposed over any portion of the one or more ground radials within and/or outside of the housing. Optionally, the insulator may provide durability to the ground radials, and the sleeves may provide additional durability to the insulator and the ground radials that the insulator may be unable to provide directly. For example, the sleeves may be disposed at a location along the ground radial that may need or require reinforced protection.

In one or more embodiments of the subject matter described herein, a system includes a housing operably coupled with a vehicle system, and a vehicle monitoring system disposed within the housing comprising a wireless communication device including an antenna configured to wirelessly communication data signals. One or more ground radials are electrically coupled with the wireless communication device and conduct the data signals from the wireless communication device. The one or more ground radials form a ground plane of the antenna while the vehicle system is moving and the antenna is wirelessly communicating the data signals.

Optionally, the housing includes plural surfaces defining a cavity. The vehicle monitoring device, and the one or more ground radials may be disposed within the cavity of the housing. The plural surfaces of the housing may be rigid surfaces. The antenna of the wireless communication device may be an ultra-high frequency antenna. The vehicle monitoring device may wirelessly communicate with a controller outside of the housing via the wireless communication device. The controller may be disposed off-board the vehicle system. Each of the one or more ground radials may extend between a first end operably coupled with the wireless communication device and a second end disposed a distance away from the wireless communication device. At least one of the one or more ground radials may include a rigid portion at a first location between the first and second ends, and a flexible portion at a second location between the first and second ends.

At least a portion of at least one of the one or more ground radials may be disposed outside of the housing. At least a portion of at least one of the one or more ground radials may extend within a surface of the plural surfaces of the housing. At least one of the one or more ground radials may be disposed within two or more surfaces of plural surfaces of the housing. A first portion of the at least one ground radial may be disposed within a first surface of the plural surfaces of the housing, and a second portion of the at least one ground radial may be disposed within a second surface of the plural surfaces of the housing. The system may include a sleeve disposed around a portion of the one or more ground radials. The one or more ground radials may change a strength of the data signals.

In one or more embodiments, a system includes a housing comprising plural surfaces defining a cavity operably coupled with a vehicle system, and a vehicle monitoring device disposed within the cavity of the housing. The vehicle monitoring device includes a wireless communication device including an antenna configured to wirelessly communicate data signals with a controller disposed outside of the housing. One or more ground radials are disposed within the cavity of the housing, and each extend between a first end electrically coupled with the wireless communication device and a second end. The one or more ground radials conduct the data signals between the wireless communication device and the controller. The one or more ground radials form a ground plane of the antenna while the vehicle system is moving and the antenna is wirelessly communicating the data signals with the controller.

Optionally, at least one of the one or more ground radials may be a flexible ground radial. A shape of the flexible ground radial may be based on a location of the flexible ground radial within the cavity. At least one of the one or more ground radials may include a rigid portion at a first location between the first and second ends, and a flexible portion at a second location between the first and second ends. A portion of at least one of the one or more ground radials may be disposed outside of the housing. The antenna of the wireless communication device may be an ultra-high frequency antenna.

In one or more embodiments, a method includes wirelessly communicating data signals from an antenna of a wireless communication device of a vehicle monitoring device. The vehicle monitoring device is disposed within a housing operably coupled with a vehicle system. The wireless communication device wirelessly communicates data signals with a controller disposed outside of the housing. A ground plane of the antenna is formed with one or more ground radials electrically coupled with the wireless communication device. The one or more ground radials form the ground plane of the antenna while the vehicle system is moving and the antenna is wirelessly communicating the data signals.

One or more embodiments of the subject matter described herein relate to systems and methods for ensuring proper functionality of a vehicle monitoring assembly, such as the monitoring and communication units, EOV devices or assemblies, EOT assemblies or devices, etc. The vehicle monitoring assembly may be transferably coupled with a vehicle system, such that the assembly is removably coupled to the vehicle system. The vehicle monitoring assembly can be selectively uncoupled from the vehicle system and later coupled to a different vehicle system. The vehicle monitoring assembly may monitor the vehicle system, the route along which the vehicle system moves, and/or the like. The vehicle monitoring assembly may be coupled to the last vehicle of multiple vehicles that define the vehicle system, such that the assembly is located at the rear or trailing end of the vehicle system. Alternatively, the monitoring assembly may at another location of the vehicle system, such as at the front or leading end of the vehicle system.

The monitoring assembly is configured to monitor one or more characteristics of the vehicle to which the monitoring assembly is coupled, the vehicle system that includes the vehicle, and/or the route over which the vehicle system travels. The characteristics may include, for example, brake pipe pressure and vehicle location. Additionally or alternatively, the vehicle monitoring assembly may operate as a vehicle signaling device. For example, the vehicle monitoring assembly may include at least one light source, such as a high visibility marker light. The vehicle monitoring assembly may flash the marker light to notify observers of the presence of the vehicle system on the route and to indicate the end of the vehicle system (when coupled to the trailing end vehicle).

The monitoring assembly at the EOV vehicle system may communicate with one or more of the other vehicles of the vehicle system for integrity checks, status updates, emergency braking commands, and the like. For example, the monitoring assembly may periodically communicate with a lead or front vehicle that defines a front end of the vehicle system. The monitoring assembly may communicate with the vehicle communication system of the vehicle system using a dedicated radio link. The integrity check may include information that confirms that the rear end of the vehicle system is intact and properly operating, even if the rear end is not visible to an operator or a camera located at the lead vehicle.

The monitoring assembly may periodically communicate designated information to the lead vehicle, such as a brake pipe pressure at the EOV vehicle, a motion status of the EOV vehicle (e.g., stationary or moving, vehicle speed, etc.), an emergency braking valve status (e.g., open or closed, brakes application status, etc.), health and/or charge state of a battery or other electrical energy storage device of the monitoring assembly, status of one or more light sources (e.g., marker lights) of the monitoring assembly, and the like. The emergency braking valve allows for a secondary emergency application in case of a brake pipe blockage. The light sources may be high visibility marker lights that enable observers and other vehicle systems to discern the rear end of the vehicle system during reduced light conditions, such as at night, in tunnels, through forests, and the like. The content of the periodic status messages sent by the monitoring assembly to the lead vehicle can be displayed to an operator on the lead vehicle. The monitoring assembly may also be configured to send aperiodic messages, such as alert messages, to the lead vehicle in response to detecting an alarm condition. For example, the alarm condition may include the brake pipe pressure at the EOV vehicle being outside of a designated pressure range associated with acceptable operating conditions.

Figure 32:
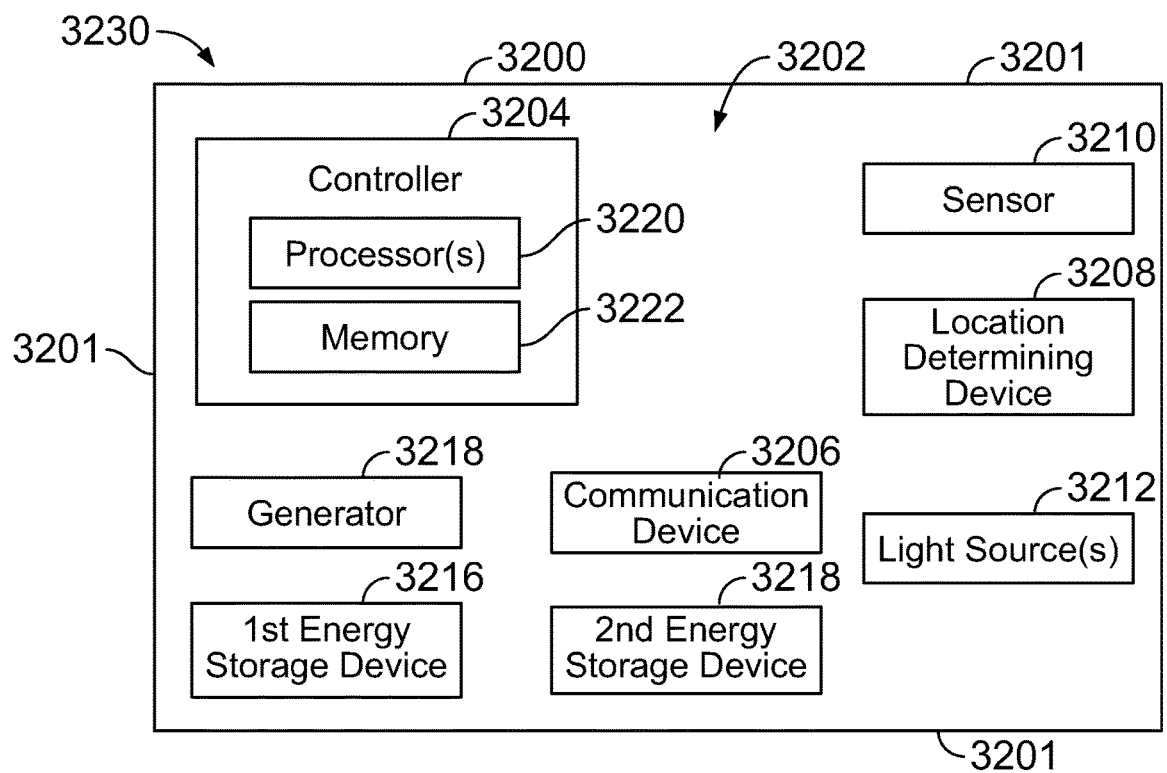
FIG. 32 is a block diagram of a vehicle monitoring assembly in accordance with one or more embodiments.

FIG. 32 is a block diagram of a vehicle monitoring assembly 3230 in accordance with one or more embodiments. The vehicle monitoring assembly can represent one or more of the monitoring, monitoring and communication, EOT, and/or EOV devices or assemblies described herein. The vehicle monitoring assembly includes a housing 3200 formed by plural walls 3201. The walls define an enclosure or cavity 3202 such that the cavity is separated from the environment outside of the walls. One or more of the plural walls may be rigid walls manufactured and designed to withstand rugged environments. For example, the housing may be composed of a metal, a metallic alloy, a plastic, or the like, such that the shape of the housing remains substantially unchanged responsive to impact or compression forces directed onto the walls, exposure to sunlight, precipitation, high and low ambient temperatures, and the like. The vehicle monitoring assembly includes multiple devices disposed within the cavity and/or attached to one or more walls of the housing. The housing may be sealed to prohibit or inhibit the ingress of debris and moisture into the cavity. The housing may include an attachment mechanism for removably mounting the housing to a vehicle. The attachment mechanism may include a mounting plate, a clamp, straps, latches, and/or the like.

The vehicle monitoring assembly includes various electrical, electromechanical, and electrochemical components or devices that are represented as boxes in FIG. 32. In the illustrated embodiment, the components include a controller 3204, a wireless communication device 3206, a location determining device 3208, one or more sensors 3210, one or more light sources 3212, a generator 3214, a first electrical energy storage device 3216, and a second electrical energy storage device 3218. The monitoring assembly in an alternative embodiment may include at least one additional component that is not shown in FIG. 32 and/or may omit one or more of the components shown in FIG. 32. For example, the monitoring assembly may also include an input device and/or an output device. The output device may be a display that provides information to an operator viewing the display. The input device may include one or more user input elements, such as keys, buttons, or the like, to enable the operator to select settings and/or functions. The specific components present in the monitoring assembly may be determined based on application-specific needs and availability, as described herein. The components shown in FIG. 32 may be commonly disposed within the housing of the monitoring assembly. Alternatively, one or more of the components may be outside of the housing and secured, directly or indirectly, to the housing.

The controller 3204, or control circuit, is operably connected to the other components or devices shown in FIG. 32 via wired and/or wireless communication pathways. For example, the controller may be conductively connected to the components via wires, cables, bus bars, or the like. The controller performs at least some of the operations described herein to control the operations of the monitoring assembly. The controller represents hardware circuitry that includes and/or is connected with one or more processors 3220 (e.g., one or more microprocessors, integrated circuits, microcontrollers, field programmable gate arrays, etc.). The controller includes and/or is connected with a tangible and non-transitory computer-readable storage medium (e.g., memory) 3222 disposed onboard the vehicle. For example, the memory may store programmed instructions (e.g., software) that is executed by the one or more processors to perform the operations of the controller described herein. The memory additionally or alternatively may store different information, such as a route database, a trip schedule, and/or the like.

The wireless communication device 3206 can represent and/or include transceiving circuitry, one or more antennas, modems, or the like. In one or more embodiments, the wireless communication device of the vehicle monitoring assembly may receive and/or provide data signals via an antenna thereof to the onboard controller of the vehicle system by wirelessly communicating with the vehicle communication system. The wireless communication device may transmit RF signals, such as signals ultra-high frequency (UHF) range. Optionally, the antenna of the communication device may communicate data signals with the off-board communication system, directly or via the vehicle communication system. In a non-limiting example, the vehicle monitoring assembly may be positioned out of a direct line of sight with a lead or front vehicle of the vehicle system in the direction of travel. The antenna of the communication device may wirelessly communicate messages (e.g., data, commands, inquiries, repeat messages, etc.) with the lead vehicle of the vehicle system and/or the same or different data signals with other vehicles of the vehicle system.

The location determining device 3208 is configured to determine the respective location of the monitoring assembly. When the vehicle is disposed at the rear end of the vehicle system, the location determining device provides the location of the rear end of the vehicle system. The location determining device can include a receiver, at least one antenna, and associated circuitry. In an embodiment, the location determining device may be configured to receive signals from satellites. For example, the device may be a GNSS or GPS receiver that generates a three-dimensional positional coordinate in a global coordinate system based on signals received from satellites.

The generator 3214 is configured to generate electric current using compressed air received from a brake line onboard the vehicle system. For example, the generator may include a turbine that is rotated based on the flow of pressurized air across the turbine. The rotation of the turbine may drive rotation of a rotor relative to a stator, which induces electric current based on a changing magnetic fields. The electrical energy generated by the generator can be supplied to one or both of the energy storage devices, or supplied directly to power one or more components of the monitoring assembly, such as the light sources and/or the wireless communication device.

Each of the first energy storage device 3216 and the second energy storage device 3218 includes or represents one or more battery cells, capacitors, flywheels, or the like. In an embodiment, the energy storage devices (ESDs) can be recharged by electric current received from the generator. The energy storage devices can power the various loads of the monitoring assembly. In an embodiment, the controller can selectively control which of the generator, the first ESD, or the second ESD is used at any given time to power the operations of the vehicle monitoring assembly. For example, the controller may utilize the generator to power the operations when the generator is able to supply electrical energy, and may designate the first and second ESDs as backups. The controller may tap into the charge stored in the first and/or second ESD in response to determining that the generator is not able to power the operations due to a malfunction, defect, drop in brake pipe pressure, or the like. Including multiple ESDs as backup power sources reduces the risk of the vehicle monitoring assembly becoming inoperably due to insufficient energy available to maintain operations.

In an embodiment, the first ESD is a different type of electrical energy storage device than the second ESD. Different "types" refers to electrical storage devices that have one or more of different chemistries (how the devices electrochemically store energy), different storage capacities, different material compositions, and/or different charge/discharge characteristics. In one embodiment, different types of ESDs have different chemistries, different capacities, different material compositions, and different charge/discharge characteristics.

The ESDs may be utilized by the controller to power the vehicle monitoring assembly operations in different situations and circumstances based on the different inherent properties and characteristics of the ESDs. For example, the second ESD may charge and discharge faster (e.g., at a greater charge rate) than the first ESD. Optionally, the first ESD may have a greater energy storage capacity than the second ESD. For example, the first ESD may be able to store a greater amount of electric current than the second ESD. As a result, the first ESD may be able to supply a greater total amount of power to the loads of the vehicle monitoring assembly during a single discharge cycle than the second ESD.

In an embodiment, the first ESD includes one or more battery cells. The first ESD may have multiple battery cells connected together in a battery pack. The battery cells may include lithium. For example, the battery cells may be lithium ion battery cells, lithium metal battery cells, lithium air battery cells, or the like. The battery cells may be secondary cells, such that the cells are rechargeable.

In an embodiment, the second ESD includes one or more capacitors. For example, the second ESD may have multiple supercapacitors (or ultra-capacitors). The supercapacitors may include or represent electrostatic double-layer capacitors, hybrid capacitors, pseudo-capacitors, or the like. Optionally, the second ESD may include conventional electrolytic capacitors, featuring a solid dielectric layer between electrodes, in addition to the supercapacitors.

The one or more sensors 3210 can include various different types of sensors for monitoring certain conditions and parameters that can be used by the controller for determining operations and/or modifying operations of the monitoring assembly. At least some of the sensors may be coupled to an outer surface of the housing or disposed remote from the housing instead of within the housing. The sensors can include a pressure sensor for monitoring the pressure in the brake pipe, a voltage sensor and/or current sensor for monitoring electrical characteristics of the circuitry, an optical sensor for monitoring properties of light emitted from the light sources, and/or the like. The sensors generate sensor data that is transmitted as signals to the controller, which analyzes the sensor data.

The one or more light sources 3212 may be used to signal the presence of the vehicle system to other vehicle systems on the route or other observers. When the monitoring assembly is mounted to the EOV vehicle, the light sources may indicate the location of the end of the vehicle system. In an embodiment, the one or more light sources are high visibility marker lights which emit a bright, intense light outside of the housing. The light sources may be controlled to flash or blink at a designated frequency. In an embodiment, the monitoring assembly may include two light sources, and the controller may control the light sources to alternate flashes. For example, a first of the two light sources may flash, and then the second of the two light sources may flash, followed by another flash by the first light source. In another embodiment, the monitoring assembly has only one light source. In a third embodiment, the monitoring assembly has at least three light sources.

Figure 33:
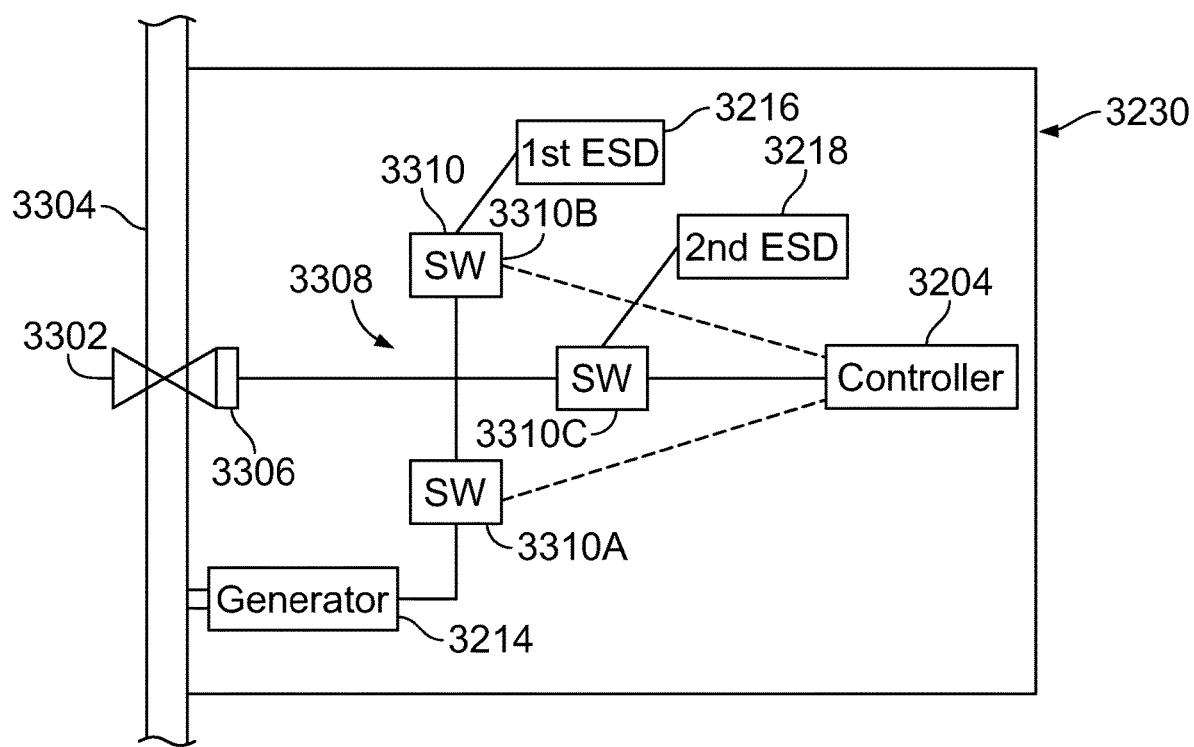
FIG. 33 is a schematic illustration of the vehicle monitoring device according to an embodiment.

FIG. 33 is a schematic illustration of the vehicle monitoring device 3230 according to an embodiment. The illustrated embodiment may show only a subset of the components of the vehicle monitoring device. The vehicle monitoring device includes or is operably coupled to an emergency valve 3302. The emergency valve is connected to a brake pipe 3304 of the vehicle system, and is able to control the air pressure within the brake pipe by selectively venting the brake pipe. The emergency valve is activated during an emergency event to quickly vent the brake pipe. Venting the brake pipe causes a brake application of the vehicle system to bring the vehicle system to a stop. In an example, activation of the emergency valve may vent the air in the brake pipe from a pressure of about 90 psi to a nominal pressure, such as less than 5 psi or less than 1 psi.

In at least one embodiment, the emergency valve includes a solenoid 3306 for activating the emergency valve. The solenoid is an electromagnet device. The solenoid is powered by a valve drive circuit 3308. The valve drive circuit 3308 is shown generically in FIG. 33. For example, if the valve drive circuit supplies an electric current to the solenoid with a voltage that exceeds a designated threshold, the solenoid mechanically actuates and activates the emergency valve.

When the emergency valve activates, the emergency valve vents the brake pipe. The solenoid may deactivate the emergency valve, which closes the brake pipe to enable the brake pipe pressure to rise, in response to the voltage supplied to the solenoid dropping below a second designated threshold. The second designated threshold may be lower than the first designated threshold. In a non-limiting example, the first designated threshold is 12 volts (V) and the second designated threshold is 4 V. For example, when the emergency valve is in a deactivated state, the solenoid activates the emergency valve in response to receiving at least 12 V from a power source. Once the emergency valve is activated, such that the valve is open to vent the brake pipe, the emergency valve may remain in the active or activated state as long as the solenoid receives at least 4 V. If the voltage applied to the solenoid drops below 4 V (e.g., the second threshold), the emergency valve deactivates, reclosing and sealing the brake pipe.

The emergency valve may be a safety critical piece of equipment. Embodiments described herein are provided to reduce the likelihood of the emergency valve failing, either resulting in an undesired (e.g., unnecessary) emergency braking application or in a failure to provide a desired emergency braking application. Either scenario could result in uncontrolled movement of the vehicle system, potentially damaging the vehicle system and/or another vehicle system.

In an embodiment, the vehicle monitoring system includes multiple power sources that can supply sufficient voltage to activate the emergency valve an maintain the emergency valve in the activated state throughout an emergency brake application. The power sources may include the generator, the first ESD, and the second ESD. Each of these power sources is electrically connected to the valve drive circuit which supplies electrical energy to the emergency valve.

The controller 3204 can be configured to selectively control the source of power to the emergency valve at a given time. For example, the controller can control the first ESD to be electrically connected to the emergency valve during a first time period, and can control the second ESD to be electrically connected to the emergency valve during a different, second time period. In an embodiment, the controller can control the source of power to the emergency valve via actuation of one or more switch devices 3310 in the valve drive circuit. The valve drive circuit optionally may include switch devices associated with the different power sources to selectively establish and break electrically conductive pathways from the corresponding power sources and the emergency valve. In the illustrated embodiment, the switch devices include a first switch device 3310A electrically connected to the generator, a second switch device 3310B electrically connected to the first ESD, and a third switch device 3310C electrically connected to the second ESD. The switch devices may be electromechanical switches (e.g., contactors or relays), solid state switches (e.g., insulated-gate bipolar transistor (IGBT), MOSFET, or other transistors), optical switches (e.g., transistors with optical interfaces such as an LED-to-photoreceptor isolated input), or the like.

The switch devices are operably connected to the controller via wired or wireless pathways. The controller can generate control signals to independently control the state of each of the switch devices between a closed, conducting state and an open, non-conducting state. For example, when the switch device connected to the first ESD is in the closed state, the first ESD is conductively connected to the solenoid and is able to supply electric current that was stored in the first ESD to the solenoid to activate the emergency valve and/or maintain the emergency valve in the activated state. Although FIG. 33 is focused on the valve drive circuit, the first and second ESDs may be able to supply electric current to power one or more loads in the vehicle monitoring assembly other than the activation of the emergency valve.

The vehicle monitoring assembly may have a different arrangement of ESDs, switch devices, and emergency valves in other embodiments. For example, the ESDs optionally may not be associated with separate switch devices as shown in FIG. 33. In an embodiment, one or more of the switch devices may be replaced by a diode or the like, which does not require positive action to function. In another embodiment, one or more of the switch devices may be part of an integrated switching power supply circuit device.

The multiple available power sources in the vehicle monitoring assembly provide redundant power supply to alleviate the consequences if one or two of the power sources fails or exhausts all available power. For example, even if the generator fails and cannot power the emergency valve, the first and second ESDs have stored energy reserves to function as backups.

In an embodiment, the controller may selectively control which of the power sources is electrically connected to the emergency valve at a given time to supply power to the emergency valve, if needed. For example, the controller may control the switch devices associated with the power sources such that only one of the switch devices is in the closed, conducting state at a time. The controller may select the power source that is connected to the emergency valve based on assigned priorities, environmental conditions, monitored characteristics of the power sources, or the like. For example, the power sources may be assigned relative priorities. In a non-limiting example in which the first ESD includes one or more batteries and the second ESD includes one or more supercapacitors, the generator may be assigned as a primary source, the first ESD may be assigned as a secondary source, and the second ESD may be assigned as a tertiary source. The controller may used the generator to power the emergency valve. The generator is a desirable power source because the generator extracts energy from air within the brake pipe, without storing the energy. If electrical energy from the generator is available, the controller may utilize that energy to power the emergency valve without interfering with the energy stored in the ESDs.

If the generator is not able to provide sufficient voltage to power the emergency valve when needed, then the controller may open the switch device 3310A to disconnect the generator from the emergency valve, and then may close the switch device 310B to electrically connect the batteries of the first ESD to the emergency valve. If secondary power source of the batteries is not able to provide sufficient voltage, due to an exhausted capacity, a cold environment, or the like, then the controller can utilize the tertiary power source (e.g., second backup source), which is the supercapacitors of the second ESD. For example, the controller may open the switch device 3310B to disconnect the first ESD, and then may close the switch device 3310C to connect the second ESD to the emergency valve. Optionally, the controller may operate the switch devices in a break-before-make manner to ensure that only one power source is electrically connected to the emergency valve at a time. Alternatively, the controller may operate the switch devices to have two or more in the closed, conducting state during a common time period to blend the electrical energy supplied by multiple power sources.

The controller may determine which of the power sources to electrically connect to the emergency valve based on environmental conditions and/or characteristics of the power sources. The first and second ESDs, which are different types of devices, may react differently when exposed to different ambient conditions. For example, the batteries in the first ESD may suffer more than the supercapacitors of the second ESD in cold environments. In an embodiment, if the ambient temperature is below a designated threshold associated with cold weather, such as 0 degrees C., −20 degrees C., −40 degrees C., or the like, the controller may assign the second ESD a higher priority or ranking than the first ESD. For example, the controller may utilize the second ESD to power the emergency valve prior to using the first ESD to avoid any potential power delivery issues associated with cold batteries.

In another embodiment, the controller may prioritize or rank the first and second ESDs based on characteristics of the two ESDs. One example characteristic is the amount of available energy (e.g., charge) present in the respective ESD. For example, if the supercapacitors at a given time have a greater amount of electrical energy stored than the batteries, the controller may designate the second ESD, with the supercapacitors, as having a higher priority or ranking than the first ESD. The amount of available energy present in the ESDs may be determined using voltage and/or current sensors.

In another example, the controller may monitor the health of the first ESD and the second ESD using data generated by one or more of the sensors of the vehicle monitoring assembly. The health may be monitored by performing periodic tests on the ESDs in which the ESDs are discharged and charged while the one or more sensors monitor characteristics such as the amount of charge that is discharged and/or charged and the charge current or rate. The controller may compare the characteristics monitored during the periodic tests to predetermined value or ranges, such as expected ranges or historical data from previous tests to determine the health of the ESDs. For example, the controller may determine the health of the first ESD based on a decline in the discharge amount during a test compared to the predetermined reference values. A sharper decline and/or lower discharge amount may indicate worse health than a more gradual decline and/or a greater discharge amount. In an embodiment, the controller may prioritize the first ESD and the second ESD based on the health of the ESDs, such that the ESD determined to have better health is designated to be used to power the emergency valve prior to using the other ESD.

The controller may charge the ESDs, using the switch devices to supply current from the generator, to maintain the ESDs at predetermined charge levels relative to the respective total capacity of each of the ESDs. The predetermined charge level may be at least 80%. For example, if the state of charge of the first ESD drops below the predetermined charge level due to powering an emergency brake application, then the controller may direct current from the generator to charge the first ESD after the emergency brake application is complete.

According to an embodiment, the controller conserves energy by dynamically controlling the amount of power supplied to the emergency valve during an emergency brake application. Once confirmation is received that the emergency valve is activated, the controller may throttle back (e.g., reduce) the power supplied to the solenoid to conserve power without causing the solenoid to deactivate. The reduced power state is a reduced duty cycle mode. During the reduced duty cycle mode, the controller may use pulse width modulation (PWM) to maintain the emergency valve activated without expending significant energy. As described above, the emergency valve requires a certain amount of power to activate, but may only need a portion of that power (e.g., less than half) to remain activated.

In an embodiment, the controller utilizes the generator, the first ESD, or the second ESD to power the activation of the emergency valve. The controller initially controls the switch devices to supply at least a threshold voltage necessary to activate the emergency valve, such as 12 V. After supplying the 12 V during the initial full power mode, the controller switches to the reduced duty cycle mode in response to a triggering event. The triggering event may be receiving confirmation that the emergency valve is activated. The confirmation may be determined by monitoring the pressure in the brake pipe. For example, if the pressure sensor (e.g., pressure transducer) of the vehicle monitoring assembly indicates that the pressure in the brake pipe is dropping or has dropped below a present threshold, the controller determines (e.g., confirms) that the emergency valve properly activated to vent the brake pipe. In another example, the controller may monitor flow rate of air through the brake pipe based on a flow sensor. An increase in the flow rate in response to powering the emergency valve may confirm that the emergency valve properly activated. Another triggering event could be based on the sound of the emergency brake application as monitored by an audio sensor. In another embodiment, the controller may be configured to switch from the full power mode to the reduced duty cycle mode after a designated amount of time has elapsed after supplying power to the emergency valve.

Once the controller switches to the reduced duty cycle mode, the controller may provide power that is less voltage than the full power mode but is sufficient voltage to maintain the emergency valve activated, to avoid prematurely ending the emergency brake application. The vehicle monitoring assembly may include a voltage and/or current sensor that monitors the electrical energy through the solenoid of the emergency valve. Using the data generated by the voltage and/or current sensor as feedback, the controller can maintain the power supplied to the solenoid at a level or range of the reduced duty cycle. For example, the level or range may be a voltage from 4 V to 6 V. If the threshold voltage necessary to activate the emergency valve 12 V, throttling the voltage down by half or less during the reduced duty cycle mode can conserve significant energy.

The controller can utilize any of the power sources to provide the power during the reduced duty cycle mode. In a non-limiting example, the controller may also switch the power sources based on the mode, by using one power source to activate the emergency valve during the full power mode and then using a different power source to maintain the emergency valve in the activated state during the reduced duty cycle mode.

Figure 34:
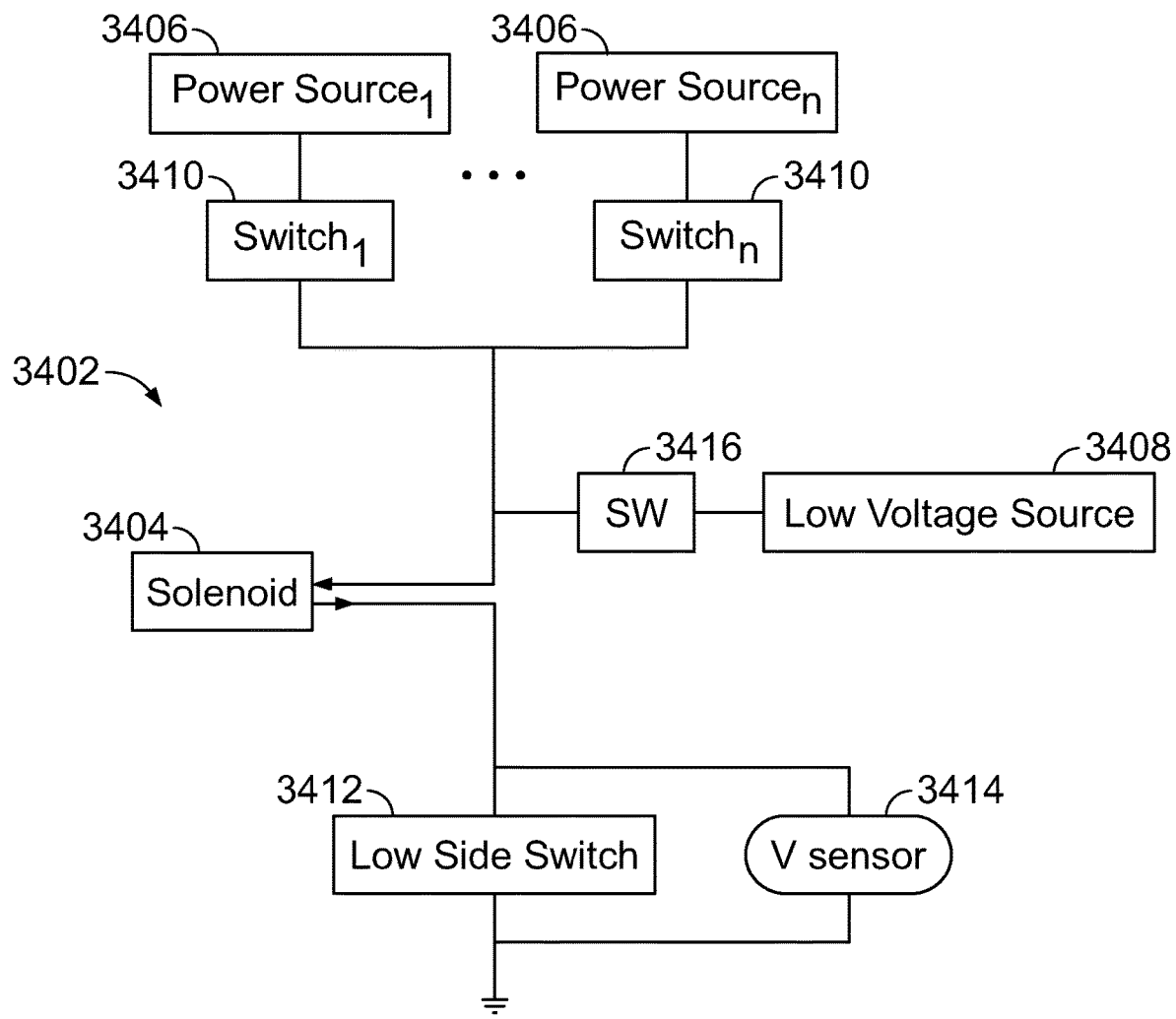
FIG. 34 is a schematic illustration of a valve drive circuit of the vehicle monitoring assembly according to an embodiment.

The controller may periodically test the valve drive circuit to ensure that the valve drive circuit is properly functioning and able to sufficiently activate the emergency valve during an emergency event. FIG. 34 is a schematic illustration of a valve drive circuit 3402 of the vehicle monitoring assembly according to an embodiment. The valve drive circuit includes a solenoid 3404, as a component of the emergency valve. The valve drive circuit conveys electric current to the solenoid to selectively activate the emergency valve. The valve drive circuit is controlled by the controller of the vehicle monitoring assembly.

The valve drive circuit includes at least one high voltage power source (e.g., referred to as power source) 3406 and a low voltage source 3408. The power sources and the low voltage source are electrically connected to the high side (e.g., current input electrode) of the solenoid. Each power source can supply a greater voltage to the solenoid than the low voltage source. The power sources can independently supply sufficient voltage to actuate the solenoid. The low voltage source supplies a voltage to the solenoid that is less than the threshold voltage required to actuate the solenoid. As such, the low voltage source cannot activate the emergency valve.

In an embodiment, the valve drive circuit includes multiple power sources (e.g., 1 ... n). The power sources can include or represent the generator, the first ESD, and the second ESD shown in FIG. 33. Each power source is electrically connected to a respective switch device 3410 located between the associated power source and the solenoid. The switch devices are independently controlled by the controller to establish a closed conductive pathway and provide an open, non-conductive pathway. The switch devices may be the switch devices 3310 shown in FIG. 33. For example, the switch devices may be solid state switches (e.g., transistors), electromechanical switches, or the like.

The valve drive circuit also includes a low side switch 3412 and a voltage sensor 3414. The low side switch is electrically connected to the low side (e.g., current output electrode) of the solenoid. The low side switch can be a solid state switch (e.g., a transistor), an electromechanical switch, or the like. In a non-limiting example, the switch devices 3410 and the low side switch 3412 are transistors, such as metal-oxide-semiconductor field-effect transistors (MOSFETs). The voltage sensor is connected in parallel to the low side switch and configured to monitor a voltage drop across the low side switch.

The low side switch is a switch to ground. Closing the low side switch can be used to actuate the solenoid to activate the emergency valve. The low side switch is controlled by the controller of the vehicle monitoring assembly. The periodic test actuates different switches to supply different voltages to the solenoid, and monitors the voltage across the low side switch, via the voltage sensor, to determine if the measured voltage matches the expected voltage.

The periodic test may include a series of switch settings. During the test, the controller compares the measured voltage across the low side switch, generated by the voltage sensor, to an expected voltage. The expected voltage may include an expected value and a designated tolerance range above and below the expected value. If the measured voltage deviates from the expected voltage, the controller may generate a test failure alert that is communicated from the vehicle monitoring assembly to the onboard controller and/or the off-board controller. For example, the expected voltage value may be 3 V with a tolerance range from 2.5 V to 3.5 V. If the measured voltage is below 2.5 V or above 3.5 V, then the controller determines that the measured voltage deviates from the expected voltage. The test failure alert may notify an operator that the valve drive circuit is compromised and requires maintenance.

In a first setting, the low side switch is set to the open, non-conducting state, and one of the switch devices is set to the closed, conducting state to supply electric current from one of the power sources to the solenoid. The electric current supplied by the power source is expected to be at 12 V, for example. If the voltage sensor measures a voltage of about 12 V (within the tolerance range), then the controller determines that the relevant circuitry components are properly functioning. The controller may sequentially test each of the power sources (e.g., the generator, the first ESD, and the second ESD and associated switch devices).

In a second setting, while the low side switch is in the open state, the controller may control the low voltage source to supply electric current to the solenoid, instead of the other power sources. For example, the controller may set all switch devices to the open state and set a switch device 3416 connected to the low voltage source to the closed state to supply electric current from the low voltage source to the solenoid. The current supplied by the low voltage source may be expected to be 3 V, so the controller compares the voltage measured by the voltage sensor to the expected voltage of 3 V to determine whether these components are properly functioning. In an alternative embodiment, the valve drive circuit may omit the switch device 3416 connected to the low voltage source, and instead may include a diode, a resistor, and/or other components to selectively control current conduction from the low voltage source to the solenoid.

In a third setting, the low side switch is set to the closed, conducting state, and the switch device connected to the low voltage source is set to, or maintained in, the closed state. In this configuration, the electric current at 3 V supplied by the low voltage source is conveyed through the low side switch, and the voltage measured by the voltage sensor is expected to be 0 V. The controller can toggle between these three settings in any order.

In an embodiment, the controller does not establish a configuration during the periodic test in which the low side switch is in the closed, conducting state and at least one of the power sources is conductively (e.g., actively) connected to the solenoid. That configuration may activate the emergency valve by supplying sufficient voltage to the solenoid and providing a conductive path to ground through the low side switch. The activation of the emergency valve, without being triggered by an emergency event, is an undesired emergency (UDE). If the UDE occurs while the vehicle system is in motion, the vehicle system may be damaged because the rear end of the vehicle system may apply the brakes prior to the front end applying the brakes. The presence of the low voltage source within the vehicle monitoring assembly enables testing the low side switch to ensure that the low side switch is fully operational and properly functional, without causing a UDE because the low voltage source cannot actuate the solenoid.

In an embodiment, one of the sensors 3210 (shown in FIG. 32) of the vehicle monitoring system is an optical sensor that monitors characteristics of the light sources 3212. The light sources may be high visibility marker lights. The light sources may be LEDs. In an embodiment, the vehicle monitoring system includes at least two light sources that are controlled to blink in alternating fashion. The optical sensor may be disposed within the cavity of the housing and may receive light from the light sources that reflects back from a portion of the housing, such as a translucent cover panel. The optical sensor may be three color light sensor, a photodiode, or the like. The characteristics of the light emitted by the light sources, which are measured by the optical sensor, may include intensity, wavelength, and the like.

The controller of the vehicle monitoring assembly is operably connected to the optical sensor and analyzes the light feedback data generated by the optical sensor. In an embodiment, the controller compares the characteristics of the light monitored by the optical sensor to preset (e.g., expected) values or ranges to determine if each of the light sources is properly functioning. For example, if the intensity of the light emitted by one light source is less than a designated threshold intensity, or is less than the intensity of the light emitted by the other light source by more than a permitted variance threshold, then the controller determines that the light source is malfunctioning. The controller may perform a similar analysis with respect to the wavelength of the light emitted by the light sources. The controller can also use the light feedback data to determine if any of the light sources are totally inoperable. In response to determining that one of the light sources is malfunctioning or inoperable, the controller may generate a control signal to notify an operator to address the light source. For example, the controller may use the wireless communication device of the vehicle monitoring system to send an alert or notification message to the onboard vehicle controller or to an offboard device. The controller optionally may schedule maintenance to work on the light source.

In one or more embodiments of the subject matter described herein, a vehicle monitoring assembly is provided that includes a housing, an emergency valve, a first energy storage device (ESD), a second ESD, and a controller comprising one or more processors. The housing is configured to be operably coupled with a vehicle system. The emergency valve is operably connected to a brake pipe of the vehicle system. The first ESD is disposed within the housing and electrically connected to the emergency valve. The second ESD is disposed within the housing and electrically connected to the emergency valve. The second ESD is a different type of energy storage device than the first ESD. The controller is disposed within the housing and operably connected to the first ESD and the second ESD via one or more switch devices. The controller is configured to operate the one or more switch devices to supply power from at least one of the first ESD or the second ESD to the emergency valve for activating the emergency valve.

Optionally, the first ESD comprises one or more batteries and the second ESD comprises one or more capacitors. The controller may operate the one or more switch devices to supply power from the second ESD to the emergency valve, and not from the first ESD, in response to an ambient temperature being below a designated threshold temperature. The controller can operate the one or more switch devices to not concurrently supply power from both the first ESD and the second ESD to the emergency valve. The vehicle monitoring assembly also can include a low voltage source disposed within the housing and electrically connected to a solenoid of the emergency valve. The controller can be configured to control the low voltage source to supply power to the solenoid during a periodic test. The power supplied by the low voltage source may not actuate the solenoid or activate the emergency valve.

The vehicle monitoring assembly also can include a low side switch and a voltage sensor electrically connected to the controller. The low side switch can be electrically connected to the emergency valve at a location between the emergency valve and ground. The voltage sensor can be configured to measure a voltage across the low side switch. Optionally, the vehicle monitoring assembly also includes a low voltage source disposed within the housing and electrically connected to a solenoid of the emergency valve. The controller may be configured to control the low voltage source to supply power to the solenoid during a periodic test, and to generate a test failure alert in response to the voltage across the low side switch measured by the voltage sensor deviating from an expected voltage.

The vehicle monitoring assembly also can include a generator configured to generate electric current based on airflow through the brake pipe. The generator can be electrically connected to the emergency valve via the one or more switch devices and is configured to power the emergency valve with the electric current. Optionally, the controller can be configured to supply power from at least one of the first ESD or the second ESD to the emergency valve in response to determining that the generator is not able to supply sufficient electric current to activate the emergency valve.

During an emergency brake application, the controller can be configured to operate the one or more switch devices to supply the power to the emergency valve at a first voltage to activate the emergency valve and to subsequently reduce the power supplied to the emergency valve to a second voltage. The second voltage can be a non-zero voltage that is sufficient to maintain the emergency valve in an activated state. Optionally, the controller can be configured to reduce the power supplied to the second voltage by implementing pulse width modulation (PWM).

The vehicle monitoring assembly also can include at least one marker light mounted on or within the housing and an optical sensor disposed within the housing. The optical sensor can be operably connected to the controller and configured to generate data representing one or more characteristics of light emitted from the at least one marker light. Optionally, the controller can be configured to identify a marker light of the at least one marker light that is malfunctioning or inoperable based on the data generated by the optical sensor, and to generate an alert message in response to identifying the marker light that is malfunctioning or inoperable In one or more embodiments, a method includes operating, via a controller comprising one or more processors, one or more switch devices of a vehicle monitoring assembly to supply power from at least one of a first energy storage device (ESD) or a second ESD to an emergency valve for activating the emergency valve. The first ESD and the second ESD are disposed within a housing of the vehicle monitoring assembly, and the second ESD is a different type of energy storage device than the first ESD. The housing is configured to be operably coupled with a vehicle system, and the emergency valve is operably connected to a brake pipe of the vehicle system.

Optionally, the first ESD comprises one or more batteries, and the second ESD comprises one or more capacitors. Operating the one or more switch devices to supply power from at least one of the first ESD or the second ESD to the emergency valve can include supplying power from the second ESD to the emergency valve, and not from the first ESD, in response to an ambient temperature being below a designated threshold temperature.

The method also can include performing a test by controlling a low voltage source disposed within the housing of the vehicle monitoring assembly to supply power to a solenoid of the emergency valve. The power supplied by the low voltage source may not actuate the solenoid or activate the emergency valve. The method may include monitoring a voltage across a low side switch during the test via a voltage sensor and generating a test failure alert in response to the voltage across the low side switch deviating from an expected voltage. The low side switch can be electrically connected to the emergency valve at a location between the emergency valve and ground.

Operating the one or more switch devices to supply power from at least one of the first ESD or the second ESD to the emergency valve can include supplying the power to the emergency valve at a first voltage to activate the emergency valve and subsequently reducing the power supplied to the emergency valve to a second voltage that is non-zero and sufficient to maintain the emergency valve in an activated state.

The method also can include generating data representing one or more characteristics of light emitted from at least one marker light mounted on or within the housing of the vehicle monitoring assembly. The data can be generated by an optical sensor disposed within the housing. The method can include identifying, via the controller, a marker light of the at least one marker light that is malfunctioning or inoperable based on the data generated by the optical sensor, and generating an alert message in response to identifying the marker light that is malfunctioning or inoperable.

One or more additional embodiments of the subject matter described herein relate to control of cameras or other optical sensors onboard vehicles so that the cameras or sensors do not generate image data representing fields of view of the cameras or sensors while the cameras or sensors are decoupled or off-board the vehicles or the vehicles are otherwise not operating. This can prevent the image data from being generated of events occurring within the fields of view while the cameras or sensors are removed from the vehicles, while the vehicles are being transported in another vehicle, while the cameras or sensors are in storage, being repaired, or the like.

The control systems and methods described here can detect when a device containing a camera or other optical sensor is installed on a vehicle and then activate the recording, analysis, and/or communication functions of the cameras or sensors. Prior to activation, the cameras or sensors may be prevented from capturing images or videos, generating image data representing the images or videos, analyzing the image data (e.g., to detect motion, to detect other objects, etc.), or communicating the image data to one or more other devices, systems, etc. In one embodiment, the camera or optical sensor may be included in an EOT device that can be mounted on a train or other rail vehicle system. While one or more embodiments are described in connection with a rail vehicle system, not all embodiments are limited to rail vehicle systems. Unless expressly disclaimed or stated otherwise, the inventive subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy). The systems and cameras or optical sensors may be disposed onboard other types of vehicles, such as automobiles, trucks (with or without trailers), buses, marine vessels, aircraft, mining vehicles, agricultural vehicles, or other off-highway vehicles.

Figure 35:
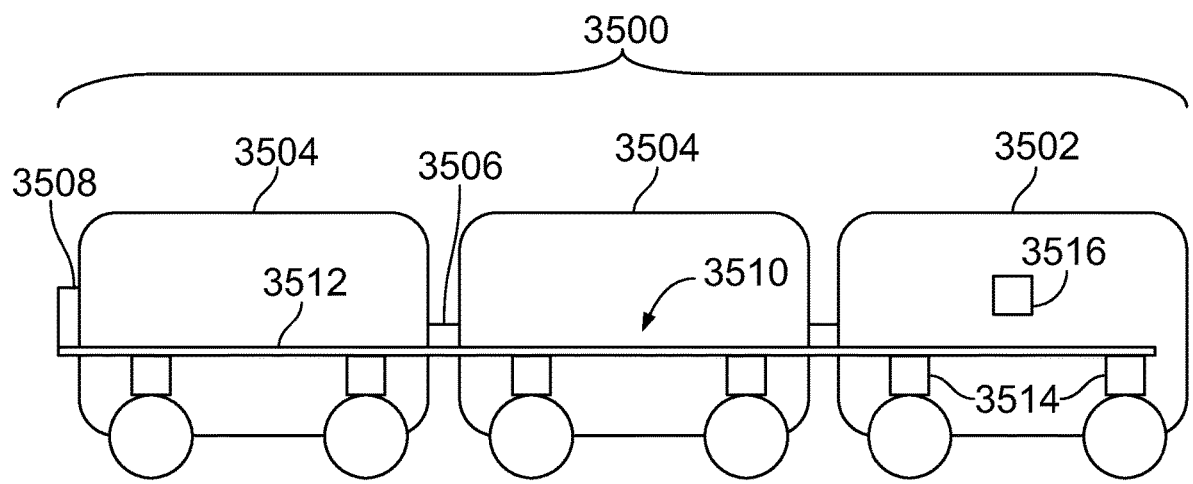
FIG. 35 illustrates another example of a vehicle system.
Figure 36:
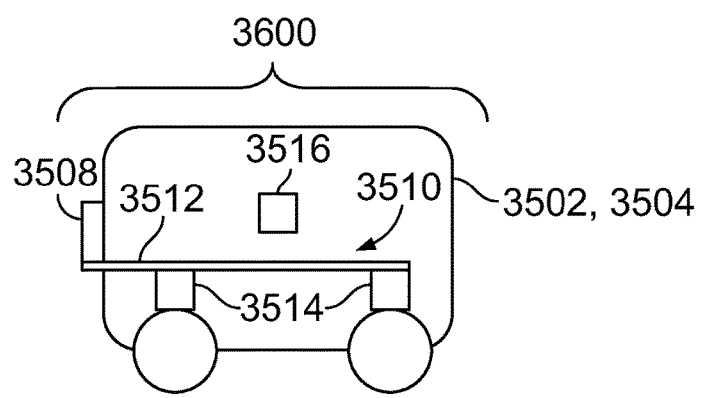
FIG. 36 illustrates another example of a vehicle system.

FIG. 35 illustrates another example of a vehicle system 3500. FIG. 36 illustrates another example of a vehicle system 3600. The vehicle system may be a multi-vehicle system formed of multiple vehicles 3502, 3504. The vehicle 3502 can represent a propulsion-generating vehicle, such as a locomotive, automobile, truck, tow boat, or the like. The vehicles 3504 can represent non-propulsion-generating vehicles, such as rail cars, oil cars, passenger rail cars, trailers barges, or the like. The vehicle system 3600 is a single-vehicle system formed of a single vehicle 3502 or 3504. The vehicles in the multi-vehicle system may be mechanically connected with each other (e.g., by couplers 3506). Alternatively, the vehicles in the multi-vehicle system may not be coupled with each other but can travel together as the multi-vehicle system (e.g., in a convoy). In one embodiment, the multi-vehicle system is a train. The vehicle system may include a brake system 3510, such as an air brake system or other brake system that uses or relies on hydraulics to brake (e.g., a hydraulic brake system using brake fluid). The brake system can include a conduit 3512, such as a brake pipe, that carries fluid (e.g., air or brake fluid) and/or changes in the fluid (e.g., pressure changes) to brakes 3514 to engage or release the brakes. The vehicle systems can include a vehicle controller 3516 that represents hardware circuitry having or connected with one or more processors (e.g., microprocessors, field programmable gate arrays, integrated circuits, or the like) that perform or control operations of the controller. The controller can control the components of the vehicle system, such as a monitoring device (described herein), engines, motors, the brake system, or the like.

Figure 37:
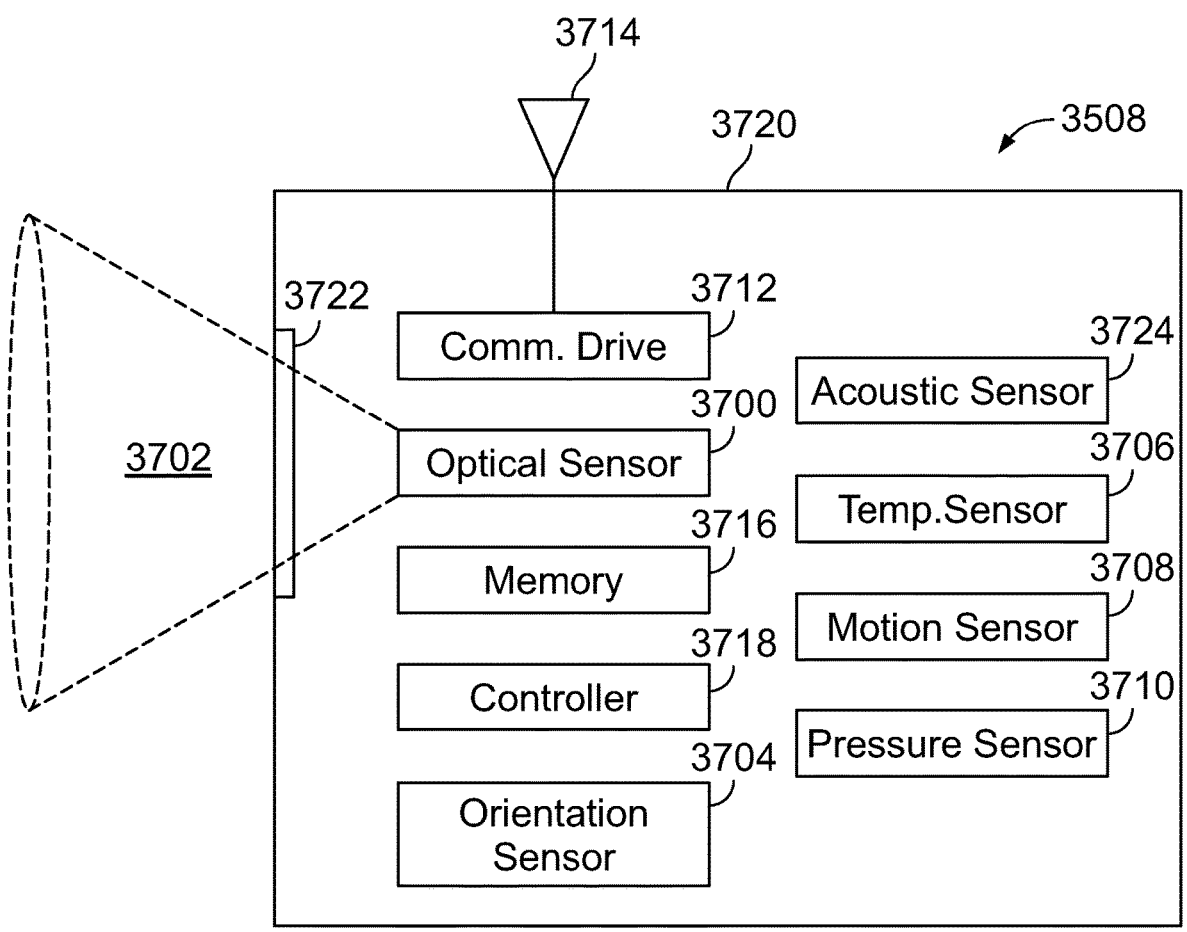
FIG. 37 illustrates another example of a monitoring device.

The vehicle systems may include the monitoring device 3508 that can be mounted to the vehicle systems. With continued reference to the vehicle systems shown in FIGS. 35 and 36, FIG. 37 illustrates one example of the monitoring device. The monitoring device can be mounted to the vehicle systems at a rear or trailing end of the vehicle systems. Alternatively, the monitoring device can be disposed elsewhere on the vehicle systems (e.g., inside an operator cab, facing rearward or forward but not on a leading or trailing end of the vehicle systems, etc.). For example, the monitoring device may be an EOT device or another EOVS device, as described herein. The monitoring device can monitor operation or characteristics of the vehicle systems and can control operation of an optical sensor that may be mounted to the vehicle systems. In one embodiment, the optical sensor is included in the monitoring device. The monitoring device can be removably mounted to the vehicle systems. For example, the monitoring device can be mounted to a first vehicle system, travel or move with the first vehicle system while capturing images or video (and/or monitoring other characteristics of the first vehicle system), then be separated from the first vehicle system and mounted to a different, separate, second vehicle system, travel or move with the second vehicle system while capturing images or video (and/or monitoring other characteristics of the second vehicle system), then be separated from the second vehicle system, and so on.

The monitoring device can include sensors to monitor characteristics of the vehicle system during operation of the monitoring device. In the illustrated example, these sensors can include one or more of an optical sensor 3700 (e.g., a camera) that senses objects within a field of view 3702 of the optical sensor and generates image data representative of these objects, an orientation sensor 3704 (e.g., a tilt sensor, accelerometer, Hall effect sensors, etc.) that senses a tilt of the monitoring device, a temperature sensor 3706 that senses a temperature of the monitoring device or an environment in which the monitoring device is disposed, a motion sensor 3708 (e.g., accelerometer, Hall effect sensor, GNSS receiver, GPS receiver, etc.) that senses movement of the monitoring device, a pressure sensor 3710 that measures pressures of the brake system (e.g., a fluid pressure sensor fluidly coupled with the brake pipe), an acoustic sensor 3724 that detects sounds (e.g., a microphone, acoustic pick-up device, piezoelectric transducer), etc. In one embodiment, two or more of these sensors may be embodied in the same sensor. For example, the tilt sensor and motion sensor may be the same accelerometer, Hall effect sensor, GNSS receiver, GPS receiver, etc.

The optical sensor can be a camera, but additionally or alternatively can include or represent an infrared sensor, a LiDAR system, a visual sensor (that examines images or videos to determine the presence and/or orientation of objects in the images or videos), a radar system, a mmWave system (e.g., an extremely high frequency radar, or millimeter wave spectrum radar), or another sensor that converts light or light rays into electronic signals. The optical sensor may have a field of view directed or oriented away from the vehicle system. For example, if the optical sensor is mounted on the trailing end of the vehicle system, then the optical sensor can output image data that shows the field of view behind the vehicle system. Alternatively, the optical sensor may be mounted in another location (inside the vehicle system, on a leading end of the vehicle system, between the leading and trailing ends of the vehicle system). While not all of the examples of optical sensors may output images or videos, the output of these sensors may be referred to as image data or optical sensor data. For example, distances measured by the radar or mmWave systems may be output by the optical sensor as image data or optical sensor data, shapes of objects detected by the LiDAR system may be output by the optical sensor as image data or optical sensor data, and so on.

The monitoring device optionally can include a communication device 3712 for communicating with one or more other devices or systems. The communication device can represent a transmitter, receiver, transceiver, or the like, that can communicate data signals via wired connections, that can wirelessly communicate the data signals using an antenna 3714, or that can communicate the data signals both wirelessly and/or via wired connections. The monitoring device can include a memory 3716 for storing the image data and may include a device controller 3718 that controls operation of the monitoring device. The device controller can represent hardware circuitry having or connected with one or more processors (e.g., microprocessors, field programmable gate arrays, integrated circuits, or the like) that perform or control operations of the monitoring device.

The components of the monitoring device can be disposed inside a common housing 3720 that can be coupled to and detached from the vehicle systems, as described above. The housing can include a window 3722 or opening through which the field of view of the optical sensor passes.

The sensors monitor characteristics of the monitoring device and, based on one or more of these characteristics (and/or changes in the characteristics), the device controller can activate or deactivate one or more functions of the monitoring device that rely on or use the optical sensor of the monitoring device. These functions are described below and can be referred to as optical sensor functions. The optical sensor functions may be activated by turning the optical sensor on, directing or supplying electric current to the optical sensor or other components of the monitoring device (e.g., from an internal power source of the monitoring device, such as one or more battery cells, capacitors, energy harvester devices, etc., or from an external power source), opening a shutter or other eyepiece of the optical sensor, or the like, to allow or cause the optical sensor functions to operate. The optical sensor functions may be deactivated by turning the optical sensor off, stopping or preventing supply electric current to the optical sensor or other components of the monitoring device, closing the shutter or other eyepiece of the optical sensor, or the like, to prevent or otherwise stop the optical sensor from sensing objects within the field of view of the optical sensor and prevent or stop the optical sensor functions from operating. The optical sensor functions may remain deactivated until or unless the sensor data indicates that the monitoring device has been mounted or coupled to the vehicle system.

As one example, the monitoring device can sense an orientation of the monitoring device and activate or deactivate the optical sensor functions based on the orientation. The orientation can be measured or sensed by the tilt sensor or motion sensor, or may be derived by the device controller from data output by the tilt sensor or motion sensor. If the orientation indicates that the housing of the monitoring device is upright, then the device controller can activate one or more of the optical sensor functions. For example, if the orientation indicates that the top surface of the housing is above the bottom surface, the housing is not angled toward the surface of the earth by more than a designated threshold angle (such as twenty degrees), a center axis of the housing is angled within the designated threshold angle to a designated vertical axis, etc., then the device controller can activate the optical sensor functions (or allow the optical sensor functions to remain activated). But if the orientation indicates that the housing is not upright (e.g., the housing is angled toward the surface of the earth by more than the designated threshold angle, the top surface of the housing is not above the bottom surface, the center axis of the housing is within the designated threshold angle of the vertical axis, etc.), then the device controller can deactivate the optical sensor functions or prevent the optical sensor functions from being activated.

As another example, the monitoring device can determine (e.g., measure or calculate) a fluid pressure in the brake system of the vehicle system. The fluid pressure can be an air pressure of air in the brake pipe, brake fluid in a conduit of the brake system, or the like, that is measured or sensed by the pressure sensor. If the fluid pressure exceeds a threshold pressure, then this fluid pressure can indicate that the brake system is charged, the brakes of the vehicle system are released (or directed to be released by the increased fluid pressure), and/or the vehicle system is moving with the brakes released. In one example, the threshold pressure can be thirty pounds per square inch (or two bars) or another value. The device controller can activate the optical sensor functions or allow the optical sensor functions to remain activated while the fluid pressure exceeds the threshold pressure and/or responsive to the fluid pressure increases above the threshold pressure. If the fluid pressure does not exceed this threshold pressure, however, then the fluid pressure can indicate that the brake system is not charged, the brakes of the vehicle system are engaged (or directed to be engaged by the increased fluid pressure), and/or the vehicle system is not moving or is slowing with the brakes engaged. The device controller can deactivate the optical sensor functions or prevent the optical sensor functions from being activated while the fluid pressure does not exceed the threshold pressure and/or responsive to the fluid pressure falling to or below the threshold pressure.

As another example, the monitoring device can determine (e.g., measure or calculate) whether the monitoring device is moving or mounted to a vehicle system that is moving. The device controller can receive output from the motion sensor to determine whether the monitoring device is moving. If the moving speed at which the monitoring device exceeds a threshold speed, then this moving speed can indicate that the monitoring device is mounted to a vehicle system that is moving. In one example, the threshold speed can be faster than a speed at which a normal or typical human can walk, such as faster than five miles per hour (or eight kilometers per hour). Moving speeds in excess of this threshold speed can indicate that the monitoring device on being carried onboard a moving vehicle system, and not being manually carried by a person. The device controller can activate the optical sensor functions or allow the optical sensor functions to remain activated while the moving speed exceeds the threshold speed and/or responsive to the moving speed increasing above the threshold speed. If the moving speed does not exceed this threshold speed, then the moving speed can indicate that the monitoring device may not be mounted on a moving vehicle system. The device controller can deactivate the optical sensor functions or prevent the optical sensor functions from being activated while the moving speed does not exceed the threshold speed and/or responsive to the moving speed falling to or below the threshold speed.

As another example, the monitoring device can determine (e.g., measure or calculate) whether the monitoring device is moving or mounted to a vehicle system that is moving along or within a threshold distance of one or more designated routes. The memory can store locations (e.g., geographic coordinates, layouts, etc.) of routes on which the vehicle system is to move. With respect to rail vehicle systems, these route locations can be tracks. With respect to other types of vehicle systems, these route locations can be previously designated or identified routes or paths on which the vehicle system is to move from one location to another. The device controller can examine locations of the monitoring device (as reported or determined based on output from the GNSS receiver or GPS receiver) and compare these device locations to the route locations. If the device locations are disposed on the route locations or within a threshold distance of the route locations, then the device controller can decide that the monitoring device is onboard the vehicle system and can activate or permit continued operation of the optical sensor functions. But if the device locations are not disposed on the route locations or are not within the threshold distance of the route locations, then the device controller can decide that the monitoring device is not onboard the vehicle system (or is onboard another vehicle system) and can deactivate or prevent activation of the optical sensor functions. The threshold distance can be based on the precision or accuracy of the GNSS or GPS receiver. For example, during times or locations where the GNSS or GPS error is larger or longer, the threshold distance can increase. But during times or locations where this error is smaller or shorter, the threshold distance can decrease.

The device controller optionally can determine that the monitoring device is onboard the moving vehicle system responsive to several of the criteria described above being satisfied. For example, the device controller can activate or allow activation of the optical sensor functions responsive to at least two or more (or another threshold minimum, such as at least three or all) of the orientation of the monitoring device being upright, the fluid pressure exceeding the threshold pressure, the moving speed of the monitoring device exceeding the threshold speed, and/or the device locations being on or within the threshold distance of the route locations. The device controller can deactivate or prevent activation of the optical sensor functions responsive to the threshold minimum of these criteria not being met.

The optical sensor functions that may be activated or deactivated as described above can include activation of the optical sensor. As described above, activating the optical sensor can include turning the optical sensor on, opening a shutter, etc., while deactivating the optical sensor can include turning the optical sensor off, closing the shutter, etc. Another optical sensor function that can be activated or deactivated includes recording the image data output from the optical sensor (e.g., in the memory). The image data can be recorded or stored in the memory while this function is activated, but the image data may not be output by the optical sensor or may be output by the optical sensor but not recorded or stored in the memory while this function is deactivated.

As another example, the device controller can activate an analysis function of the optical sensor or of the device controller inside the monitoring device. For example, responsive to determining the monitoring device is mounted to the vehicle system, the device controller can activate a function that examines the image data output by the optical sensor and slash or stored in the memory to detect objects in the image data, detect the orientation of objects in the image data, or perform other image analysis techniques. But if the device controller determines that the monitoring device is not mounted to the vehicle system, the device controller can deactivate this function or otherwise prevent the image analysis functions from being performed.

As another example, the device controller can activate an image data processing function of the optical sensor or the device controller inside the monitoring device. For example, responsive to determining that the monitoring devices is mounted to a vehicle system, the device controller can activate a compression function of the optical sensor or the device controller that compresses the image data output by the optical sensor, can activate a brightness or color adjustment function of the optical sensor or the device controller that changes a brightness and/or color in the image data, etc. Responsive to the device controller determining that the monitoring device is not mounted to the vehicle system, the device controller can deactivate one or more of these functions (for example, the device controller can deactivate the compression function, can deactivate the brightness or color adjustment function, etc.). In one example, the device controller can activate an image data processing function responsive to determining that the monitoring device is not mounted to the vehicle system. This function that is activated while the monitoring device is not mounted to the vehicle system can be a function that changes the image data in one or more ways to alleviate privacy concerns. For example, when or while this function is activated, portions of the image data representing faces of people, license plates, or other private information may be blurred out or otherwise obscured from view in the image data. Alternatively, this function may be activated responsive to determining that the monitoring device is mounted to the vehicle system.

The controller can activate one or more communication paths for human or machine analysis of the image data output by the optical sensor responsive to determining that the monitoring device is mounted to the vehicle system. For example, the controller can activate the communication device to communicate the image data from the optical sensor to another vehicle in the vehicle system, such as to the vehicle controller of the vehicle system. As another example, the controller can activate the communication device to communicate the image data to a device or system that is off-board the vehicle system responsive to determining that the monitoring device is mounted to the vehicle system. The communication device can then communicate a signal (e.g., an event message) indicating activation of the optical sensor and/or can communicate the image data to off-board devices or systems, such as a back office, a dispatch facility, a traffic monitoring system, a positive vehicle control system (e.g., a system that issues directives to vehicle systems indicating that the vehicle systems can enter into different segments of routes, such as a Positive Train Control system or back office), to a negative vehicle control system (e.g., a system that issues prohibitions to vehicle systems indicating that the vehicle systems cannot enter into different segments of routes), to a remote control device (that remotely controls movement of the vehicle system from onboard or off-board the vehicle system), or the like. With respect to rail vehicle systems, the communication device that is activated can communicate the image data to a locomotive in the rail vehicle system, to an EOT back office facility, to the PTC office facility, to both the remote control consoles or devices and the back office facility, to an autonomous train control back office system, or the like.

One or more of these other controllers, facilities, systems, or offices can then automatically analyze the image data (e.g., machine analysis) or present the image data to an operator for manual analysis on demand, periodically, or based on occurrence of one or more events (as described herein). But the device controller can deactivate this communication function to prevent the image data output by the optical sensor from being communicated to any other device, system, vehicle, or the like, outside of the monitoring device responsive to determining that the monitoring device is not mounted to the vehicle system.

Figure 38:
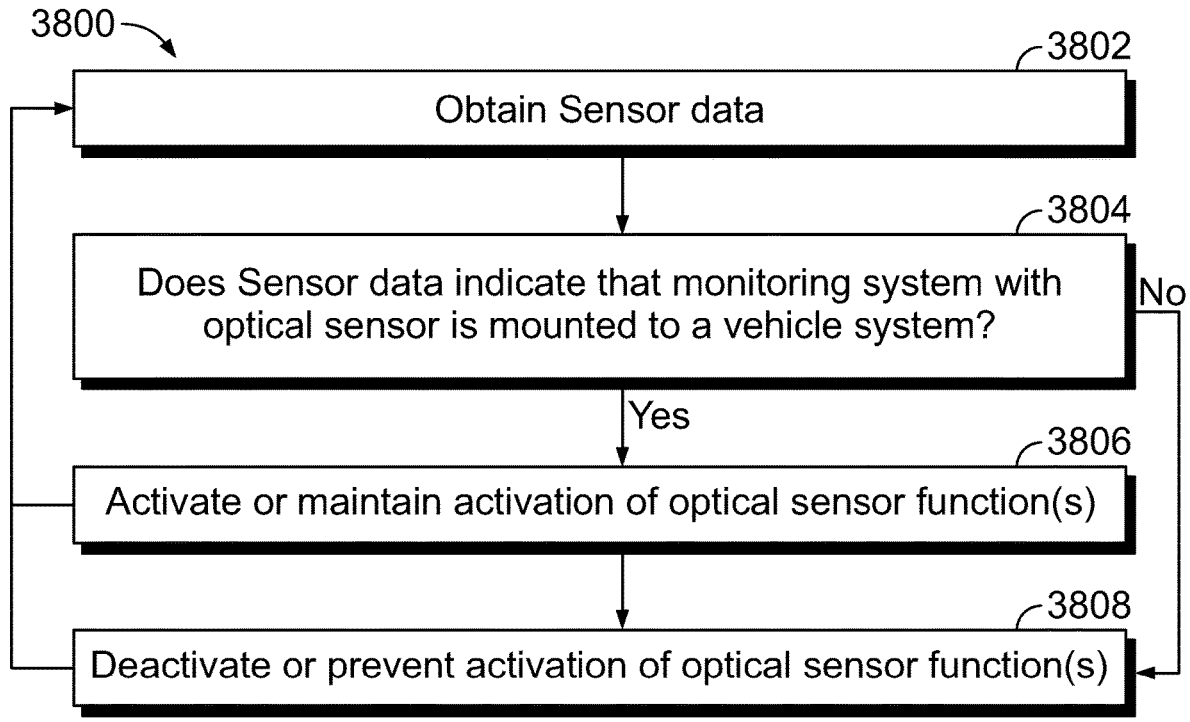
FIG. 38 illustrates a flow chart of one example of a method for controlling operation of optical sensor functions of a monitoring device that can be mounted to vehicle systems.

FIG. 38 illustrates a flow chart of one example of a method 3800 for controlling operation of optical sensor functions of a monitoring device that can be mounted to vehicle systems. This method can represent operations performed by the monitoring device, such as the device controller in the monitoring device. At step 3802, sensor data is obtained. As described above, the device controller can receive data output by a tilt sensor to identify or derive an orientation of the monitoring device, data output by a motion sensor to decide whether the monitoring device is moving, data output by the motion sensor to determine how fast the monitoring device is moving, and/or data output by the motion sensor to identify locations of the monitoring device, and/or pressure measurements output by the pressure sensor to identify or derive fluid pressures in a brake system of the vehicle system.

At step 3804, the sensor data is examined to decide whether the sensor data indicates that the monitoring device is mounted to a vehicle system. As described above, the device controller can examine the orientation of the monitoring device to determine whether the monitoring device is upright and thereby mounted to (or likely mounted to) a vehicle system, can examine the moving speed of the monitoring device to determine whether the monitoring device is moving with a vehicle system or being carried by a person, can examine locations of the monitoring device to determine whether the monitoring device is moving with a vehicle system on a pre-approved or designated route, can examine locations of the monitoring device to determine whether the monitoring device is not traveling on pre-approved or designated routes of the vehicle system, can examine measured pressures of the brake system to determine whether the brakes of the vehicle system are engaged or released, or the like.

If the sensor data indicates that the monitoring device is mounted to the vehicle system, then one or more of the optical sensor functions can be activated or maintained in an activated state due to the monitoring device being mounted on the vehicle system. As a result, flow of the method can proceed toward step 3806. But if the sensor data indicates that the monitoring device is not mounted to the vehicle system, then one or more of the optical sensor functions may not be activated or may be prevented from being activated to alleviate privacy concerns. As a result, flow of the method can proceed toward step 3808.

At step 3806, one or more of the optical sensor functions is activated or is allowed to remain activated. As described above, these optical sensor functions can involve capturing the image data, recording the image data, communicating the image data, modifying the image data, or the like. The method can then return toward one or more other operations, such as step 3802. This permits the method to be repeated one or more additional times to repeatedly check whether the monitoring device remains mounted to the vehicle system.

At step 3808, one or more, or all, of the optical sensor functions of the optical sensor are deactivated or prevented from being activated. As described above, deactivating or preventing activation of these functions can alleviate privacy concerns. For example, the image data may no longer be captured, the image data may no longer be recorded, the image data may no longer be communicated outside of the monitoring device, the image data may not be modified, the image data may be modified to blur or obscure private information, or the like, while the monitoring device is not mounted to the vehicle system. Flow of the method may then return to one or more other operations, such as step 3802. This can allow the method to be repeated one or more additional times to repeatedly check whether the monitoring device has been mounted to the vehicle system and one or more of the optical sensor functions can be activated.

Optionally, the optical sensor or optical sensor functions can be activated to capture images or video and/or output the image data responsive to one or more events being detected. These events can indicate occurrence of an accident or other event, such as a collision between the vehicle system having the optical sensor and another vehicle system or object, a collision between other nearby vehicle systems, a fire, a tipping over of the vehicle system, a derailment of the vehicle system, etc. Obtaining image data responsive to detection of one or more of these events can provide evidence or other information helpful to examine the causes and results of accidents or other events. In one example, the optical sensor may be outputting image data but only a moving window of this image data may be stored or recorded in the memory, with older image data being discarded and replaced by more recently obtained image data. Responsive to one or more events being detected, the device controller can activate the optical sensor by storing the image data that was output prior to the event in the memory. The device controller can stop discarding the older image data and record or store the image data in the memory (from before, during, and/or after the event). This can allow for the image data output prior to event detection to be recorded and maintained, as well as the image data output subsequent to detection of the event. The image data output prior to detection of the event can be used for accident reconstruction.

The types of events that can be detected to activate the optical sensor (or activate function(s) of the optical sensor) include receipt of an emergency braking command. In one example, the pressure sensor of the monitoring device measures fluid pressure in the brake system (e.g., in the brake pipe) and determines that an emergency braking command has occurred responsive to the fluid pressure decreasing by more than a threshold pressure drop. The threshold pressure drop can be a reduction in fluid pressure of at least thirty pounds per square inch, at least twenty pounds per square inch, at least sixty pounds per square inch, or another value.

Another event that can be detected to activate the optical sensor can include the vehicle system moving in a designated direction. This designated direction can be a direction of the monitoring device. For example, if the monitoring device is mounted to the back, rear, or trailing end of the vehicle system, then the designated direction can be the vehicle system moving in reverse. As another example, the designated direction can be a change in direction from a direction that the vehicle system previously was moving (changing from moving forward to reverse, or changing from moving in reverse to forward). The device controller can monitor data output by the motion sensor to determine whether the vehicle system and monitoring device are moving in the designated direction (e.g., reverse). Responsive to detecting this movement, the device controller can activate the optical sensor (and/or one or more functions of the optical sensor).

Another example of an event that can be detected for activating the optical sensor or functions of the optical sensor include excessive changes in acceleration or deceleration of the monitoring device or the vehicle system. The device controller can monitor acceleration or deceleration measured by the motion sensor. Optionally, the device controller can calculate acceleration or deceleration based on speeds measured by the motion sensor. The device controller can compare the acceleration or deceleration that is measured or calculated with one or more thresholds of acceleration or deceleration. If the measured or calculated acceleration or deceleration is greater than the corresponding threshold (e.g., the monitoring device or vehicle system is accelerating faster than the acceleration threshold or is decelerating more rapidly than the deceleration threshold), then the device controller can determine that an activation event has occurred. Such an acceleration or deceleration can indicate that an accident has occurred or is likely to occur, that derailment has occurred or is occurring, etc. The device controller can activate the optical sensor or function(s) of the optical sensor to obtain, record, and/or communicate image data.

Another example of an event that can be detected for activating the optical sensor or functions of the optical sensor include increases in temperature. The device controller can monitor temperatures measured by the temperature sensor and determine whether the temperatures indicate an elevated temperature that is warmer or hotter than a threshold temperature. Elevated temperatures above the threshold temperature can indicate that a fire is potentially nearby, that the temperatures indicate a significant risk of a fire beginning, or that the temperatures indicate thermal or heat damage to components of the monitoring device and/or vehicle system. The device controller can activate the optical sensor and/or functions to capture image data of the fire or other source of heat.

Another example of an event that can be detected for activating the optical sensor or functions of the optical sensor include loud sounds detected by the acoustic sensor. The device controller can monitor sounds or magnitudes (e.g., decibels) of sounds sensed by the acoustic sensor. Louder sounds (sounds at decibel levels that exceed a decibel threshold) can indicate that an accident (e.g., collision, derailment, explosion, etc.) has occurred. The device controller can activate the optical sensor and/or functions of the optical sensor responsive to a loud sound being detected.

Another example of an event that can be detected for activating functions of the optical sensor include optical detection of another vehicle system. The optical sensor may output image data that is examined by the device controller (or that is examined by the optical sensor) to determine whether the image data indicates another vehicle system is advancing toward the vehicle system on which the optical sensor is disposed. For example, the image data can be analyzed to determine whether any objects are recognized that may be another vehicle system that is growing in size in the image data (indicating that the other vehicle system is moving toward a possible collision with the vehicle system having the optical sensor). As another example, distances between the optical sensor and the other vehicle system can be measured by the optical sensor and examined to determine whether the other vehicle system is moving toward a possible collision with the vehicle system having the optical sensor). If the movement of the other vehicle system indicates a potential upcoming collision, the device controller can activate the optical sensor to begin communicating the image data to the memory for storage and/or to an off-board location for analysis.

Optionally, the device controller can activate a communication function of the image sensor based on sensor data as described herein. The image sensor can communicate a signal to the vehicle controller responsive to this communication function being activated. This signal can warn the vehicle controller of the event detected based on the sensor data. In response, the vehicle controller can implement one or more responsive actions, such as increasing a throttle setting of the vehicle system, releasing brakes of the vehicle system, changing steering of the vehicle system to change which route the vehicle system is traveling on, activating an audible horn or other warning, or the like.

The device controller can direct the communication device to communicate the event message to one or more of the off-board locations or systems described herein responsive to an event being detected. This message can notify the off-board locations or systems, which can dispatch emergency personnel (e.g., fire department personnel, medical personnel, police, or the like). Optionally, the device controller can direct the communication device to communicate the image data output by the optical sensor to the off-board locations or systems to ensure posterity or survival of the image data. The image data can be sent to the off-board location to ensure that the image data is maintained in the event that the monitoring device or memory of the monitoring device is destroyed by the event that is detected.

Figure 39:
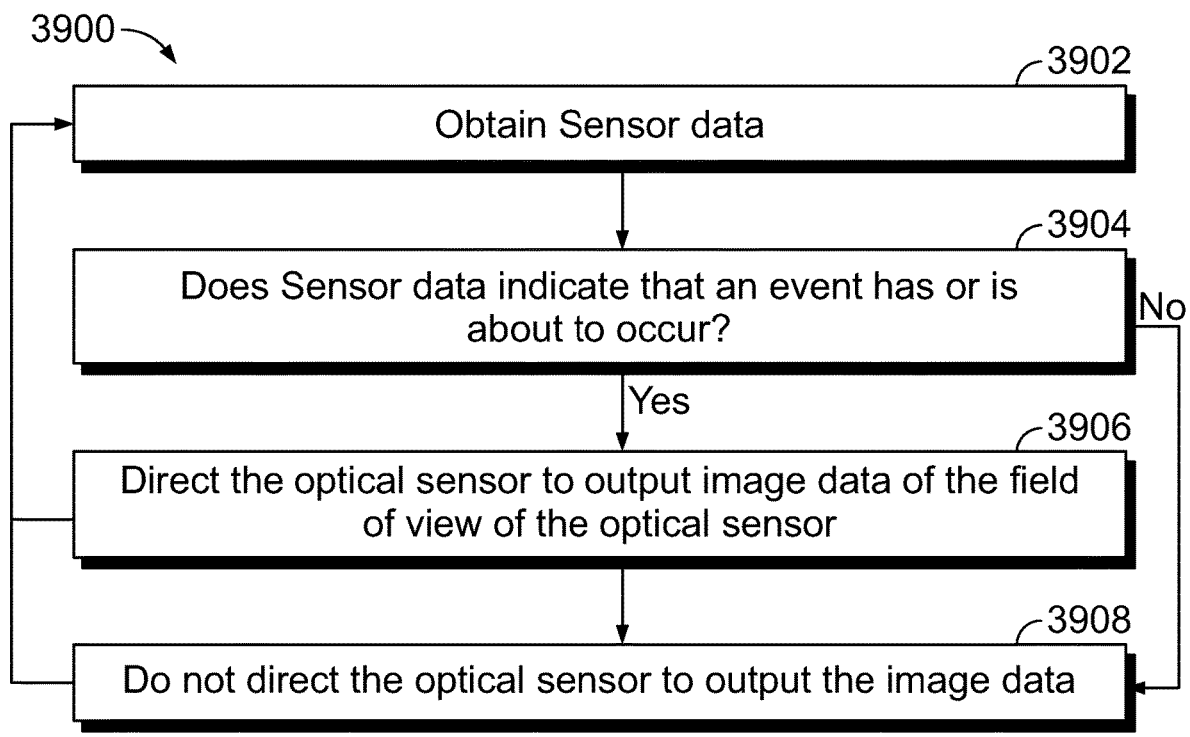
FIG. 39 illustrates a flow chart of one example of a method for controlling an optical sensor mounted to a vehicle system to output image data responsive to detection of an event.

FIG. 39 illustrates a flow chart of one example of a method 3900 for controlling an optical sensor mounted to a vehicle system to output image data responsive to detection of an event. This method can represent operations performed by the monitoring device, such as the device controller in the monitoring device. At step 3902, sensor data is obtained. As described above, the device controller can receive data output by a variety of different sensors that sense characteristics or surroundings of the vehicle system.

At step 3904, the sensor data is examined to decide whether the sensor data indicates that an event has occurred. As described above, the device controller can examine the sensor data to determine whether the vehicle system has started moving in reverse, whether the vehicle system is accelerating or decelerating faster than a threshold, whether the vehicle system has tilted by more than a threshold amount, whether a sensed temperature is hotter than a threshold temperature, whether or the like.

If the sensor data indicates that an event has occurred, then the optical sensor can begin outputting image data. This image data can later be examined to obtain or derive information about the event. For example, video or images of an accident, fire, or the like, may be obtained. As a result, flow of the method can proceed toward step 3906. But if the sensor data does not indicate that an event has occurred, then the optical sensor may not begin outputting image data. As a result, flow of the method can proceed toward step 3908.

At step 3906, the optical sensor is directed to output the image data of a field of view of the sensor. The image data can be output to an off-board location, to a memory for storage, to a display onboard the vehicle system, or the like. As described above, this image data can be useful in analyzing the event, changing movement of the vehicle system, or the like. The method can then return toward one or more other operations, such as step 3902. This permits the method to be repeated one or more additional times to repeatedly check whether an event has occurred, and the optical sensor is to begin outputting image data.

At step 3908, the optical sensor is not directed to begin outputting image data. The optical sensor may remain deactivated or may remain activated without generating image data of the field of view of the optical sensor. Flow of the method may then return to one or more other operations, such as step 3902. This can allow the method to be repeated one or more additional times to repeatedly check whether the sensor data indicates that an event has occurred, and the optical sensor should begin outputting image data.

In one example, a monitoring device includes a camera or other optical sensor configured to be disposed at a trailing end of a first vehicle system. The camera or other optical sensor is configured to output one or more images or video of a field of view behind the first vehicle system. The monitoring device also includes a controller configured to receive output from one or more sensors and to activate the camera or other optical sensor to output the one or more images or video based on the output from the one or more sensors. The output from the one or more sensors indicates one or more of a change in movement of the first vehicle system, a temperature, an acoustic sound, or movement of a second vehicle system.

Optionally, the first vehicle system can be a rail vehicle system and the camera or other optical sensor can be disposed within an EOT device configured to be disposed at the trailing end of the rail vehicle system. The controller can be configured to receive the output from the one or more sensors as indicating the change in movement of the first vehicle system to activate the camera or other optical sensor (where the output from the one or more sensors indicates a change in direction of movement of the first vehicle system). The controller can be configured to receive the output from the one or more sensors as indicating the change in movement of the first vehicle system to activate the camera or other optical sensor (where the output from the one or more sensors indicates that the vehicle system is moving in reverse). The controller can be configured to receive the output from the one or more sensors as indicating the change in movement of the first vehicle system to activate the camera or other optical sensor (where the output from the one or more sensors indicates that an acceleration or deceleration of the vehicle system exceeds a designated threshold).

The controller can be configured to receive the output from the one or more sensors as indicating the change in movement of the first vehicle system to activate the camera or other optical sensor (where the output from the one or more sensors indicates that the vehicle system is tilting by more than a designated amount). The controller can be configured to receive the output from the one or more sensors as indicating the temperature to activate the camera or other optical sensor (where the output from the one or more sensors indicates that the temperature exceeds a designated temperature). The controller can be configured to receive the output from the one or more sensors as indicating the acoustic sound to activate the camera or other optical sensor (where the output from the one or more sensors indicates that the acoustic sound exceeds a designated decibel level).

The controller can be configured to receive the output from the one or more sensors as indicating movement of a second vehicle system to activate the camera or other optical sensor (where the output from the one or more sensors indicates that the second vehicle system is approaching the trailing end of the first vehicle system). The controller can be configured to direct a communication device onboard the vehicle system to communicate an event message to an off-board system responsive to receiving the output from the one or more sensors and activating the camera or other optical sensor based on the output that is received. The event message can indicate that the camera or other optical sensor was activated.

The controller can be configured to direct a communication device onboard the vehicle system to communicate a sensor signal to an off-board system responsive to receiving the output from the one or more sensors and activating the camera or other optical sensor based on the output that is received. This sensor signal can include the one or more images or video that was output by the camera or other optical sensor.

The controller can be configured to examine the one or more images or video that is output by the camera or other optical sensor and automatically change movement of the first vehicle system based on the one or more images or video output by the camera or other optical sensor. The controller can be configured to keep the camera or other optical sensor deactivated and not capturing information within the field of view of the camera or other optical sensor until the camera or other optical sensor is installed on the trailing end of the first vehicle system.

The controller can be configured to determine whether the camera or other optical sensor is installed on the trailing end of the vehicle system based on the output from the one or more sensors. The controller can be configured to determine that the camera or other optical sensor is installed on the trailing end of the vehicle system and activate the camera or other optical sensor responsive to the output from the one or more sensors indicating that one or more of: the camera or other optical sensor is oriented upright, a pressure of a brake system of the first vehicle system exceeds a designated pressure, or the first vehicle system is moving faster than a designated speed.

In another example, a method for monitoring a vehicle system includes sensing one or more of a change in movement of a first vehicle system, a temperature, an acoustic sound, or movement of a second vehicle system; activating a camera or other optical sensor disposed at a trailing end of the first vehicle system responsive to sensing the one or more of the change in movement of the first vehicle system, the temperature, the acoustic sound, or the movement of the second vehicle system; and generating one or more images or video of a field of view behind the first vehicle system responsive to activating the camera or other optical sensor.

The camera or other optical sensor can be activated responsive to detecting one or more of a change in direction of movement of the first vehicle system, the vehicle system is moving in reverse, that an acceleration or deceleration of the vehicle system exceeds a designated threshold, that the vehicle system is tilting by more than a designated amount, the temperature exceeds a designated temperature, that the acoustic sound exceeds a designated decibel level, or that the second vehicle system is approaching the trailing end of the first vehicle system. The method also can include directing a communication device onboard the vehicle system to communicate one or more of (a) an event message or (b) the one or more images or video to an off-board system responsive to activating the camera or other optical sensor, the event message indicating that the camera or other optical sensor was activated. The method optionally can include automatically changing movement of the first vehicle system based on the one or more images or video output by the camera or other optical sensor.

In another example, another method includes sensing one or more of a tilting orientation of a monitoring device having a camera or other optical sensor and configured to be coupled to an end of a multi-vehicle system, a pressure of a fluid in a brake system of the multi-vehicle system using a pressure sensor of the monitoring device, or movement of the monitoring device using a motion sensor of the monitoring device; and activating one or more of the camera or other optical sensor or a communication device of the monitoring device responsive to sensing the one or more of the tilting orientation of the monitoring device, the pressure of the fluid in the brake system, or movement of the monitoring device, wherein the camera or other optical sensor is capable of capturing data within a field of view of the camera or other optical sensor and the communication device is capable of communicating one or more images or video from the camera or other optical sensor only once the camera or other optical sensor and the communication device are activated.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a camera or other optical sensor configured to be disposed at a trailing end of a first vehicle system, the camera or other optical sensor configured to output one or more images or video of a field of view behind the first vehicle system; and
a controller configured to receive output from one or more sensors and to activate the camera or other optical sensor to output the one or more images or video based on the output from the one or more sensors, wherein the output from the one or more sensors indicates one or more of a change in movement of the first vehicle system, a temperature, an acoustic sound, or movement of a second vehicle system.

2. The system of claim 1, wherein the first vehicle system is a rail vehicle system, and the camera or other optical sensor is disposed within an end-of-train (EOT) device configured to be disposed at the trailing end of the rail vehicle system.

3. The system of claim 1, wherein the controller is configured to receive the output from the one or more sensors as indicating the change in movement of the first vehicle system to activate the camera or other optical sensor, the output from the one or more sensors indicating a change in direction of movement of the first vehicle system.

4. The system of claim 1, wherein the controller is configured to receive the output from the one or more sensors as indicating the change in movement of the first vehicle system to activate the camera or other optical sensor, the output from the one or more sensors indicating that the vehicle system is moving in reverse.

5. The system of claim 1, wherein the controller is configured to receive the output from the one or more sensors as indicating the change in movement of the first vehicle system to activate the camera or other optical sensor, the output from the one or more sensors indicating that an acceleration or deceleration of the vehicle system exceeds a designated threshold.

6. The system of claim 1, wherein the controller is configured to receive the output from the one or more sensors as indicating the change in movement of the first vehicle system to activate the camera or other optical sensor, the output from the one or more sensors indicating that the vehicle system is tilting by more than a designated amount.

7. The system of claim 1, wherein the controller is configured to receive the output from the one or more sensors as indicating the temperature to activate the camera or other optical sensor, the output from the one or more sensors indicating that the temperature exceeds a designated temperature.

8. The system of claim 1, wherein the controller is configured to receive the output from the one or more sensors as indicating the acoustic sound to activate the camera or other optical sensor, the output from the one or more sensors indicating that the acoustic sound exceeds a designated decibel level.

9. The system of claim 1, wherein the controller is configured to receive the output from the one or more sensors as indicating movement of a second vehicle system to activate the camera or other optical sensor, the output from the one or more sensors indicating that the second vehicle system is approaching the trailing end of the first vehicle system.

10. The system of claim 1, wherein the controller is configured to direct a communication device onboard the vehicle system to communicate an event message to an off-board system responsive to receiving the output from the one or more sensors and activating the camera or other optical sensor based on the output that is received, the event message indicating that the camera or other optical sensor was activated.

11. The system of claim 1, wherein the controller is configured to direct a communication device onboard the vehicle system to communicate a sensor signal to an off-board system responsive to receiving the output from the one or more sensors and activating the camera or other optical sensor based on the output that is received, the sensor signal including the one or more images or video that was output by the camera or other optical sensor.

12. The system of claim 1, wherein the controller is configured to examine the one or more images or video that is output by the camera or other optical sensor and automatically change movement of the first vehicle system based on the one or more images or video output by the camera or other optical sensor.

13. The system of claim 1, wherein the controller is configured to keep the camera or other optical sensor deactivated and not capturing information within the field of view of the camera or other optical sensor until the camera or other optical sensor is installed on the trailing end of the first vehicle system.

14. The system of claim 13, wherein the controller is configured to determine whether the camera or other optical sensor is installed on the trailing end of the vehicle system based on the output from the one or more sensors.

15. The system of claim 14, wherein the controller is configured to determine that the camera or other optical sensor is installed on the trailing end of the vehicle system and activate the camera or other optical sensor responsive to the output from the one or more sensors indicating that one or more of: the camera or other optical sensor is oriented upright, a pressure of a brake system of the first vehicle system exceeds a designated pressure, or the first vehicle system is moving faster than a designated speed.

16. A method comprising:
sensing one or more of a change in movement of a first vehicle system, a temperature, an acoustic sound, or movement of a second vehicle system;
activating a camera or other optical sensor disposed at a trailing end of the first vehicle system responsive to sensing the one or more of the change in movement of the first vehicle system, the temperature, the acoustic sound, or the movement of the second vehicle system; and
generating one or more images or video of a field of view behind the first vehicle system responsive to activating the camera or other optical sensor.

17. The method of claim 16, wherein the camera or other optical sensor is activated responsive to detecting one or more of a change in direction of movement of the first vehicle system, the vehicle system is moving in reverse, that an acceleration or deceleration of the vehicle system exceeds a designated threshold, that the vehicle system is tilting by more than a designated amount, the temperature exceeds a designated temperature, that the acoustic sound exceeds a designated decibel level, or that the second vehicle system is approaching the trailing end of the first vehicle system.

18. The method of claim 16, further comprising:
directing a communication device onboard the vehicle system to communicate one or more of (a) an event message or (b) the one or more images or video to an off-board system responsive to activating the camera or other optical sensor, the event message indicating that the camera or other optical sensor was activated.

19. The method of claim 16, further comprising:
automatically changing movement of the first vehicle system based on the one or more images or video output by the camera or other optical sensor.

20. A method comprising:
sensing one or more of a tilting orientation of a monitoring device having a camera or other optical sensor and configured to be coupled to an end of a multi-vehicle system, a pressure of a fluid in a brake system of the multi-vehicle system using a pressure sensor of the monitoring device, or movement of the monitoring device using a motion sensor of the monitoring device; and
activating one or more of the camera or other optical sensor or a communication device of the monitoring device responsive to sensing the one or more of the tilting orientation of the monitoring device, the pressure of the fluid in the brake system, or movement of the monitoring device, wherein the camera or other optical sensor is capable of capturing data within a field of view of the camera or other optical sensor and the communication device is capable of communicating one or more images or video from the camera or other optical sensor only once the camera or other optical sensor and the communication device are activated.

* * * * *